United States Patent [19]
Azuma et al.

[11] Patent Number: 5,019,851
[45] Date of Patent: May 28, 1991

[54] CAMERA SYSTEM

[75] Inventors: Yoshihiko Azuma; Takehiro Katoh; Hiroshi Ootsuka; Toshihiko Ishimura; Masataka Hamada; Katsumi Kozakai; Norio Ishikawa; Masayuki Ueyama, all of Osaka, Japan

[73] Assignee: Minolta Camera Kabushiki Kaisha, Osaka, Japan

[21] Appl. No.: 350,518

[22] Filed: May 10, 1989

[30] Foreign Application Priority Data

May 12, 1988 [JP] Japan .................. 63-115631
May 12, 1988 [JP] Japan .................. 63-115632
May 13, 1988 [JP] Japan .................. 63-118019

[51] Int. Cl.$^5$ .................. G03B 3/00; G03B 13/18
[52] U.S. Cl. .................. 354/402; 354/412; 354/286
[58] Field of Search .............. 354/400, 432, 429, 412, 354/413, 145.1, 173.1, 173.11, 289.1, 289.12, 402, 409, 286

[56] References Cited

U.S. PATENT DOCUMENTS 4,774,401 9/1988 Yamada et al. .................. 354/432
4,812,912 3/1989 Iida et al. .................. 354/402
4,855,779 8/1989 Ishikawa et al. .................. 354/412

FOREIGN PATENT DOCUMENTS 61-167934 7/1966 Japan .
53-35449 4/1978 Japan .
63-10137 1/1983 Japan .
58-62310 4/1983 Japan .
58-140724 8/1983 Japan .
62-231229 10/1987 Japan .

OTHER PUBLICATIONS

"Canon EOS 620.650", by Canon, Inc. 1987, pp. 42 and 43.

Primary Examiner—L. T. Hix
Assistant Examiner—Cassandra S. Spyrou
Attorney, Agent, or Firm—Burns, Doane, Swecker & Mathis

[57] ABSTRACT

A camera system including interchangeable lenses each having a switch to control many functions provided to the camera system. By simply operating one lens switch, the working mode of auto-focusing (AF) functions of the camera system can be changed: single-spot AF/multi-spot AF modes, one-short AF/continuous AF modes, and focus-locing/non-locking modes. When used with an IC card also attached to the camera body, the lens switch can further control the functions of the camera system added or selected by the IC card.

12 Claims, 54 Drawing Sheets

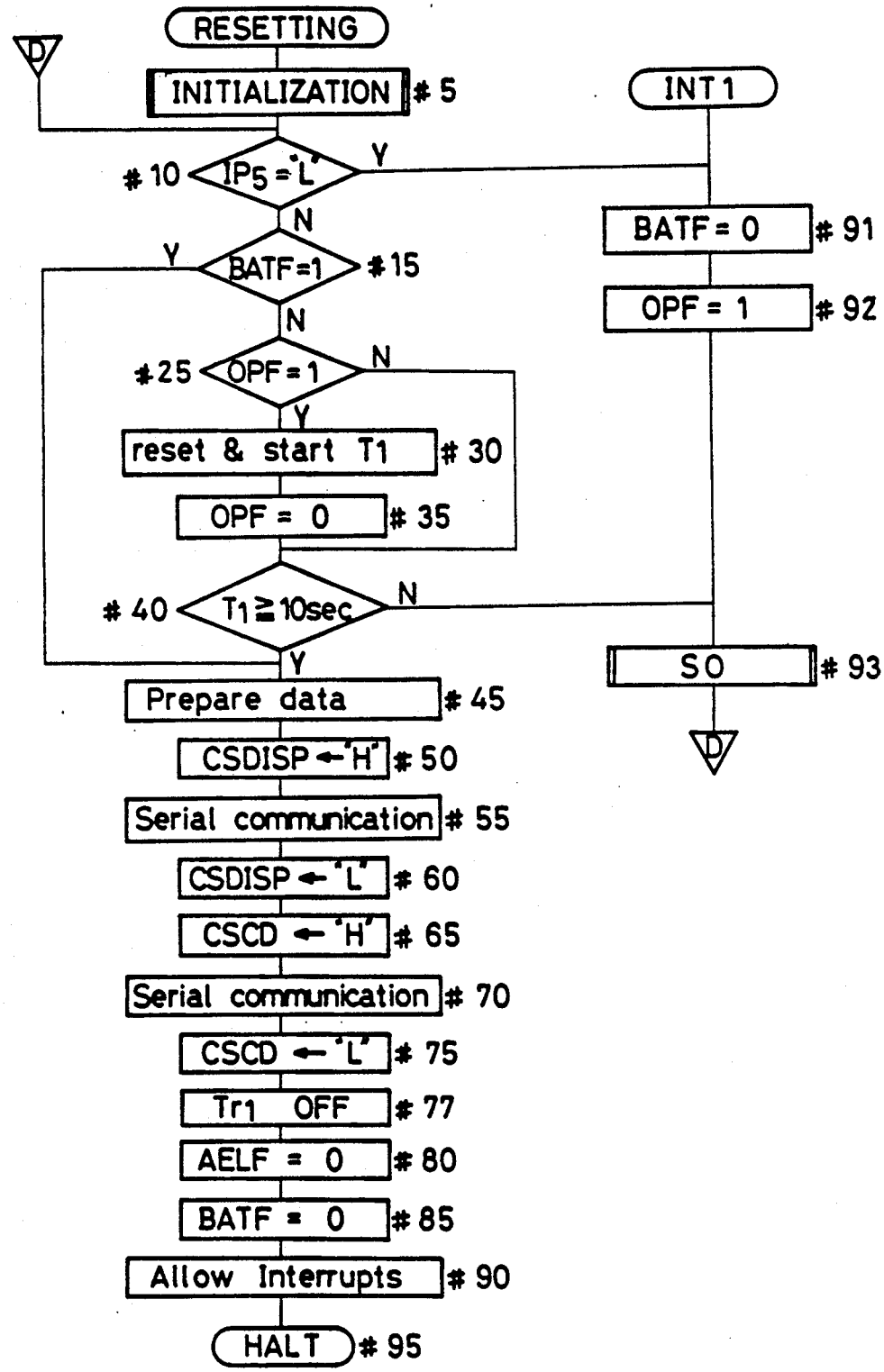

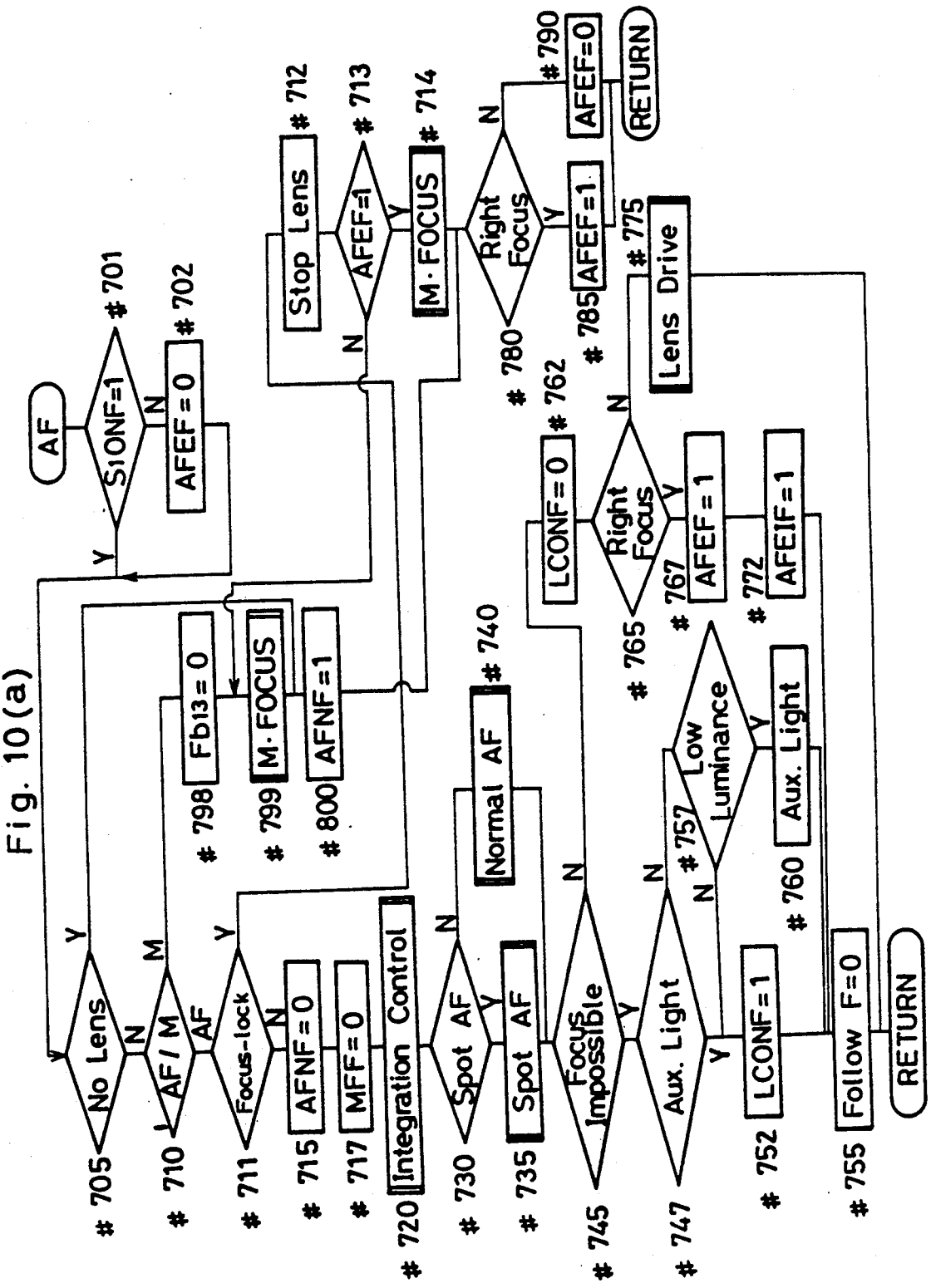

WHEN PROGRAM CARD IS ATTACHED

WHEN MODE SETTING CARD IS ATTACHED

CAMERA SYSTEM

BACKGROUND

1. Field of the Invention

The present invention relates to a camera system, and particularly to one in which a functional switch is provided in the interchangeable lens. This lens switch can adequately set and control desired function or mode among many that are provided for the camera system.

2. Prior Art

Some camera systems are already disclosed in which one or more switches are provided in a lens to operate a function of the camera. In Japanese Laid-open Utility Model Publication No. 62310/1983, for example, the lens has a button switch to lock focusing. In another Japanese Laid-open Utility Model Publication No. 118423/1983, the lens has a push-switch that is operated in two strokes: the first shallow stroke locks the focusing and the second deep stroke releases the shutter. Further in Japanese Laid-open Patent Publication No. 140724/1983, the lens has two buttons: one is to lock the focusing, and the other is to change the Auto-Focusing (AF) mode between the One-shot AF and Continuous AF.

Each of these prior art lens switches, however, operates only one function of the camera. Since camera systems are growing more versatile, the lens should have many switches to control many camera functions. But it is not realistic to provide many switches in the lens because it is difficult for the photographer to correctly manipulate many lens switches while looking into the viewfinder.

Another problem about the lens switch is the conflict between the lens switch and the body switch over a camera function. For example in the case of the third prior art reference No. 140724/1983, the camera body also has a switch for changing the AF mode. Thus the problem is how to operate the AF function when the camera-body switch is ON but the lens switch is OFF, or vice versa.

SUMMARY OF THE INVENTION

Regarding the above problems about the lens switch of a camera system, the present invention is made for the following objects.

One of the objects is to provide a camera system including interchangeable lenses where an operable member in a lens can change the working modes of the auto-focusing function of the camera system between: a first mode in which the focusing of the lens is performed based on the subject in a narrower area of the picture frame, and a second mode in which the focusing is performed based on the subject in a broader area of the picture frame.

Another object of the present invention is to provide a camera system in which one lens switch can control plural functions of the camera system.

Further object of the present invention is to provide a camera system where, in case plural accessories such as a lens and an IC card etc. are attached to the camera body, functions assigned to one accessory can be changed by operating on the other accessory.

These and other objects are achieved by a camera system according to one feature of the present invention including a camera body and an interchangeable lens attachable to the camera body, comprising:

an operable member provided in the interchangeable lens;

means, provided in the interchangeable lens, for sending a signal indicating whether or not the operable member is operated;

means, provided in the camera body, for receiving the signal from the signal-sending means of the interchangeable lens attached to the camera body;

means, provided in the camera body, for selecting in response to the received signal one from a first frame-segment and a second frame-segment which has an area larger than the area of the first frame-segment;

means, provided in the camera body, for detecting focus condition of the attached interchageable lens with respect to the frame-segment selected by the selecting means; and means, provided in the camera body, for focusing the attached interchangeable lens on the basis of detected result of the detecting means.

Another feature of the invention provides a camera system including a camera body and an interchangeable lens attachable to the camera body, comprising:

an operable member provided in the interchangeable lens;

means, provided in the interchangeable lens, for sending a signal indicating whether or not the operable member is operated;

means, provided in the camera body, for receiving the signal from the signal-sending means of the interchangeable lens attached to the camera body;

means, provided in the camera body, for repeatedly detecting focus condition of the attached interchangeable lens;

means, provided in the camera body, for driving the interchangeable lens to a focused condition on the basis of the focus condition detected by the detecting means; and means, provided in the camera body, for controlling the driving means in one of a first and a second modes in response to the signal received by the receiving means, where in the first mode the operation of the driving means is inhibited after the detecting means once detects the focused condition of the interchangeable lens, and in the second mode the operation of the driving means is continued even after the detecting means detects the focused condition of the interchangeable lens.

These camera systems enable the photographer to change the auto-focusing modes by simply operating the operable member of the lens (lens switch).

Another feature of the invention is a camera system for an automatic focusing having a photographic lens, comprising:

a manual operable member;

function-selecting means for selecting one of a plurality of functions each having selectable focusing modes which relates to the automatic focusing;

mode-selecting means for selecting one of the focusing modes of the function selected by the function-selecting means in response to an operation of the manual operable member; and focusing means for performing the automatic focusing on the basis of the focusing mode selected by the mode-selecting means.

In short, the single manual operable member (lens switch) can control plural functions and their working modes of the camera system.

Another feature of the invention is a camera system including a camera body, a first and a second accessories each attachable to the camera body, comprising:

a first operable member provided in the first accessory;

function-selecting means for selecting one of a plurality of functions each having a plurality of control modes when the second accessory is attached;

mode-selecting means for selecting one of the control modes of the function selected by the function-selecting means in response to an operation of the operable member; and control means for controlling the function of the camera selected by the function-selecting means on the basis of the control mode selected by the mode-selecting means.

The first accessory can be a lens and the second accessory can be an IC card adaptable to the camera body. In this case, the lens switch (operable member) is effective only when the IC card is attached to the camera body.

Still another feature of the present invention is a camera system for an an automatic focusing of a lens included in the camera system comprising:

first selecting means for selecting one from a first frame-segment and a second frame-segment which has an area larger than the area of the first frame-segment;

focus detecting means for detecting focus condition with respect to the selected frame-segment;

lens driving means for driving the lens to a focused condition on the basis of the detected focus condition in one of a first and a second modes, where in the first mode the operation of the driving mean is inhibited after the detecting means once detects the focused condition of the interchangeable lens, and in the second mode the operation of the driving means is continued even after the detecting means detects the focused condition of the interchangeable lens;

means, provided in the camera body, for selecting one of the first and the second modes in response to the signal received by the receiving means to control the driving means in the selected mode;

an operable member; and means for stopping driving the lens in response to an operation of the operable member in any selected mode.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which:

FIG. 3 is a flowchart of a routine for resetting the camera system when the battery is attached.

FIG. 6(a) is a flowchart of a routine performing exposure control and the like.

FIGS. 10(a) to 10(f) are flowcharts for various operations for the auto-focusing functions of the camera.

DETAILED DESCRIPTION OF THE PREFERRED EMBODIMENT

Hereinafter, description is made on an embodiment constructed in accordance with the present invention in reference to the drawings. In the following description, not only the systems that relate to the present invention but also other systems and functions are explained for total understanding of the whole camera system.

Figure 1:
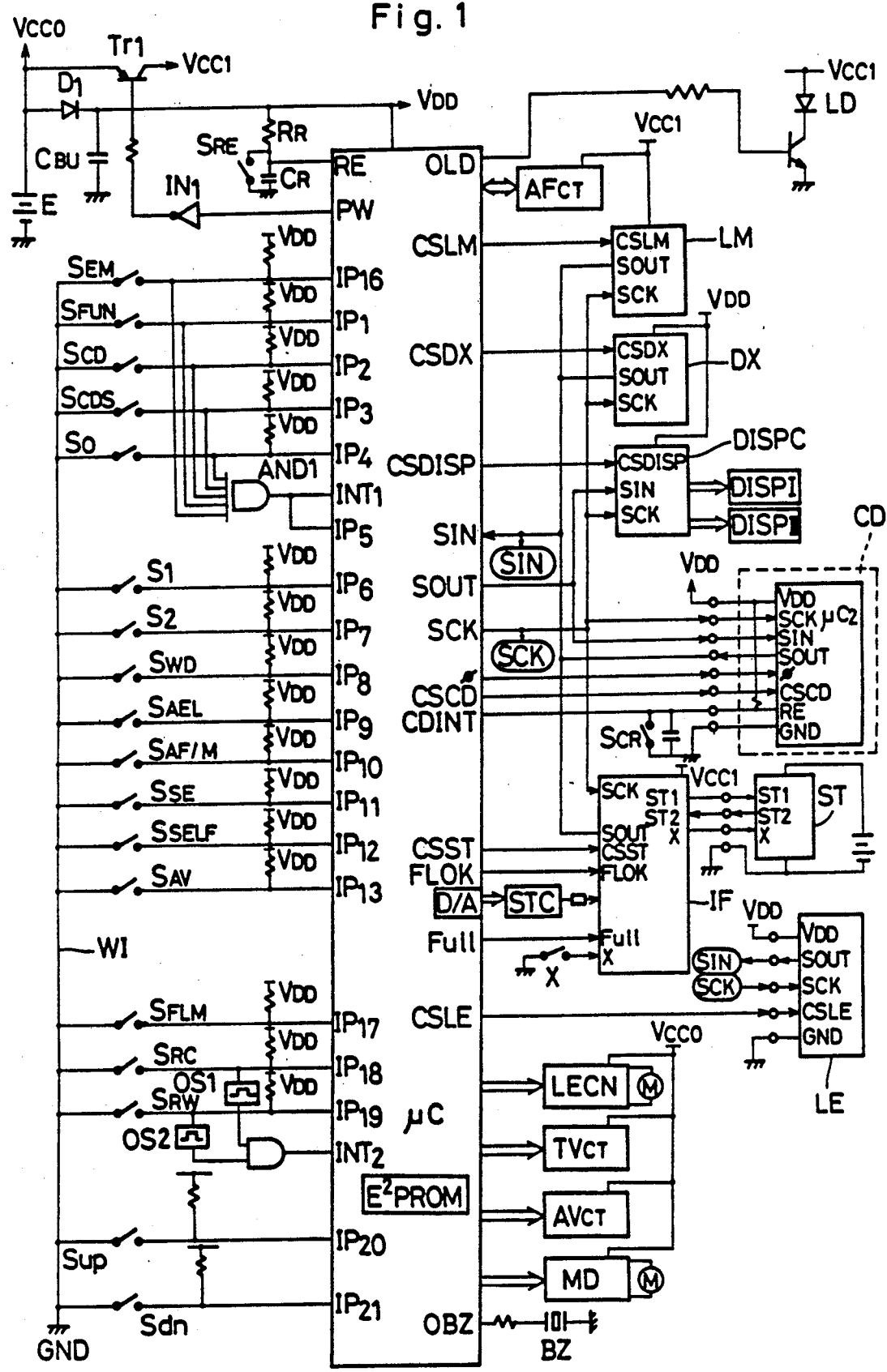
FIG. 1 is a circuit diagram of a camera system constructed according to the present invention.

FIG. 1 is a circuit block diagram of a camera system of this embodiment. In this FIG. 1, a micro-computer μC performs control and various calculations of the camera. The micro-computer μC comprises an Electrically Erasable Programmable Read Only Memory (EEPROM or E²PROM).

A focus condition detecting circuit AFct detects the focus condition, and includes: a Charge Coupled Device (CCD); an integration control circuit for controlling integration of charge produced in CCD; and an analog-to-digital converting circuit. It receives information of subjects from three distance measuring areas (described later), and converts this information from analog to digital value (A-D) to output it to the micro-computer $\mu C$. $LD_1$ is an auxiliary light for assisting the focusing operation in the dark.

A light measuring circuit LM performs measurment of light at four areas (described later), and A/D-converts the measured light values to give them to the micro-computer $\mu C$ as luminance information. A display control circuit DISPC receives display data and a display control signal from the micro-computer $\mu C$ and causes various displays in a display panel on the camera body (DISP$_I$) and in a display area in the viewfinder (DISP$_{II}$).

Figure 45:
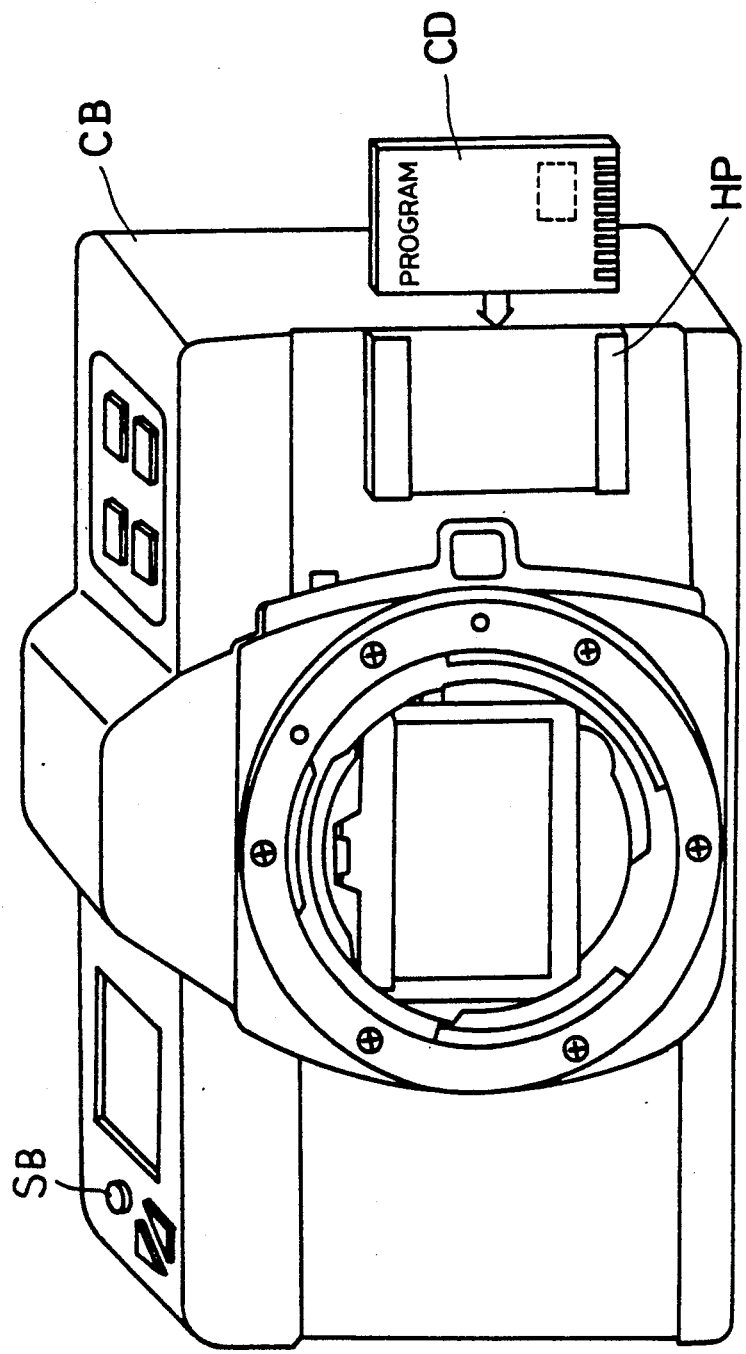
FIG. 45 is a perspective view of a camera body with an IC card attachable to it.

FIG. 45 shows an arrangement in which an IC card CD is attachable to the camera body CB through a cardholder HP. The IC card CD is electrically connected to the camera body CB when it is attached to the camera body CB.

In this embodiment, IC cards include two kinds of cards: a mode setting card for setting various modes of the camera; and a program card for determining an exposure. Only one of them can be attached to the camera body CB. The camera controls various functions is appropiate modes based on the IC card attached. Detailed descriptions are made later. An interface IF is installed between the micro-computer $\mu C$ of the camera and an electric flash apparatus ST. A flash light adjusting circuit STC receives the flash light reflected by subjects which comes through an interchangeable lens, and stops the flashlight emission when the exposure quantity reaches a preset value. A lens circuit LE is installed in an interchangeable lens, which outputs information peculiar to the lens to the micro-computer $\mu C$ of the camera. A lens control circuit LECN drives the lens based on information about detected focus condition. A shutter control circuit $TV_{CT}$ controls the shutter based on a control signal from the micro-computer $\mu C$. An aperture controlling circuit $AV_{CT}$ controls the diaphragm aperture based on a control signal from the micro-computer $\mu C$. A motor control circuit MD controls winding and rewinding of a film based on a control signal from the micro-computer $\mu C$. A buzzer BZ is provided for giving an alarm when the shutter speed becomes too slow to cause blur. Symbol E designates a battery for power supply, symbol $D_1$ designates a diode for blocking reverse current, and symbol $C_{BU}$ designates a large-capacity condenser for backing up the micro-computer $\mu C$. Symbols $R_R$ and $C_R$ designate a resistor and a condenser respectively for resetting the micro-computer $\mu C$ when the battery is attached. Symbol $Tr_1$ designates a transistor for controlling a power supply to the above-described circuits.

Next, description is made for switches. A battery attachment switch $S_{RE}$ is turned OFF when the battery is attached. When the switch $S_{RE}$ turns OFF, a signal changing from the "L" level to the "H" level is applied to a terminal RE of the micro-computer $\mu C$, and thereby the micro-computer $\mu C$ is triggered to execute a resetting routine as described later. An exposure mode changing switch $S_{EM}$ normally opens. The exposure mode is changed by operating both this switch $S_{EM}$ and an up switch Sup or a down switch Sdn as described later. A function changing switch $S_{FUN}$ normally opens. A change of function (for example, change between continuous-shot AF mode and one-shot AF mode) is performed by operating both this switch $S_{FUN}$, and the up switch Sup or down switch Sdn. A card function enable/disable switch $S_{CD}$ normally opens. This switch $S_{CD}$ is operated to change between enable and disable of the card function when a card is attached to the camera body. When a mode-setting card is attached and a data-setting mode is selected, a data-changing item is selected by this switch $S_{CD}$. Further by operating the up switch Sup or down switch Sdn, desired value is set in the data changing item (detailed later).

$S_{CDS}$ is a card-data setting switch which is used: to change modes when a mode-setting card is attached to the camera; and to set data necessary to the function when a function card (program card) is attached.

A photometric switch $S_0$ is operated to perform photometry for various operations of the camera except an automatic-focusing (AF). This switch $S_0$ turns ON by just touching the operation button SB (FIG. 45). When one of the above-mentioned switches $S_{EM}$, $S_{FUN}$, $S_{CD}$, $S_{CDS}$ and $S_0$ is turned ON, the micro-computer $\mu C$ executes an interrupt routine $INT_1$ in FIG. 3 as described later. An AF switch $S_1$ starts an AF operation. This switch $S_1$ is turned ON by slightly depressing (a first stroke) the operation button SB. A release switch $S_2$ trigger a photographing operation, and it is turned ON by depressing a second stroke (deeper than the first stroke) of the operation button SB. A one-frame switch $S_{WD}$ turns ON when one frame of a film is wound. An AE lock switch $S_{AEL}$ for performing an AE lock (exposure condition lock) is a normally-opened push-type switch. A focusing mode changing switch $S_{AF/M}$ changes between the AF and manual-focusing.

A normally-opened change-data selecting switch $S_{SE}$ is operated to select data to be changed. A self-timer switch $S_{SELF}$ is used to take a self-portrait (self mode switch). An aperture changing switch $S_{AV}$ is used to change the aperture value when used in combination with the up switch Sup or down switch Sdn in M (manual) mode. If the up switch Sup or down switch Sdn is operated in M mode without this switch $S_{AV}$, shutter speed is changed.

A film detecting switch $S_{FLM}$ detects whether or not a film is loaded in the camera body. This switch $S_{FLM}$ is placed on a film-rail surface in the vicinity of a spool chamber, and turns OFF when film exists there.

A rear lid close detecting switch $S_{RC}$ turns ON when the rear lid is closed and turns OFF when opened. When this switch turns ON, the micro-computer $\mu C$ executes an interrupt routine as described later. A rewinding switch $S_{RW}$ for starting rewinding of the film turns ON when it is operated, and the interrupt routine (described later) is executed. When the rear lid is opened, it turns OFF. An IC card attachment switch $S_{CR}$ turns OFF when an IC card CD is attached to the holder HP. A micro-computer $\mu C_2$ of the IC card CD is reset when the switch $S_{CR}$ turns OFF. The X-contact X turns ON when the first-curtain of the shutter clears the frame, and turns OFF on charging the shutter.

Up switch Sup performs change or addition of data, and down switch Sdn performs change or subtraction. The switches Sup and Sdn respectively increases and decreases aperture value if they are operated in combination with the aperture changing switch $S_{AV}$ in M mode. They change shutter speed if they are operated alone (i.e. $S_{AV}$ is OFF) in M mode. However, when the appropriate function change is performed by an IC card, the up and down switches Sup and Sdn work differently (i.e change aperture value with $S_{AV}$ OFF, and change shutter speed with $S_{AV}$ ON). An operation of the up switch Sup or the down switch Sdn is detected by that a terminal Isup or a terminal Isdn has become the "L" level, respectively.

In FIG. 1, a line WI connected in common with the above-mentioned respective switches is connected to the ground GND.

Table 1 shows the above-described respective switches and their functions in the lump.

Next, prior to making description on operations of this camera, description is made for two kinds of IC cards used here, namely, the mode-setting card and the program card.

(I) Mode-setting card

This IC card purpose is to provide the camera, responding to the intention and photographing technique of a photographer, selection of functions necessary for the photographer from among many functions (controllable functions) of the camera, or selection of a mode in a function. Also, since unnecessary functions for a certain photographer can be omitted by this feature, the camera has simplified and good operability for the photographer. Next, description is made for this card and the contents of the display performed relating to it.

This IC card provides following seven kinds of function-selecting options (i)–(vii).

(i) Selection among following four functions:
 (a-1) highlight-reading/shadow-reading (H/S) exposure-mode changing function,
 (a-2) exposure adjusting function,
 (a-3) film winding-up mode (continuous-advancing/single-frame advancing) changing function, and
 (a-4) single-spot AF/multi-spot AF mode changing function.

Figure 2A:
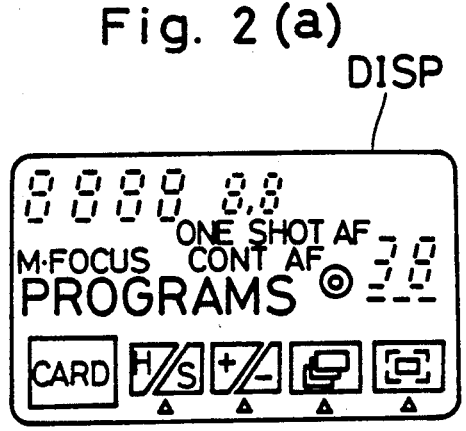
FIGS. 2(a) to 2(v) are examples of camera body display.
Figure 2B:
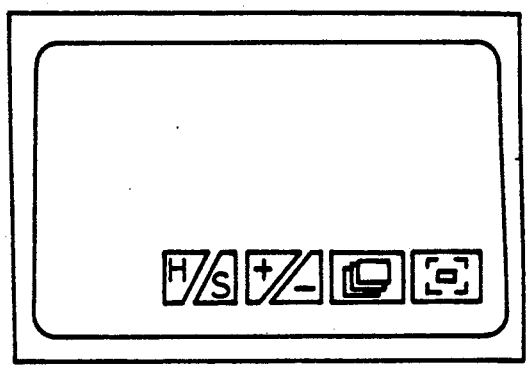
Figure 2C:
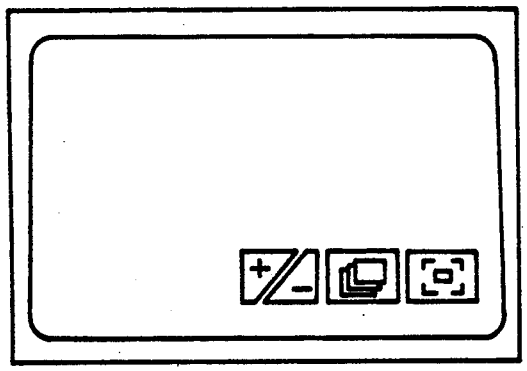

The photographer can choose function(s) from among these. For indicating these four functions, the display parts as shown in FIG. 2(b) are prepared among all display (DISP$_I$) on the camera body CB as shown in FIG. 2(a). In FIG. 2(b), the four display parts correspond respectively to the functions (a-1) through (a-4). When the photographer does not require the highlight-reading/shadow-reading exposure mode changing function (a-1), display is performed as shown in FIG. 2(c).

Figure 2D:
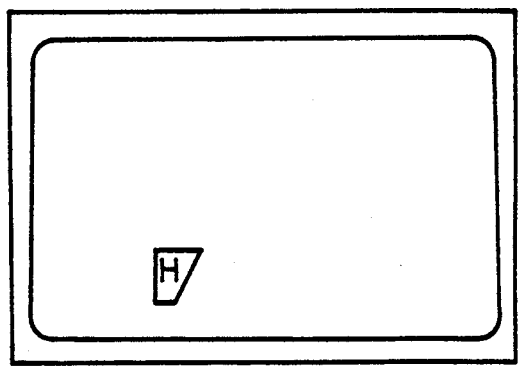
Figure 2E:
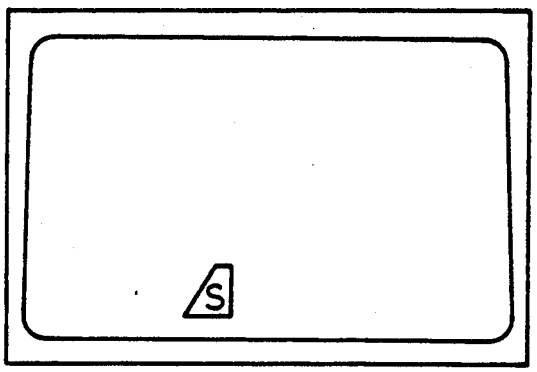
Figure 2F:
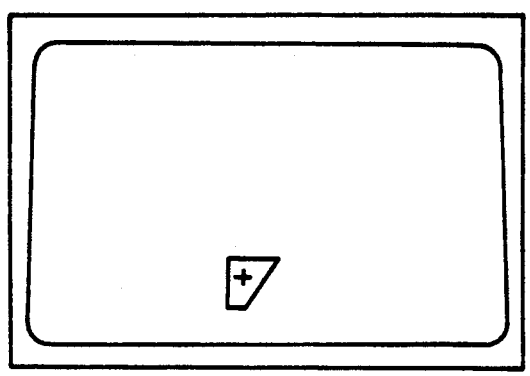
Figure 2G:
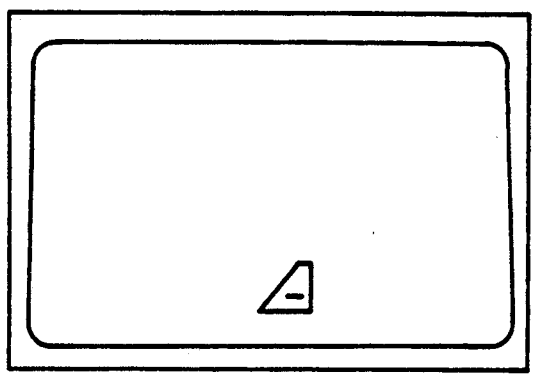
Figure 2H:
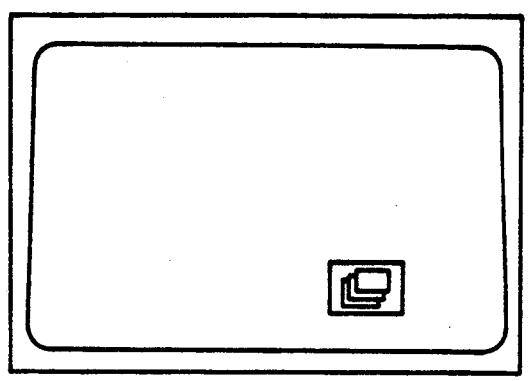
Figure 2I:
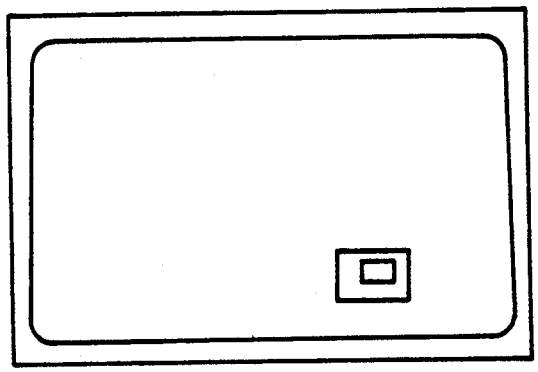
Figure 2J:
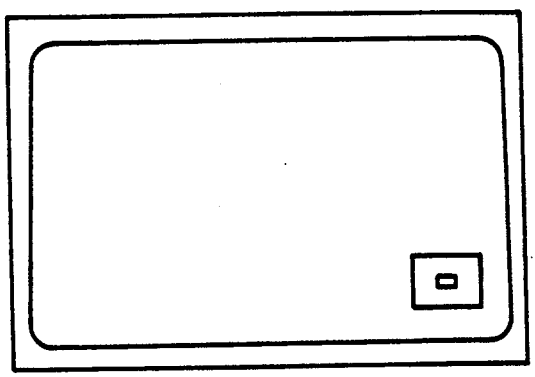
Figure 2K:
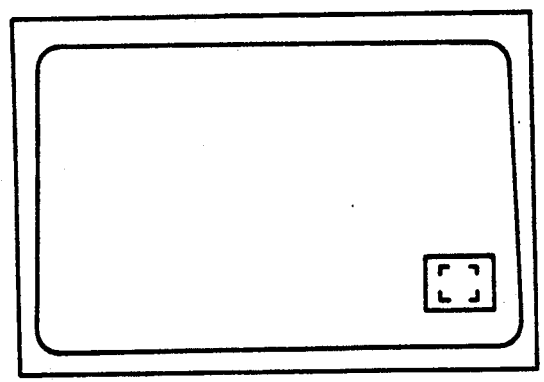

Displays relating to the modes of the functions are as follows:

Highlight-reading—FIG. 2(d)
Shadow-reading—FIG. 2(e)
Exposure adjustment +direction—FIG. 2(f)
Exposure adjustment −direction—FIG. 2(g)
Continuous-advancing mode—FIG. 2(h)
Single-frame advancing—FIG. 2(i)
Single-spot AF—FIG. 2(j)
Multi-spot AF—FIG. 2(k)

Figure 2L:
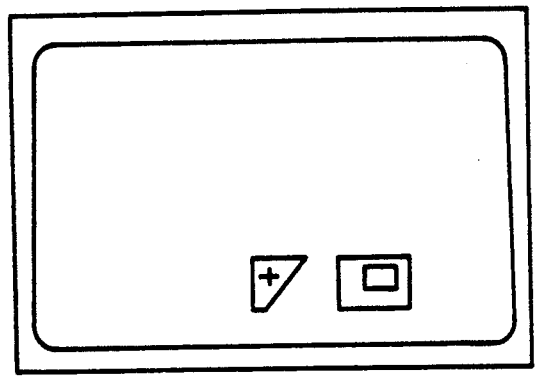

FIGS. 2(h), 2(i) and FIGS. 2(j), 2(k) respectively show the mode that is selected by the photographer only when the mode is changeable. Therefore, when the camera system does not allow the photographer to change the mode by the proper reason, such displays (neither mode display) do not appear even though the camera system adopts either mode. Exception to this rule is: the multi-spot/single-spot photometry mode when one is seleted by a program card, and mode selected by the lens switch $S_Q$. A display as shown in FIG. 2(l) shows that the exposure adjusting function and the film winding-up mode changing function are selected, and control of the exposure adjustment to +direction and the one-shot mode are currently effective.

When the function-selecting operation is performed, selectable combinations of functions among the above four (a-1)–(a-4) are limited to 16 (No. 0–15 in Table 2(a)). Each combination appears sequentially as the up switch Sup or down switch Sdn is operated. FIG. 2(b) shows combination No. 0 in which all functions are selected, and for example FIG. 2(c) shows combination No. 8 in which only H/S mode-changing function is missing.

(ii) Selection among the following four exposure modes:
 (b-1) Program mode (P mode),
 (b-2) Aperture priority mode (A mode),
 (b-3) Manual mode (M mode), and
 (b-4) Shutter priority mode (S mode).

The P mode is incorporated without fail as the base mode, and a combination of the remaining three modes (A, M and S modes) can be selected. Accordingly, there are eight combinations as follows:

| No. | Mode Combination |
|---|---|
| 0 | P A M S |
| 1 | P M S |
| 2 | P A S |
| 3 | P A M |
| 4 | P A |
| 5 | P S |
| 6 | P M |
| 7 | P |

Figure 2M:
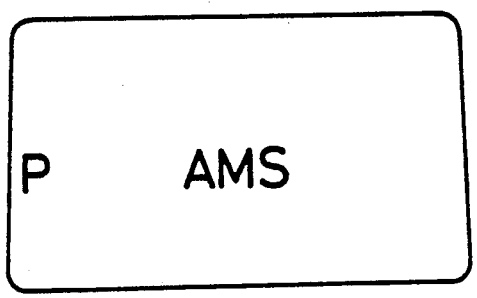
Figure 2N:
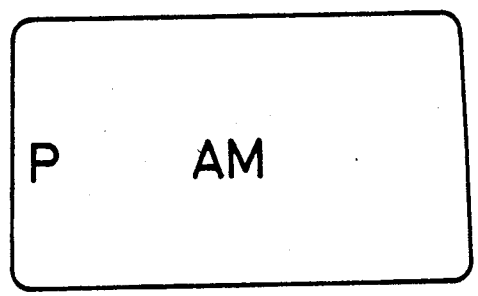
Figure 2O:
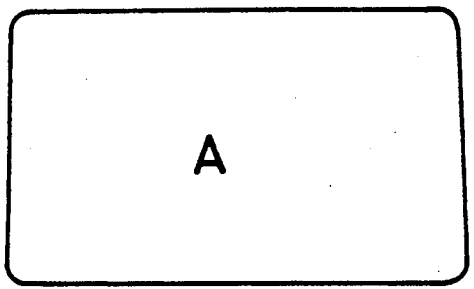
Figure 2P:
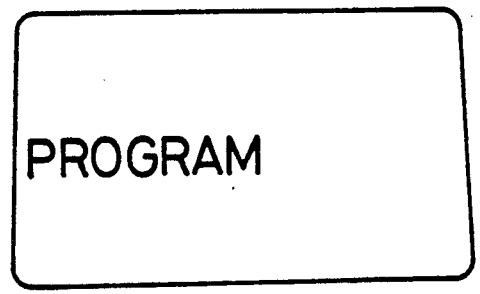

As to the display, among the four mode designations in FIG. 2(m), the selected combination is displayed, for example, as shown in FIG. 2(n) at mode setting. Display of only one selected exposure mode (A mode in FIG. 2(o)) appears at photographing. PROGRAM is specially displayed in the case of the P mode (FIG. 2(p)).

(iii) Selection of functions relating to the AE
 (c-1) Function of AE-lock switch $S_{AEL}$
  (1) AE is locked with power of the camera held while the AE-lock button is pushed.
  (2) AE is loked when the AE-lock button is once pushed, and released when it is pushed again.
 (c-2) Changing the changing-step of shutter speeds
  Changing-step of the shutter speeds is changed from normal 1 Ev to ½ Ev.
 (c-3) Sub-mode change in the M-mode of the exposure mode between
  (1) M$_2$-mode in which: when the aperture-changing switch $S_{AV}$ is OFF, the aperture value is changed only by the operation of the up-switch or down-switch; when the aperture-changing switch $S_{AV}$ is ON, the shutter speed is changed, and
  (2) M$_1$-mode in which: when the aperture-changing switch $S_{AV}$ is OFF, the shutter speed is changed; when the aperture changing switch $S_{AV}$ is ON, the aperture value is changed.

Figure 2Q:
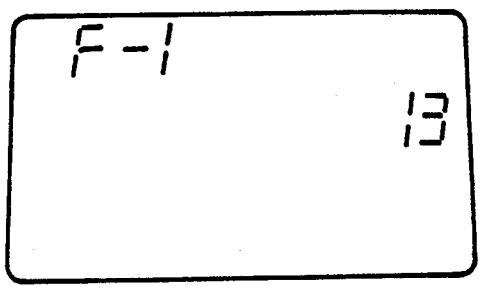
Figure 2R:
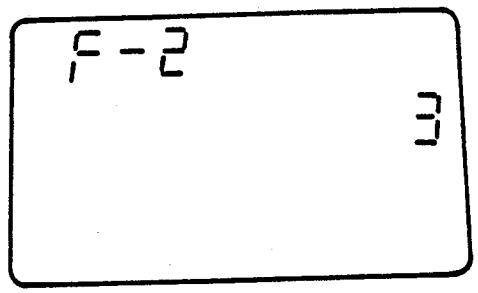
Figure 2S:
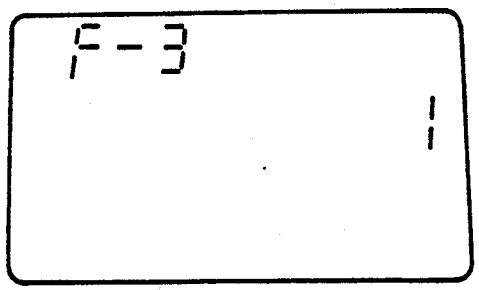
Figure 2T:
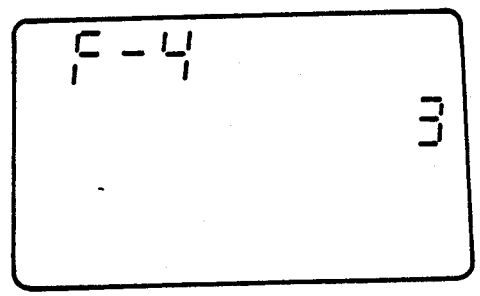
Figure 2U:
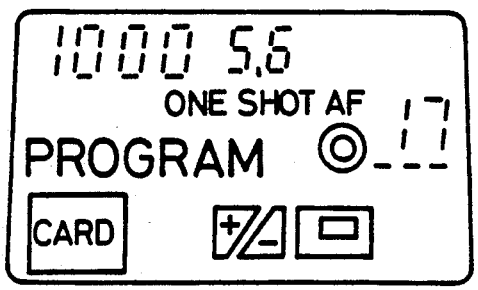
Figure 2V:
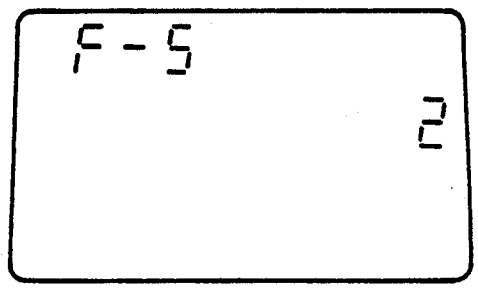

When setting these functions, display as shown in FIG. 2(v) appears, where the last three digits usually used for the shutter-speed display are used for indicating the mode change and the film counter display part is used for indicating the sub-mode. In FIG. 2(v), "F-5" indicates the mode change, and the number "2" indicates the combination as listed in Table 2(e).

(iv) Selection between two modes below
(d-1) count-up or count-down of a film counter,
(d-2) auto-return or non-auto-return at the completion of the film winding,
(d-3) film leader part is wound into the film cartridge or left outside the cartridge at the completion of rewinding, and
(d-4) operation or non-operation of a blur-warning buzzer BZ.

Sixteen combinations of the modes in the above functions as shown in Table 2(b) are possible, and the display is performed as shown in FIG. 2(q). Similarly to the above case, the shutter speed display part is used for the function indication and the film counter display part is used for the combination number as listed in Table 2(b).

(v) As for the selection of functions by the operation of the switch $S_Q$ on the lens, following AF (auto-focusing) modes are selectable.
(i) When the lens switch is not operated and the AF-mode is selected
(E-1) One-shot AF (focus-following determination after once focused) at the multi-spot (continuous AF may be selected in the program mode)
(ii) When the lens switch is operated
(E-2) Focus-lock
(E-3) Single-spot AF
(E-4) Continuous-AF These are indicated as shown in FIG. 2(r), where "F-2" indicates the selection by the lens switch $S_Q$, and "3" indicates the (continuous AF) mode number. The selected numbers and their corresponding functions are listed in Table 2(c).

(vi) Setting the length for the self-timer

The time length is selected among 2, 5 and 10 seconds. This selection is indicated as shown in FIG. 2(s), where "F-3" indicates the self-timer setting and "1" indicates the set timer length (in this case, 5 seconds). The numbers and the set timer lengths are listed in Table 2(d).

(vii) Changing the AE-level

This changes the exposure level by a certain amount. The amount can be selected among +0.5, +0.25, 0, −0.25, −0.5 (Ev), Which are numbered as 0, 1, 2, 3, 4, respectively. This is displayed as shown in FIG. 2(t), where "F-4" indicates the AE-level changing mode, and "3" indicates that the AE-level is changed by −0.25 Ev.

By operating the switch $S_{CD}$, the functions (i)–(vii) are cyclically selected, and by pushing the up-switch or the down-switch, a mode in the selected function can be set. The modes in a function are also cyclically selected by the up- or down-switch.

(II) Program card

This program card performs control of an exposure program made for the purpose of photographing at a high shutter speed without causing a blur for a moving subject at a bright place. In addition, the program card performs various controls of the camera (detailed description is made later).

Next, description is made for operation of the camera based on flowcharts of the micro-computer $\mu C$ as shown in the drawings, and description is made for each part of the flowcharts.

DESCRIPTION FOR THE OPERATION

Figure 4:
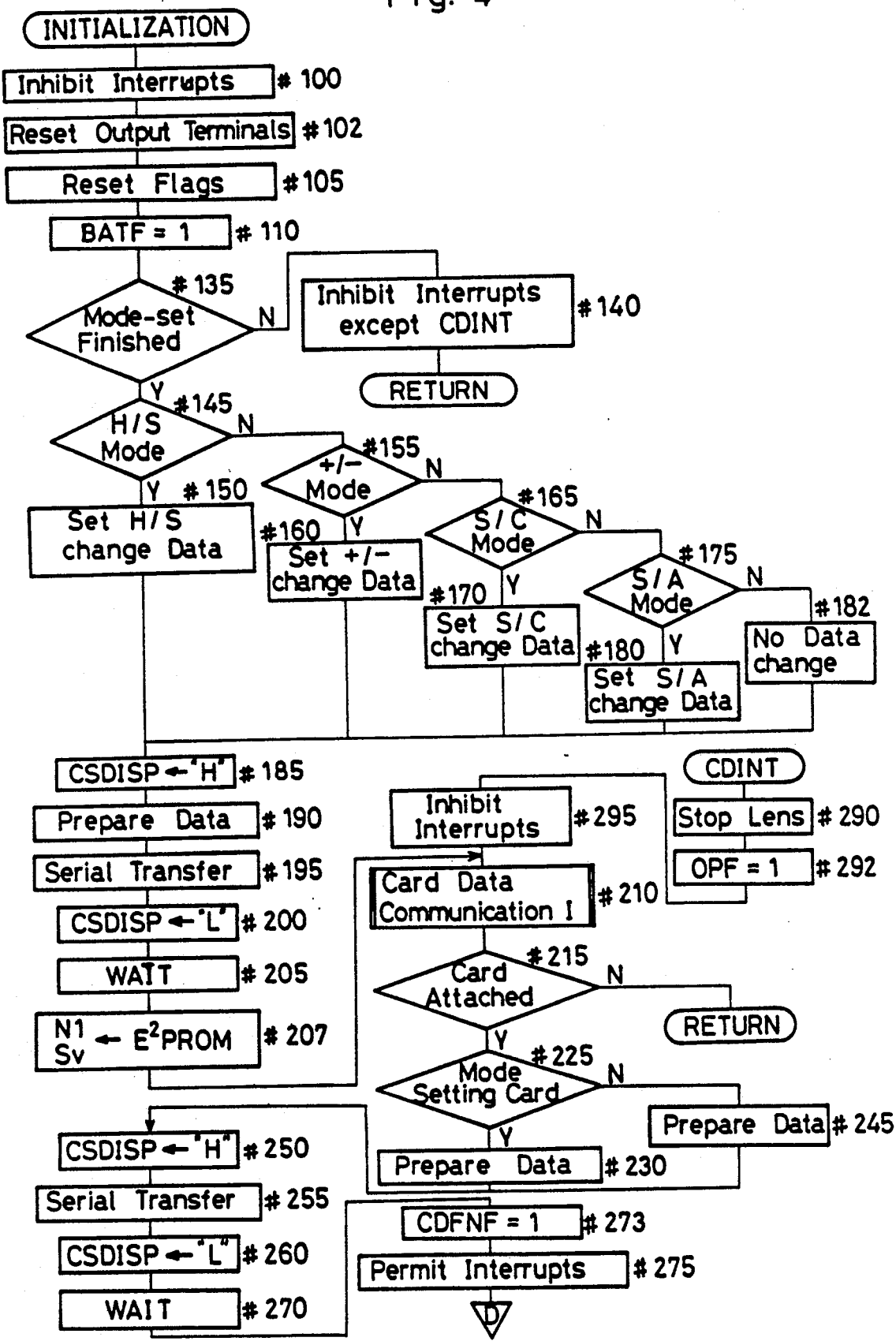
FIG. 4 is a flowchart of the initialization routine in FIG. 3.

When a battery E is attached to the camera body, the battery attachment switch $S_{RE}$ turns OFF, and a signal changing from the "L" level to the "H" level is inputted to a terminal RE. A clock oscillator, which is provided in the micro-computer $\mu C$, starts oscillation in response to the entry of the signal, and the clock signal is sent also to the IC card CD through a terminal $\phi$. Then, the micro-computer $\mu C$ executes a RESET routine as shown in FIG. 3. In this routine, first, the micro-computer $\mu C$ performs initialization due to the attachment of the battery (step #5). FIG. 4 details this subroutine.

In FIG. 4, first, the micro-computer $\mu C$ inhibits all interrupts to this routine, and resets all output terminals to the "L" level (#100 and #102). Also, it resets all flags in a random access memory (RAM) prepared in the micro-computer $\mu C$ (#105) and sets a flag BATF showing attachment of the battery (#110). Table 3 lists the functions attached to the flags in the RAM. Throughout this embodiment, set and reset of flags correspond respectively to 1 and 0 of the bits. Since all the flags except BATF are reset, the exposure mode is set to the P mode, the single-spot (S)/multi-spot AF (A) is set to the multi-spot AF mode (A), and the one-shot (S)/continuous-shot (C) is set to the one-shot mode (S), and the mode performing neither exposure adjustment or highlight (H)/shadow (S) is set.

Next, it is detected by checking the content of the $E^2$PROM, (content of $MSb_4$, specifically, as described later) whether or not the mode-setting card (one of the above-described two kinds of the IC cards) has been attached once and mode setting has been already performed. Then, if the setting has not been made, interrupts except an interrupt CDINT due to an attachment of the IC card are inhibited (#135, #140), and thereafter processing returns. If the mode setting has been made, the set mode is read out from the contents of the $E^2$PROM (specifically, contents of $MSb_0$–$MSb_3$ as described later), and the display of the change data is determined.

It is sequentially detected whether or not the mode is set in the highlight/shadow mode (H/S mode), the exposure adjusting mode (± mode), the single-frame/continuous advancing changing mode (S/C mode), and the single-spot/multi-spot AF changing mode (S/A mode), and if any modes is set, each change data of the set mode is set (#145–#182). Table 4 and Table 5 show setting mode data of the $E^2$PROM and change data of the RAM, respectively. As to the display, the above-mentioned steps (#145–#182) are equivalent to positioning of a cursor as described later.

Next, control for sending data to a display control circuit DISPC is executed to display these setting modes. First, a terminal CSDISP is set to the "H" level to inform the start of data communication to the display control circuit DISPC, data as shown in Table 9 is prepared, and serial communication is performed. When data transfer is completed, the terminal CSDISP is set to the "L" level, to inform completion of the serial communication to the display control circuit DISPC (#185–#200).

Here, brief description is made on the operation of serial communication. First, the clock signal is outputted from a serial clock terminal SCK in response to an instruction of serial communication. In synchronism with the rise of a pulse of this clock signal, the output side outputs data by one bit, and in synchronism with the fall, the input side inputs one bit data. By repeating this operation as necessary, the serial communication is performed. FIG. 2(u) shows an example of display in the normal photographing state.

The contents of display include, in an example shown in FIG. 2(u), the shutter speed [1000], the aperture value [5.6], the AE mode [PROGRAM], the count of film frames (it can also indicate presence or absence of film) [17], focusing mode [ONE SHOT AF], and the function mode (indicated by the bottom figures).

These display data are listed in Table 9, and the following explanation accords to the display control sequence. The display data are read out of the E$^2$PROM where: at the address 03H, bits $b_2$–$b_4$ indicate AE-mode selected by the IC card CD; at 04H, bits $b_0$–$b_7$ indicate mode-setting by the IC card CD; at 08H, bits $b_4$–$b_7$ and at 09H, bits $b_0$–$b_7$ indicate the selected numbers of the change modes (iv)–(vii) set by the IC card CD. The data are set at appropriate addresses. The data-change display data ($b_0$–$b_2$ of 05H), the data indicating the battery attachment ($b_4$=1 in 0AH) and other data ($b_1$–$b_3$, $b_5$, $b_6$=0 in 0AH) are set at appropriate addresses.

When the battery attachment signal is received, the display control circuit DISPC displays as the figures of from FIG. 34(a) to FIG. 34(e), corresponding to the function data in the E$^2$PROM, on the display panel DISP$_I$ for 0.5 seconds.

The micro-computer μC waits 2.5 seconds at step #205 to allow the above displays of FIGS. 34(a)–(e). Then, the frame number $N_1$ (MSb$_{13}$–MSb$_{18}$) and the film speed (sensitivity) Sv (MSb$_{19}$–MSb$_{24}$) are read out from the E$^2$PROM and stored in the corresponding region to $N_1$ and Sv of the RAM at step #207. At the following step #210, a card data communication I is performed to check whether a card is attached and, if attached, to check its kind.

Figure 5A:
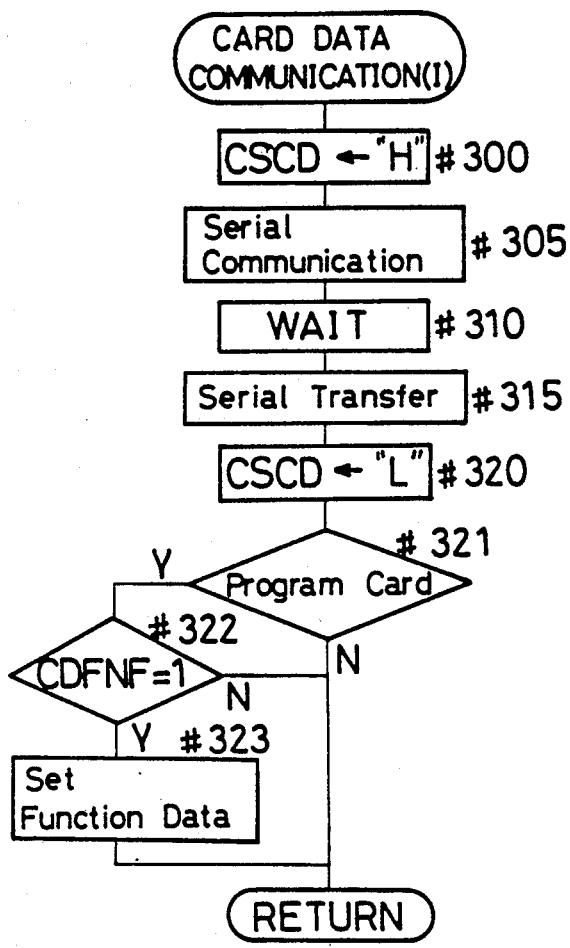
FIGS. 5(a) to 5(c) are flowcharts of data communications (I) to (III), respectively between the camera and an IC card attached thereto.

FIG. 5(a) shows the card data communication I subroutine. In this FIG. 5(a), first, a terminal CSCD is set to the "H" level to inform the IC card CD side the start of a communication, by which the data outputting mode is set, and data showing the data communication I (Table 6) is sent to the IC card CD side by serial transfer (#300 and #305).

The micro-computer μC waits for a predetermined time necessary for the IC card CD side to input this data, prepare required data and output them (#310). Then, the data are serially sent from the IC card CD side to the micro-computer μC (#315), and therefore the micro-computer μC operates in the inputting mode. On completing this serial transfer, the terminal CSCD is set to the "L" level (#320).

In this operation, the IC card CD side outputs 2-byte data: the first byte indicates presence/absence of the IC card and, if present, its kind; and the second byte indicates functions for the camera operation. The two bytes are stored in the camera at addresses 20H and 21H.

Next, the kind of the IC card is discriminated in step #321. Here, in the case of the mode setting card, the transferred data show only the kind of the IC card (the second byte is "0") and therefore processing returns immediately. However, in the case of the program card, the transferred data contain function data showing either one of each of continuous-/one-shot mode of the AF (detailed description is made later), single-spot/-multi-spot of the AF, single-spot/multi-spot of the photometric zone or data showing that no selection is made (i.e. to be set by the photographer), so, judgment is made on whether or not the card function has been selected (#322). When the card function is selected (CDFNF=1), data setting is made by updating bits Fb$_2$, Fb$_3$, Fb$_8$ and Fb$_{12}$ of the function data (#323), and processing returns. On the other hand, when the card function is not selected, processing returns without updating the data.

Figure 35A:
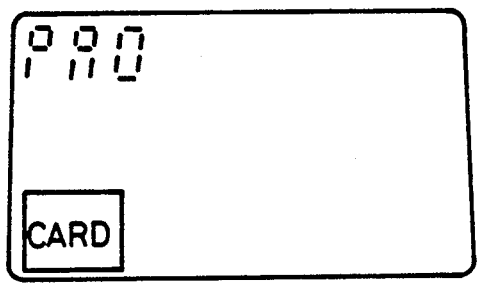
FIGS. 35(a) and 35(b) show displays when a program card and mode setting card are respectively attached.

Reverting to FIG. 4, in step #215, the micro-computer μC determines from the inputted data (Table 7) whether or not the IC card is attached, and when it is not attached ($b_0$=0 in 20H), processing returns without displaying the kind of the IC card. When the IC card is attached ($b_0$=1 in 20H), the micro-computer μC determines the kind of the IC card, and in the case of mode-setting card ($b_1$=1 in 20H), it prepares display data ($b_0$=0 in 08H) for this data card (#230), while in the case of program card ($b_1$=0 in 20H), it prepares display data ($b_0$=1 in 08H) for program card (#245). When the card function is ON ($b_0$=1 in 04H) and the control signal 0AH=0, 0, 0, 1, 0, 0, 0, 0 (which respectively correspond to $b_0$–$b_7$), all the display data are outputted to the display control circuit DISPC (#250–#260), which displays, as shown in FIGS. 35(a) and (b), for a preset period (0.5 seconds) according to the kind of the IC card. FIG. 35(a) is displayed when a program card is attached, and (b) when a mode setting card is attached. In the case of mode setting card, the card function is automatically set ON, so that the data is prepared and sent.

The micro-computer μC waits for the preset time (0.5 seconds) for this display (#270), sets a flag CDFNF which indicates that the card functions are operable (#273), and thereafter permits all interrupts (#275), proceeding to step #10 in FIG. 3.

In FIG. 3, after completing the above-mentioned initialization (#5), judgment is made in step #10 by the level of a terminal IP$_5$ on whether or not any of the exposure mode changing switch S$_{EM}$, the function changing switch S$_{FUN}$, the card function enable/disable switch S$_{CD}$, the card data setting switch S$_{CDS}$ and the photometric switch S$_O$ is turned ON. When none of the switches is turned ON (IP$_5$="H"), in step #15, further judgment is made on whether or not the battery attachment flag BATF is set. When it is set, it is assumed that processing comes to this step without performing anything after attaching the battery, and processing jumps to step #45, and the micro-computer μC ceases display and stops the operation by the IC card CD in steps #45 et seq. First, the display data is set to be 0, 0, 1, 0, 0, 0, 0, 0 at 0AH, and the data is sent to the display control circuit DISPC (#45–#60). Accordingly, the whole display ceases.

The micro-computer μC, as described above, sends the ceasing data to the display control circuit DISPC, and then sends a sleep sign (instruction of temporarily disabling the IC card) signal to the IC card CD (#65–#75). As shown in Table 6, this sleep sign includes both bits Csb$_0$ and Csb$_1$ of 1.

Thereafter, a transistor Tr$_1$ is turned off by turning a terminal PW to "L", a flag AELF showing AE-lock and the flag BATF showing bettery attachment are reset respectively, all interrupts are permitted, and processing halts (#77–#95). The clock also stops oscillation by this halt.

In the above-mentioned step #10, if at least one of the five switches S$_{EM}$, S$_{FUN}$, S$_{CD}$, S$_{CDS}$ and S$_O$ is ON, processing proceeds to step #91, and the flag BATF showing battery attachment is reset, and in the next step #92, a flag OPF showing that one of the five switches is operated is set, and a routine SO is executed, and processing returns to step #10. The routine SO performs photometry, AF, display, exposure control and the like, whose detailed description is made later.

In step #10, when none of the above-mentioned five switches is ON and the battery is not attached (BATF=0), judgment is made on whether or not the flag OPF is set (#15, #25). This flag OPF is set when processing has passed through the routine SO once. When this flag is set, a timer $T_1$ for power-hold is reset and started, and the flag OPF is reset (#30, #35). Here, the timer $T_1$ is reset and started (#30) because power-hold must be prolonged by a predetermined time for a possible second turn-on of the switch although processing has passed through the routine #93 once from step #10 through steps #91 and #92, and at present none of the above-mentioned five switches is depressed. The flag OPF is reset at step #35 in order to show that processing has passed through step #30.

When the flag OPF is not set in step #25, processing skips steps #30 and #35 and proceeds to step #40, where it is determined whether or not 10 seconds have elapsed from the start of the above-mentioned timer. When 10 seconds have elapsed, processing proceeds to steps #45 et seq., and performs ceasing of the display and disabling of the IC card CD. When 10 seconds have not elapsed, processing goes to step #93 for repeating the routine SO.

Figure 35B:
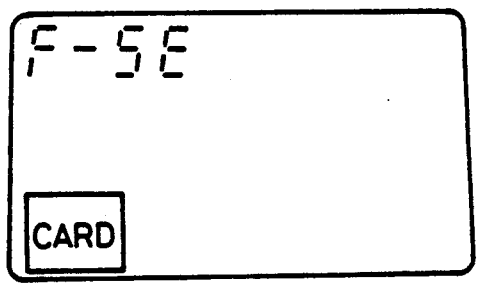

Next, description is made for control of the camera when the IC card CD is attached. When the IC card is attached, a signal turning from the "L" level to the "H" level is inputted to a terminal CDINT of the micro-computer $\mu C$, and an interrupt routine CDINT as shown in FIG. 4 is executed. When processing enters this routine, the micro-computer $\mu C$ stops lens driving and sets the flag OPF to hold power (#290, #292). Then, in order to preferentially display the kind of the attached card, all interrupts to this flow are inhibited in step #295, and processing proceeds to step #210. At steps #210 et seq., the kind of the IC card is displayed, as described above, for a predetermined time as shown in FIGS. 35(a) or 35(b), the flag CDFNF is set to permit all interrupts, and processing returns to the parent flow (step #30 in FIG. 3). When any one of the switches $S_{EM}$, $S_{FUN}$, $S_{CD}$, $S_{CDS}$ and $S_O$ is ON and a signal turning from the "H" level to the "L" level is inputted when the interrupts are permitted, processing enters an interrupt $INT_1$ as shown in FIG. 3, and executes the flow of steps #90 et seq.

When any of the interrupts $INT_1$, $INT_2$ and CDINT is applied in the halt state, the clock starts oscillation, and the clock signal is sent through the contact $\phi$ to the IC card.

Next, description is made on the routine SO triggard by the switch $S_O$ referring to FIG. 6(a).

Figure 7:
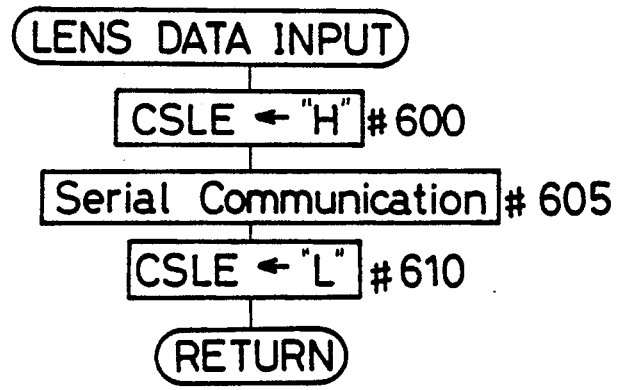
FIG. 7 is a flowchart of a routine of lens data input.
Figure 36:
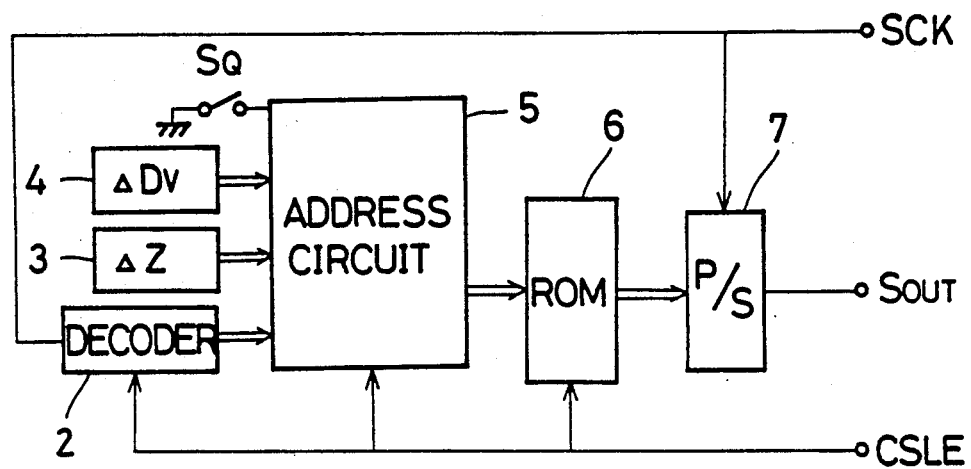
FIG. 36 is a block diagram of a lens circuit.
Figure 37:
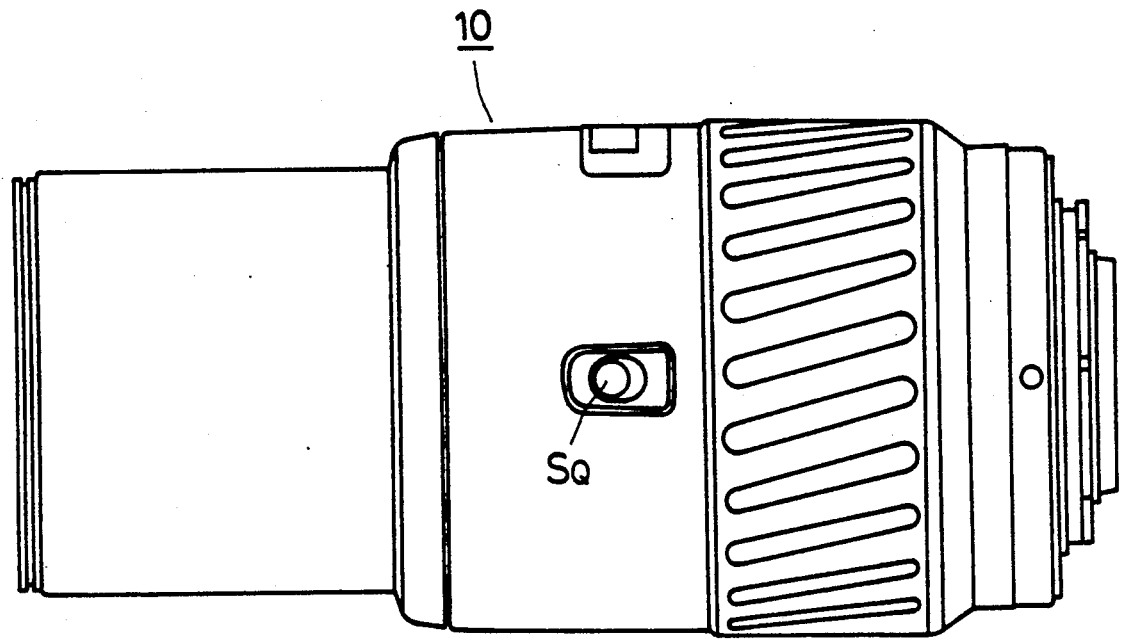
FIG. 37 is a side view of a lens.

First, the interrupt $INT_1$ to routine SO is inhibited (#400). This is because if the interrupt $INT_1$ of FIG. 3 is applied during the control of this routine $SO_1$ control operation does not proceed forward. Next, by setting the terminal PW of the micro-computer $\mu C$ to the "H" level in step #405, the positive voltage is applied to the base of the PNP transistor $Tr_1$ through an inverter $IN_1$, and thereby this transistor $Tr_1$ turns on, and power is supplied to the photometric circuit LM, the AF circuit AF $_{CT}$ and other circuits. Next, information peculiar to the attached lens is inputted from the lens circuit LE to the micro-computer $\mu C$ (#410). This routine is shown in FIG. 7, and is explained as follows. First, a terminal CSLE is set to the "H" level (#600), and a serial communication is performed to input data from the lens (#605). FIG. 36 shows the circuit provided in the lens. Clock pulses from the camera body are counted in a decoder 2 and an address data is generated. When the address data is equal to a predetermined address, it indicates a lens data that changes according to a zooming operation or a lens data that changes according to a set focus distance. At that time, the focal length or the set focus distance is detected by the corresponding encoder 3 or 4, and the address is changed according to the detected data by an address circuit 5. Then the necessary data is sent to the camera body. As shown in FIG. 37, the lens 10 has a switch $S_Q$. For different states of the switch $S_Q$, different addresses shold be assigned by the addressing circuit 5. The addresses are sent to a ROM 6 of the lens circuit, and the ROM 6 outputs data corresponding to the addresses. The data is output in parallel from the ROM 6 but is converted into serial signal by a parallel/serial converter circuit (P/S) 7 to be sent to the camera body.

The lens data is now explained referring to Table 12. The lens data includes: presence/absence of the lens; the largest aperture (open aperture value) $A_{VO}$ of the lens; the smallest aperture (the maximum aperture value) $A_{VMAX}$; the set focus distance; the focal length of the lens; a coefficient for (lens moving distance)/(defocus amount); ON/OFF of the lens switch $S_Q$; a data LOK for allowing/prohibiting the lens movement; and so on. The data LOK, which is not used in the camera of the present embodiment, changes from "1" to "0" when the auto-focusing (AF) operation is unnecessary or impossible. Therefore, when the AF is always possible, the data LOK is set at "1", and there is no need to use two bytes for the data. When the camera body receives this data, it stops the motor.

In the lens ROM 6, the data are stored as listed in Table 10, where data in the address regions (A) and (B) are very similar except those relating to the switch $S_Q$ and the data LOK. Generally, information about a lens is little, so that several kinds of lens information of the same functions can be stored in a ROM. Among them, appropriate information is selected according to the lens used. In this case, the amount of information about a lens is first determined, and accordingly a ROM (the size of ROM) is determined. If the new data for indicating the ON/OFF of the switch should be included in the already determined ROM, data-change corresponding to the addresses for the ON and OFF of the switch will be needed. This means another two bytes (ON, OFF) should be included in the memory region for one kind of lens. If the ROM has a vacant memory space for one kind of lens, the two bytes, 06H and 08H in Table 11, are accommodated in the ROM, and either byte is selected according to the ON/OFF of the lens switch $S_Q$. If, on the other hand, the ROM does not have such a vacant memory space for one kind of lens, the same data except for the switch are stored in plural memory regions of the ROM (A) and (B) in Table 10), and either of the regions is selected according to ON or OFF of the switch. In case of Table 10, data in 00H through 07H are sent to the camera when the switch $S_Q$ is OFF, and 10H through 17H ($b_o=0$, AF motor stop) when $S_Q$ is ON.

In Table 10, xxx of the address number means the portion of the address that changes according to the zoom setting data and focus distance setting data, both sent from the encoders 3 and 4.

The data LOK indicates whether or not the lens is not operable in AF. Therefore, according to this flag data, the camera prohibits AF operation (i.e. do not drive lens) and performs only focus detection operation. For example, some zoom-lenses that can be used in a macro mode cannot operate the AF in the macro mode. In the macro mode, the data LOK is set so that $b_0=0$. If the zoom-lens is used out of the macro mode, the data LOK is set so that $b_0=1$ to allow AF operations. This data change is possible by the address change or by the ROM change-over.

Here, a case is provided where this lens is attached to a different type of camera that can read only this LOK data from the lens, and the photographer wants to use it in a focus-lock mode. The focus-lock is to stop the Af operation when certain focus condition is obtained. In this case, the data sent from the lens to the camera can be changed to (B) in Table 10 (06H and 07H in Table 11) by turning the switch $S_Q$ OFF at a desired time point to lock the focus.

After receiving the lens data, the terminal CSLE is set to the "L" level (#610) and the processing returns.

Figure 9A:
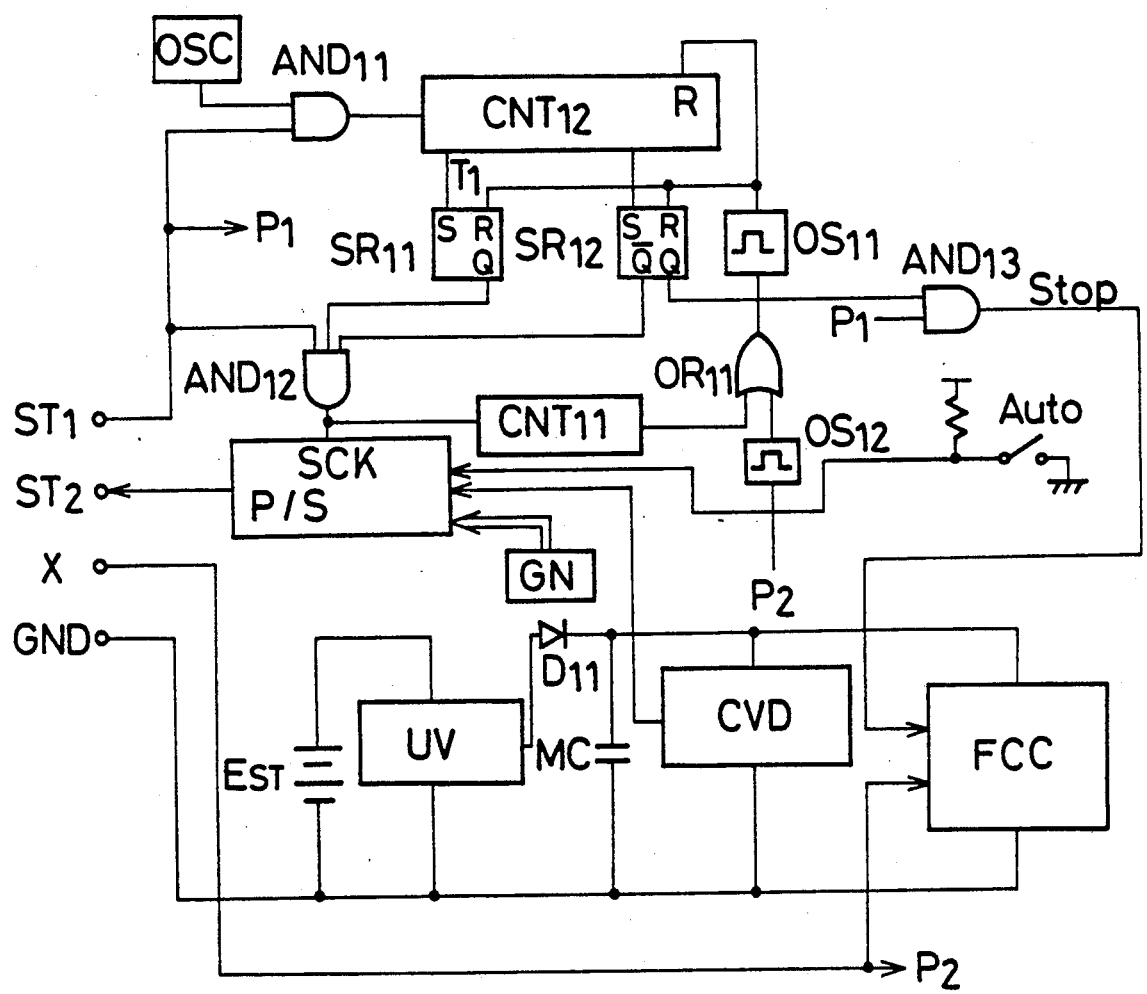
FIG. 9(a) is a circuit diagram of an electric flashlight apparatus.

Reverting to FIG. 6(a), at step #415, the micro-computer $\mu C$ inputs information from the electric flash apparatus ST. This information includes three kinds of information: a guide number GN showing the capacity of the flash apparatus ST; whether or not charging is completed; and whether full light emission or auto light emission (described later). Here, description is made on operation of a communicating method of that information. First, FIG. 9(a) is a circuit diagram of the flash apparatus ST, and FIG. 9(b) is a circuit diagram of the interface IF.

Figure 8:
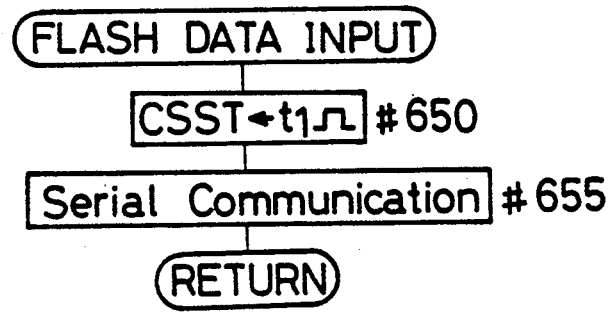
FIG. 8 is a flowchart of a routine of flash data input.

As shown in FIG. 8, the micro-computer $\mu C$ sets a terminal CSST to the "H" level for a certain time $t_1$, and outputs this signal to the flash apparatus ST (#650). The flash apparatus ST detects the duration $t_1$ of this signal, recognizes to be the data output mode, and outputs data in synchronism with the clock signal from the micro-computer (#655).

Figure 9B:
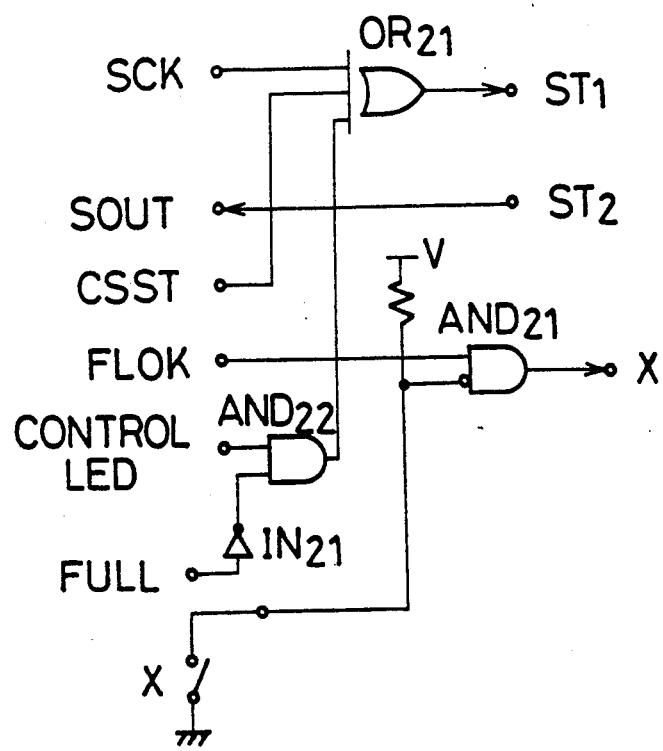
FIG. 9(b) is a circuit diagram of an interface thereof.

The interface circuit IF as shown in FIG. 9(b) transfers a signal of the terminal CSST of the micro-computer $\mu C$ to a terminal $ST_1$ of the flash apparatus through an OR circuit $OR_{21}$. At this time, the signals inputted to the OR circuit $OR_{21}$ are all "L" level. In the flash apparatus ST, a signal from the terminal $ST_1$ is inputted to an AND circuit $AND_{11}$, and consequently the AND circuit $AND_{11}$ turns to the enabled state, and outputs a signal comprising pulses from an oscillating circuit OSC to a counter $CNT_{12}$. The counter counts the pulses to measure the time. When the time $t_1$ is reached, a terminal $T_1$ is set to the "H" level, and an RS flip-flop $SR_{11}$ is set. At this time, another RS flip-flop $SR_{12}$ is kept reset intact, and its output $\overline{Q}$ is "H" level. Accordingly, an AND circuit $AND_{12}$ turns to the enabled state.

Next, the micro-computer $\mu C$ outputs a clock signal SCK for serial communication. This clock signal SCK is outputted to the terminal $ST_1$ of the flash apparatus ST through the OR circuit $OR_{21}$ of the interface circuit IF. In the flash apparatus ST, the inputted clock signal SCK is inputted to a terminal for clock signal of a parallel/series converting circuit P/S through the AND circuit $AND_{12}$. This parallel/series converting circuit P/S outputs the guide number GN, a signal showing the state of charge completion, and a signal showing full light emission or auto light emission in synchronism with the clock signal. A counter $CNT_{11}$ of the flash apparatus ST counts the inputted clock signal SCK, and after counting a predetermined required number, outputs the "H" level to an OR circuit $OR_{11}$. This signal is inputted to a reset terminal of a counter $CNT_{12}$ through the OR circuit $OR_{11}$ and a one-shot circuit $OS_{11}$, and the counter $CNT_{12}$ is reset. Therefore the counter $CNT_{12}$ is reset. The above-mentioned counter $CNT_{11}$ resets after counting a predetermined number of clock pulses.

The electric flash apparatus ST has, in addition to the above-mentioned circuits, a battery $E_{ST}$ as the power source, a boosting circuit UV for boosting the voltage of the battery $E_{ST}$ to a voltage required for flashlight emission, a rectifying diode $D_{11}$ for rectifying the voltage outputted from this boosting circuit UV, a main condenser MC for storing energy required for flashlight emission, a charging-voltage detecting circuit CVD for detecting the charging-voltage of the main condenser MC and a light emission controlling circuit FCC for controlling start and stop of the light emission.

Figure 6:
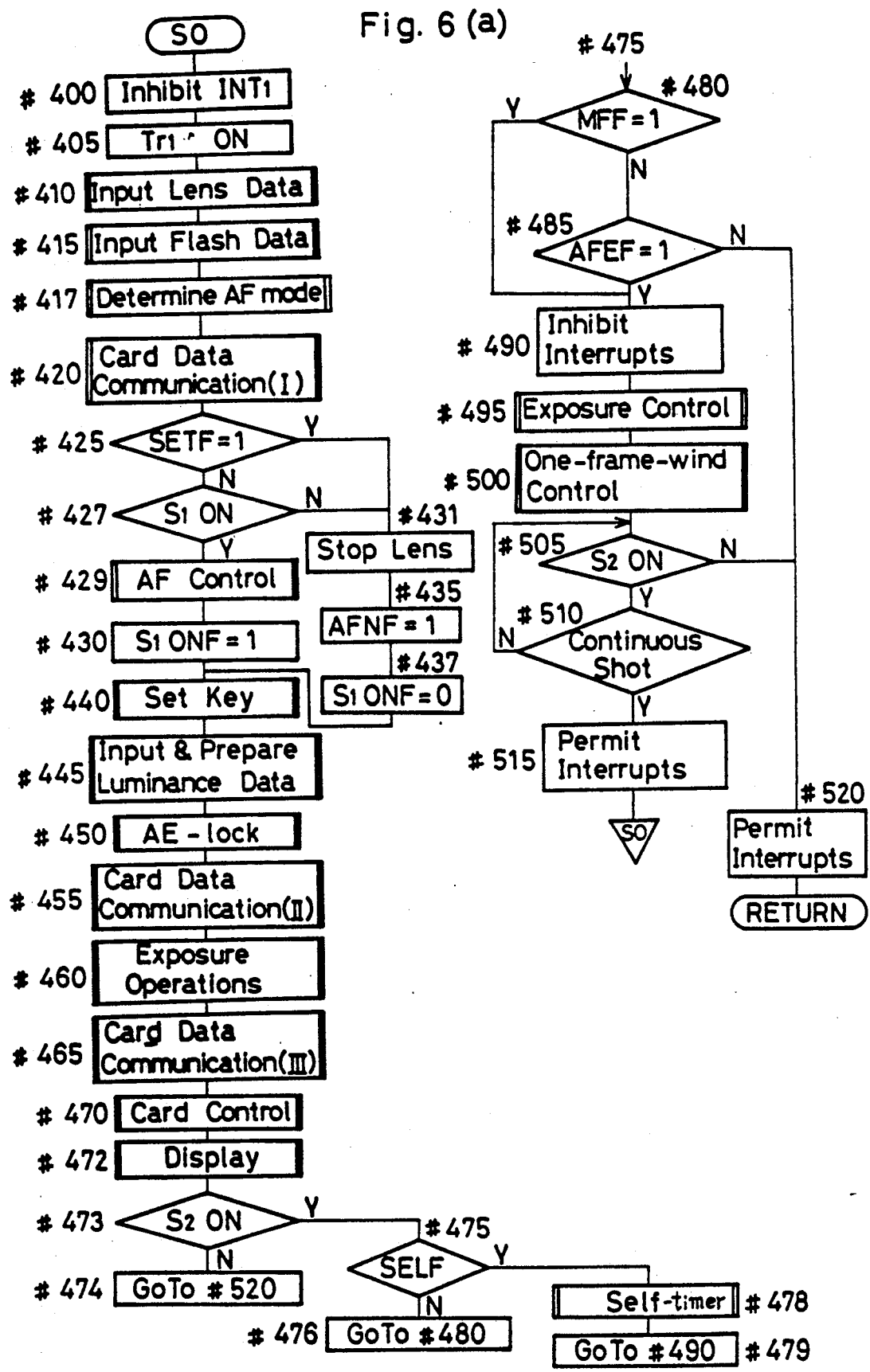
Figure 6B:
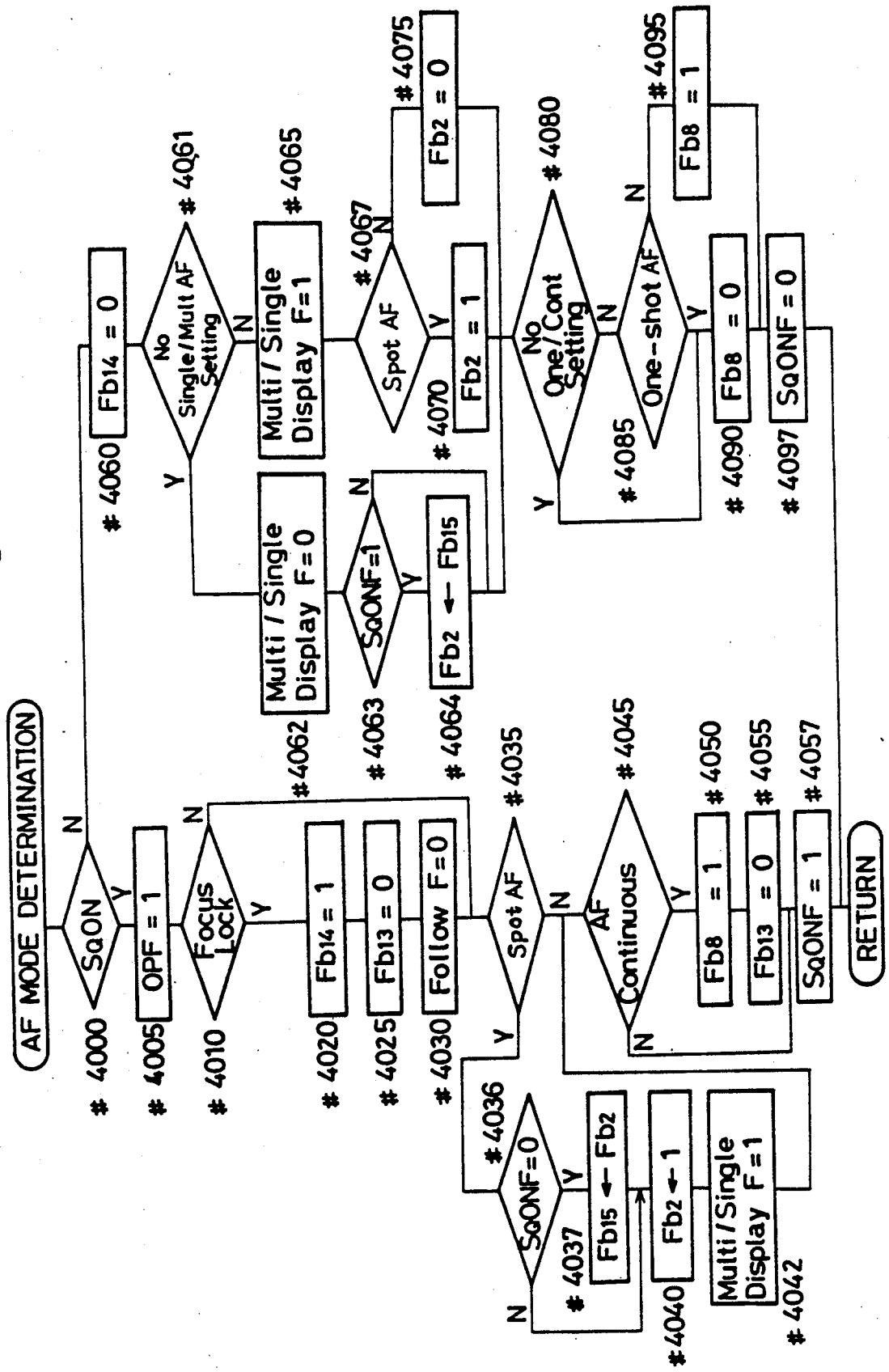
FIG. 6(b) is a flowchart of the AF-mode determination routine in FIG. 6(a).

Reverting to FIG. 6(a), an AF mode is determined at step #417, which is explained in detail by FIG. 6(b). First, it is determined at step #4000 based on the information from the lens whether the lens switch $S_Q$ is ON. When the lens switch $S_Q$ is ON, a flag OPF is set at step #4005 in order to start counting the power-hold time (10 seconds). Then at step #4010, data is read out from the $E^2$PROM that indicates whether the AF mode set by the IC card is the focus-lock mode. When it is the focus-lock mode (MSb$_{26, 27}$=1,1), a bit Fb$_{14}$ corresponding to this information is set (#4020), and a bit Fb$_{13}$, which is used as a flag to indicate whether an auxiliary light is necessary, is reset (#4025) in order to save the battery power because AF operations are unnecessary in the focus-lock mode. Further, at step #4030, a follow-flag is reset in order not to display the subject-following mode in the viewfinder display DISP$_{II}$ because the subject-following operations are impossible since the lens driving is prohibited in the focus-lock mode.

Then it is determined at step #4035 whether the AF mode set by the IC card CD is the single-spot AF mode. This step (#4035) also follows step #4010 when the focus-lock mode is not set by the IC card CD. If it is the single-spot AF (Spot-AF) mode (Mb$_{26, 27}$=0,1), it is then determined at step #4036 whether a flag SQONF is set. The flag SQONF is set when this routine is first executed after the lens switch $S_Q$ is turned ON. If the flag SQONF is reset, the value of the bit Fb$_2$ is copied to the bit Fb$_{15}$ at step #4037 in order to preserve the multi-spot/single-spot mode before the lens switch $S_Q$ is turned ON. If the flag SQONF is set, the step #4037 is skipped. In any case, the process goes to step #4040, where the bit Fb$_2$ is set to indicate the single-spot AF mode, and then to step #4042, where a multi-/single-spot mode display flag is set irrespective of the selection by the IC card CD, followed by step #4045. If it is not the single-spot AF mode at step #4035, these steps #4036–#4042 are skipped, and step #4045 is directly processed. At step #4045, it is determined whether the continuous AF mode or not. If it is in the continuous AF mode (MSb$_{26, 27}$=1,0), a bit corresponding to this mode is set (Fb$_8$=1) at step #4050, the auxiliary light flag bit is reset (Fb$_{13}$=0) at step #4055, and the flag SQONF is set at #4057 to indicate that this routine is once executed. Then the process returns.

Here, the auxiliary light, which is used in focusing operations in a dark place, is not used in the continuous AF mode because the battery power will be consumed very much if the auxiliary light is used at every focus adjusting action occurring many times in this mode.

If it is not in the continuous AF mode at step #4045, the flag SQONF is set at step #4057, and the process returns. If the switch $S_Q$ is ON, since one among the focus-lock, single-spot AF and continuous AF is set by the IC card CD, one among steps #4010, #4035 and #4045 is determined YES and the other two are determined NO in this routine.

If the lens switch $S_Q$ is OFF at step #4000, the process goes to step #4060. First the bit $Fb_{14}$ used as a flag indicating the focus-lock function is reset here.

Then, at step #4061, it is determined whether single-spot/multi-spot AF mode is set by the IC card CD. If no mode setting is made by the IC card CD, the multi-/single-spot display flag is reset at step #4062 to cease the display, and further it is determined at step #4063 whether the flag SQONF is set to know whether this is the first time since the switch $S_Q$ is turned OFF. If this is the first time (SQONF=1), the value of bit $Fb_{15}$ is copied to bit $Fb_2$ at step #4064 to resume the AF mode before the switch $S_Q$ is turned ON. If the flag SQONF is reset at step #4063 (i.e. the switch $S_Q$ is not operated), the step #4064 is skipped. In any case, the process goes to step #4080.

If it is determined at step #4061 that the mode setting is done by the IC card CD, the multi-/single-spot display flag is set at step #4065 to display the mode. Then it is determined at step #4067 whether the mode is the single-spot AF (Spot-AF). If YES, the corresponding bit $Fb_2$ is set at step #4070, and if NO, the bit $Fb_2$ is reset at step #4075, both followed by step #4080. This step #4080 determines whether a setting of one-shot AF/continuous AF is made. If no setting is made, bit $Fb_8$ is reset ($Fb_8=0$) at step #4090 to automatically set the one-shot AF mode. If any setting is made, it is then determined at step #4085 whether it is the one-shot AF mode. If YES, the bit $Fb_8$ is reset at step #4090, and otherwise the bit $Fb_8$ is set at step #4095 to set the continuous AF mode. In any case, the flag SQONF is reset at step #4097 and the process returns.

Figure 5B:
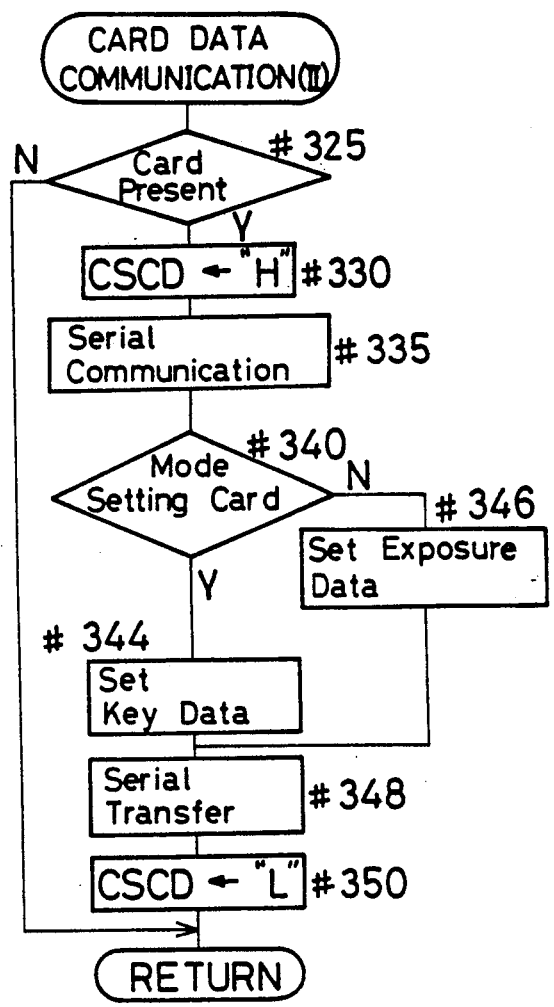
Figure 5C:
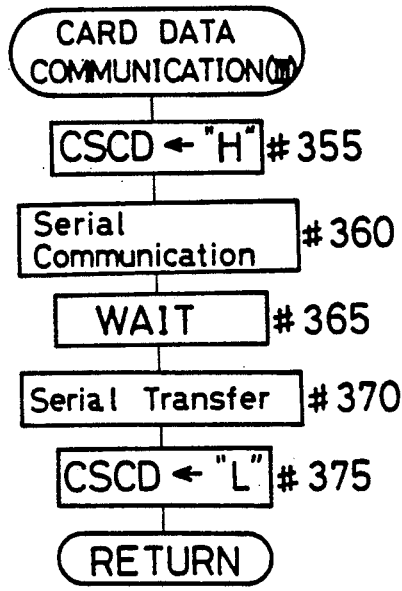

Reverting to FIG. 6(a), after determining the AF mode, the micro-computer μC performs the card data communication I with the IC card CD to discriminate the kind of the IC card CD (#420). This card data communication I has been already described in reference to FIG. 5, and therefore the description is omitted here. After this card data communication, judgment is made at step #425 on whether or not a flag SETF showing that the IC card is attached and the data setting mode is set is set. If the flag SETF is not set, whether or not the AF starting switch $S_1$ is ON is judged by the level of a terminal $IP_6$ (#427). If the switch $S_1$ is ON ($IP_6=$"L" level), control of AF is performed (#429). On the other hand, when the flag SETF is set, or the switch $S_1$ is OFF ($IP_6=$"H" level), a signal for stopping an AF driving motor is outputted to the lens control circuit LECN to stop lens driving in order to inhibit AF operation (#431), a flag AFNF showing that AF is not performed is set (#435), and a flag S10NF showing the ON state of the switch $S_1$ is reset (#437). By inhibiting the AF control and preferentially performing data setting when the data setting mode is set, the AF operaion is not performed even if the AF starting switch $S_1$ is mistakenly turned ON during data setting.

Figure 10B:
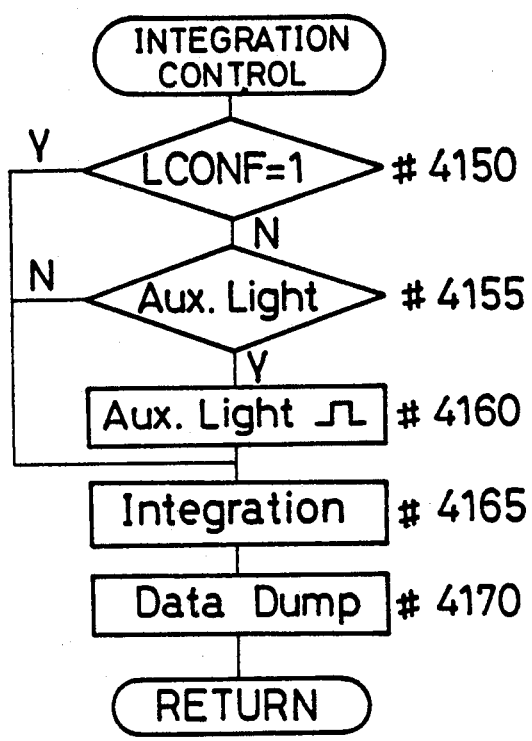
Figure 10C:
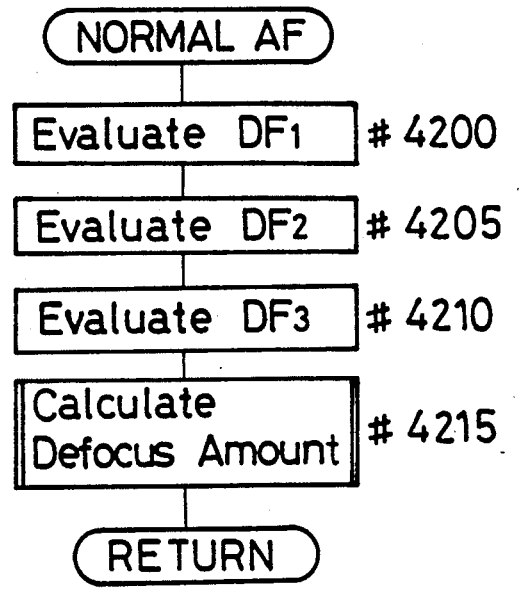
Figure 10D:
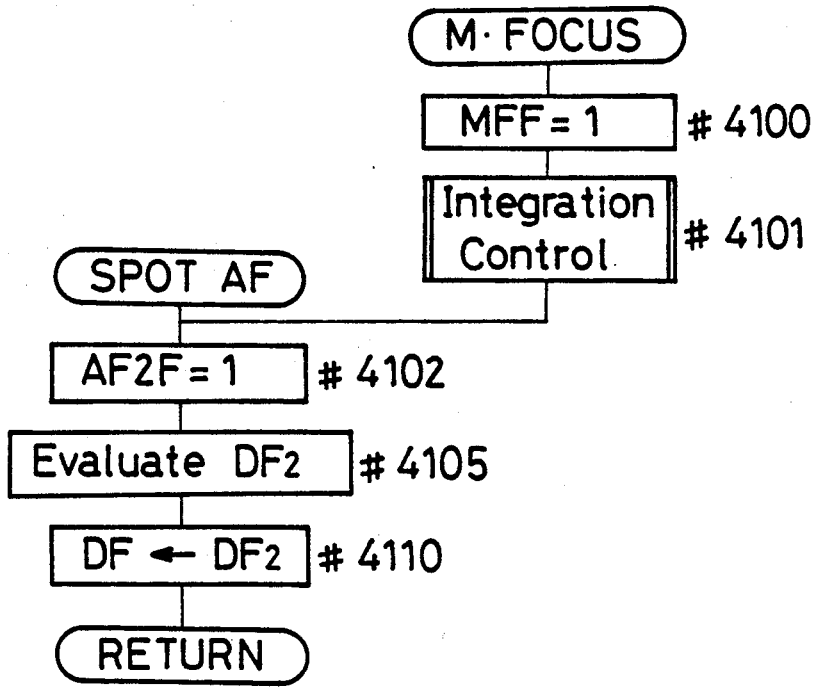
Figure 10E:
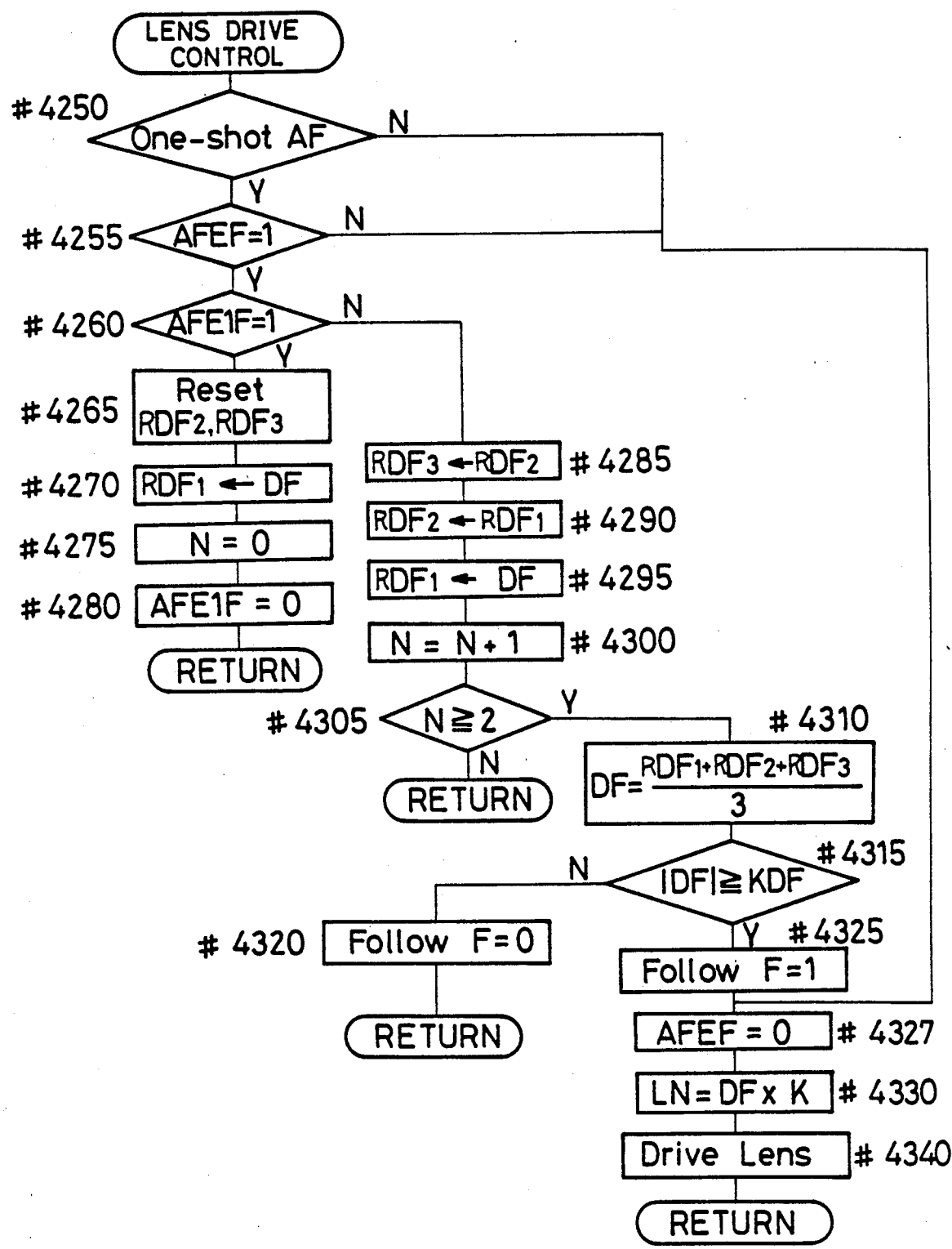
Figure 10F:
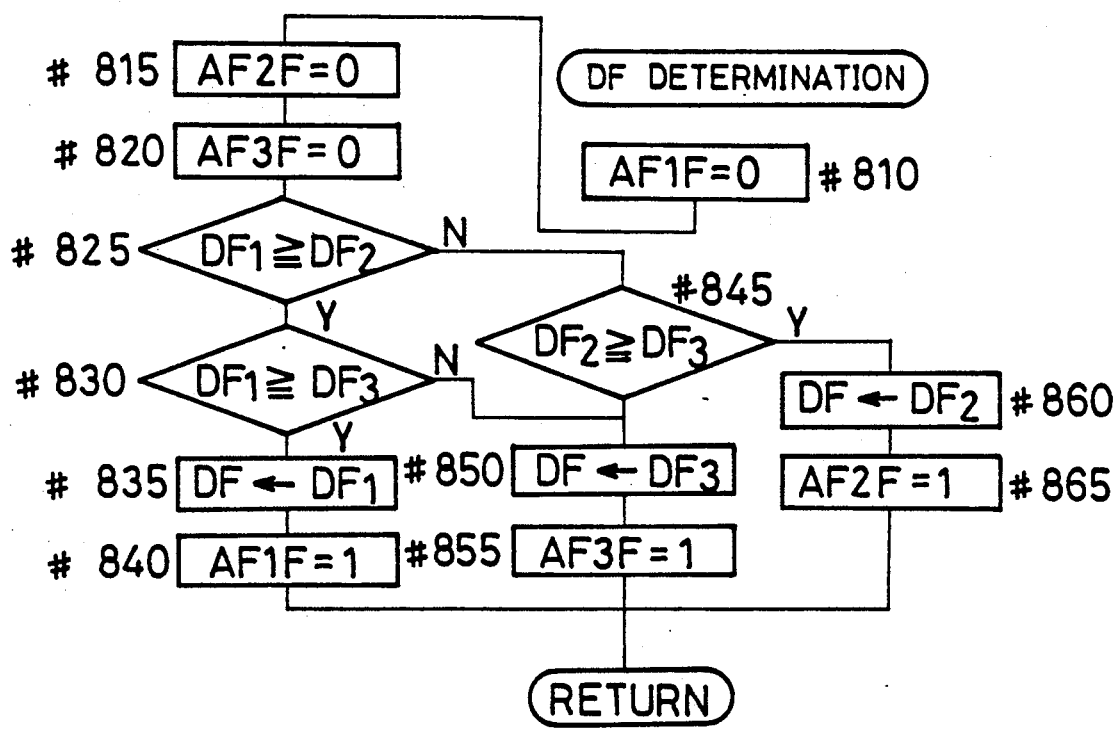
Figure 11:
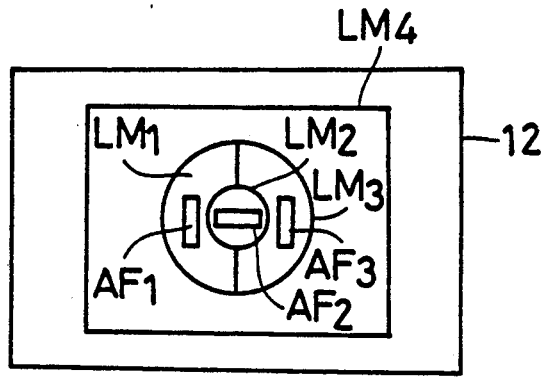
FIG. 11 shows an arrangement of focusing spots and photometry zones.

Here, description is made on the above-described AF control based on flowcharts as shown in FIG. 10(a) to FIG. 10(f) in reference to FIG. 11 showing the focusing spots in the photographing frame. Photometric zones are also described in the figure.

First, in FIG. 11, the outside rectangle 12 shows the photographing frame. Symbols $LM_1$ to $LM_4$ designate photometric zones, and symbols $AF_1$ to $AF_3$ focusing spots. First, description is made for the focusing spots. In the camera, change between single-spot/multi-spot AF modes can be made, and when the single-spot AF is selected, AF is performed based on information on a subject in the central focusing spot $AF_2$, and when the multi-spot AF is selected, AF is performed so that a subject nearest to the camera is focused by selecting one spot corresponding to the nearest subject from among the three spots $AF_1$ to $AF_3$. Accordingly, in the multi-spot AF mode, the area for detecting the focus condition is larger or broader than in the single-spot AF mode. Hereinafter, $AF_1$ is referred to as the first island, $AF_2$ as the second island, and $AF_3$ as the third island, respectively.

Description is made for AF control as shown in the flowchart of FIG. 10(a). First, the flag S10NF is checked at step #701 to determine whether the AF starting switch $S_1$ is first turned ON. If the flag S10NF is not set, which means this routine is executed for the first time after the switch $S_1$ is turned ON, a flag AFEF is reset at step #702 which was set when a right focusing was obtained. In any case, the process goes to step #705, where it is judged whether or not the lens is attached based on a signal inputted from the lens to the micro-computer μC (#705). If the lens is not attached, a flag AFNF is set at #800 to indicate that no AF control is executed. If the lens is attached, it is judged in accordance with the level of a terminal $IP_{10}$ whether or not the focusing mode is the AF mode (#710). If the AF mode is selected, it is then determined at step #711 whether the focus-lock mode is selected by cheking the bit $Fb_{14}$. If the M mode is selected, the auxiliary light mode is prohibited by resetting the bit $Fb_{13}$ at step #798, a manual focusing subroutine (MFOCUS) is executed at step #799, a flag AFNF is reset to indicate that no AF operations are performed, and the process proceeds to step #780. At this step, it is determined whether the focus is right. If YES, the flag AFEF is set (#785), otherwise reset (#790), and the process returns.

The subroutine for the manual focusing is explained referring to FIG. 10(d). First in this routine a flag MFF is set at step #7100 to indicate the manual focusing mode, and an integration control is executed at step #401 where the integration is controlled and the data-dump is executed. In the manual focusing, only the second island ($AF_2$) is used, so that the corresponding flag AF2F is set at step #102. Then the defocus amount at this island ($DF_2$) is calculated at step #4105, whose value $DF_2$ is put in the defocus amount DF which is used as the final focusing determination at step #4110, and the process returns.

The integration control of step #4101 is explained in detail referring to FIG. 10(b). When the right focusing is impossible (LCONF=1) or when it is not in the auxiliary-light mode ($Fb_{13}=0$), the auxiliary light is not flashed, but the integration and the data-dump are executed (#4150, #4155, #4165, #4170). When the right focusing is possible and the auxiliary-light mode is selected, the auxiliary light starts lighting before the integration, the terminal OLD is set at "H" level for a predetermined time, and the integration is performed (#4150–#4170).

Reverting to FIG. 10(a), when the focus-lock mode is selected ($Fb_{14}=1$) in the AF mode (#710, #711), the lens-driving operation is stopped at step #712, and check the flag AFEF at step #713 to know whether the right focusing has been obtained. If the flag AFEF is set, the [MFOCUS] subroutine is executed at step #714, otherwise the process goes to step #799. The flag check at step #713 is executed because the subject-lens distance at the right focusing condition is used in the photometric process (specifically, the distance data is used to calculate the image magnification ratio) when the focus is locked after the focus is adjusted.

When the focus-lock mode is not selected in the AF mode (#710, #711)($Fb_{14}=0$), the non-AF flag AFNF and the manual-focusing flag MFF are reset (#715, #717). The micro-computer $\mu C$ controls storage (integration) of charge generated in a CCD according to the quantity of incident light. After completing the integration, the micro-computer inputs data obtained by A-D-converting the value of integration (#720). Then, it is judged whether or not the mode is the single-spot AF (based on function data $Fb_2$) in step #730, and if the single-spot AF is selected ($Fb_2=1$), the single-spot AF subroutine is executed at step #735, which is detailed in FIG. 10(d). In this subroutine, first, a flag AF2F for showing that AF is performed based on the second island $AF_2$ is set, and a defocus amount $DF_2$ of the second island $AF_2$ is calculated from the detected data, and a value obtained by this calculation is set as the defocus amount DF for driving the lens (#4102-#4110).

On the other hand, when the multi-spot AF mode is selected at step #730, the ordinary AF control subroutine as shown in FIG. 10(c) is executed at step #740. As described before, the defocus amount DF is calculated based on one of the three islands $AF_1$, $AF_2$, $AF_3$ spotting the nearest subject from the camera (#4200-#4215). The process for calculating the defocus amount is explained referring to FIG. 10(f). The principle is as follows: Positive defocus amounts represent that the subject is nearer to the camera with respect to the infocus position, and negative defocus amounts represent that the subject is behind the infocus position. The amplitude of the defocus amount represent the distance from the subject to the infocus position. Therefore, in this subroutine, the algebraically largest defocus amount among those from the three islands $AF_1$, $AF_2$ and $AF_3$ is taken because the nearest subject is considered as the principal subject.

The micro-computer $\mu C$, in the FIG. 10(f) routine, resets the three flags AF1F-AF3F representing respectively the islands (#810-#820), finds the largest defocus amount (#825, #830, #845), and put the largest defocus amount value into DF to be used in driving the lens (#835, #850 or #860). At the same time, the corresponding flag is set (#840, #855 or #865).

After calculating the defocus amount DF, returning to FIG. 10(a), it is determined at step #745 whether the focusing is possible (i.e. the calculated data is reliable). If, for example, the contrast of the image is very low, the focusing is assumed impossible. When the focusing is determined impossible at step #745, it is then determined at step #747 whether the auxiliary-light mode is selected. If YES, a flag LCONF is set at step #752 to stop focusing operations because such operatioins are meaningless any more, and the flag indicating the subject-following mode (follow-flag) is reset at step #755. If the auxiliary-light mode is not selected at step #747, it is determined at step #757 whether the luminance is low. If the luminance is not low, the process goes to step #752 because no auxiliary light is necessary. But if the luminance is low, the auxiliary-light mode is selected at step #760 ($Fb_{13}=1$), and the follow-flag is set at step #755.

When the focusing is determined possible at step #745, the flag LCONF is reset at step #762 and it is determined, based on the defocus amount DF, whether the infocus condition is obtained at step #765. If YES, the proper flag AFEF is set at step #767 and a flag AFEIF is set at step #772, followed by the step #755. If NO, a lens-driving subroutine as shown in FIG. 10(e) is executed at step #775 before returning. First in the subroutine as step #775 of FIG. 10(e), the bit $Fb_8$ is checked at step #4250 to know whether the current mode is one-shot AF or continuous AF. In the one-shot AF mode, the lens driving, as well as the focus adjustment, is stopped once the infocus condition is obtained. In the continuous AF mode, the lens is continuously driven according to calculated defocus amount to follow the subject after the infocus condition is obtained. When the one-shot AF mode is selected ($Fb_8=0$), it is determined at step #4255 whether the infocus flag AFEF is set. If the flag AFEF is reset, or when the continuous AF mode ($Fb_8=1$) is selected, the lens is driven at step #4340 after executing steps #4327 and #4330. At step #4327, the infocus flag AFEF is reset, and at step #4330, the moving (driving) amount of the lens LN is calculated by multiplying the defocus amount DF by the conversion coefficent K. At step #4340, the lens is moved by the calculated distance LN by the lens driving circuit LECN.

When the infocus flag AFEF is set at step #4255, a flag AFEIF is checked at step #4260. AFEIF=1 at this step means that the infocus is first obtained this time. If so, preparations are made (#4265-#4280) for judging whether the subject is moving. First at step #4265, registers for the defocus amounts $RDF_2$ and $RDF_3$ are reset, and the calculated defocus amount DF is stored in the other register $RDF_1$ at step #4270, a counter N is reset to 0 at #4275, and the above-mentioned flag AFEIF is reset at step #4280 before returning. If AFEIF=0 at step #4260, which means this is not the first time since the infocus is obtained (AFEF=1), the process branches to steps #4285 et seq. At steps #4285-#4295, data in the registers DF, $RDF_1$ and $RDF_2$ are shifted (i. e. $RDF_3 \leftarrow RDF_2$, $RDF_2 \leftarrow RDF_1$ and $RDF_1 \leftarrow DF$), and the counter N is incremented by one at step #4300. Then the counter N is checked at step #4305 whether it is 2 or more. If N<2, the process directly returns without driving the lens. If N≥2, which means the subject-distance measurements (focusing) have been made more than three times, the average value DF of the three values $RDF_1$, $RDF_2$ and $RDF_3$ in the registers (i.e. the average value of the defocus amounts of the last three measurements) is calculated at step #4310, and the modulus |DF| is checked at step #4315 whether it is greater than or equal to a predetermined reference value KDF. This step is to determine whether the subject is moving to or from the camera at a significant speed because, in that case, non-zero defocus amounts should be obtained in the last three measurements after the infocus is obtained. If |DF|<KDF, the subject is assumed still and the follow-flag is reset at step #4320. The follow-flag is used in the viewfinder displaying $DISP_{II}$. If |DF|≥KDF, the subject is assumed moving, and the follow-flag is set at step #4325.

Then the right focus flag AFEF is reset at step #4327 because the subject is already out of focus, the lens moving amount LN is calculated by DF×K, and the lens is driven according to the calculated amount LN (#4330, #4340).

Figure 38:
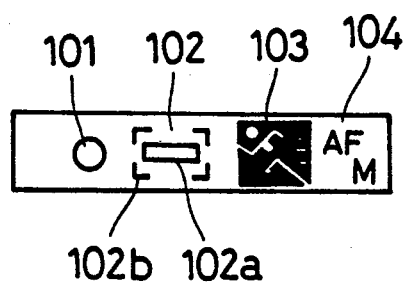
FIG. 38 shows a full view of a viewfinder display.
Figure 39:
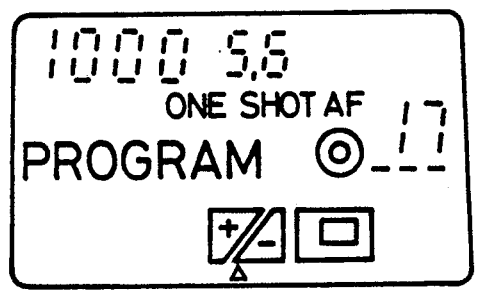
FIG. 39 shows an example of the camera body display.

The viewfinder display DISP$_{II}$ relating to the focusing operations is now explained refering to FIG. 38. When the infocus flag is set, an LED glows green. When the focusing is impossible (LCONF=1), the LED 101 glows red. Otherwise, the LED 101 is turned OFF. The FIG. 102 shows the focusing mode: when the internal box 102$a$ is displayed, the single-spot Af is selected; when the corners 102$b$ are displayed, the multi-spot AF is selected. The symbol 103 is displayed when the continuous AF mode or the subject-following mode is selected. At the extreme right portion 104, "AF" is displayed in the AF mode (AFNF=0), and otherwise "M" is displayed. This viewfinder display ceases when the AF switch S$_1$ is turned OFF.

Reverting to FIG. 6($a$) again, the micro-computer $\mu$C controls changing of various data by operations of various key switches (#440).

Figure 12:
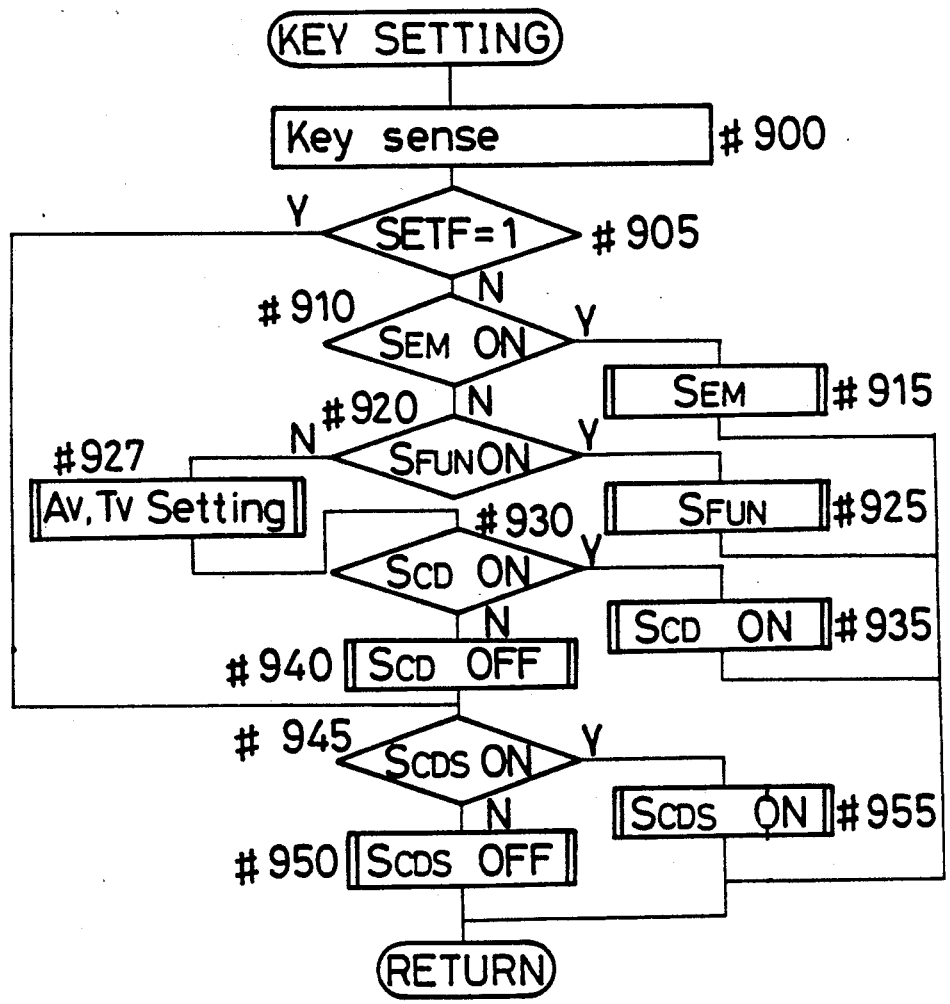
FIG. 12 is a flowchart of a setting routine of keys installed in the camera.

This is described based on FIG. 12. First, the state of each key switch is detected, and is stored in a memory (#900). Next, judgement is made on whether or not the flag SETF showing the card setting mode is set (#905). When the flag SETF is set, processing proceeds to step #945. When the flag SETF is not set, processing proceeds to step #910, and the micro-computer $\mu$C judges whether or not the exposure mode changing switch S$_{EM}$ is ON. When the switch S$_{EM}$ is ON, processing proceeds to the subroutine for this exposure mode change (#915), and returns (as detailed later). When the above-mentioned switch S$_{EM}$ is not ON, processing proceeds to step #920, and the micro-computer $\mu$C judges whether or not the function changing switch S$_{FUN}$ is ON. When this switch S$_{FUN}$ is ON, processing proceeds to the subroutine for this function change (#925), and returns.

Figure 13:
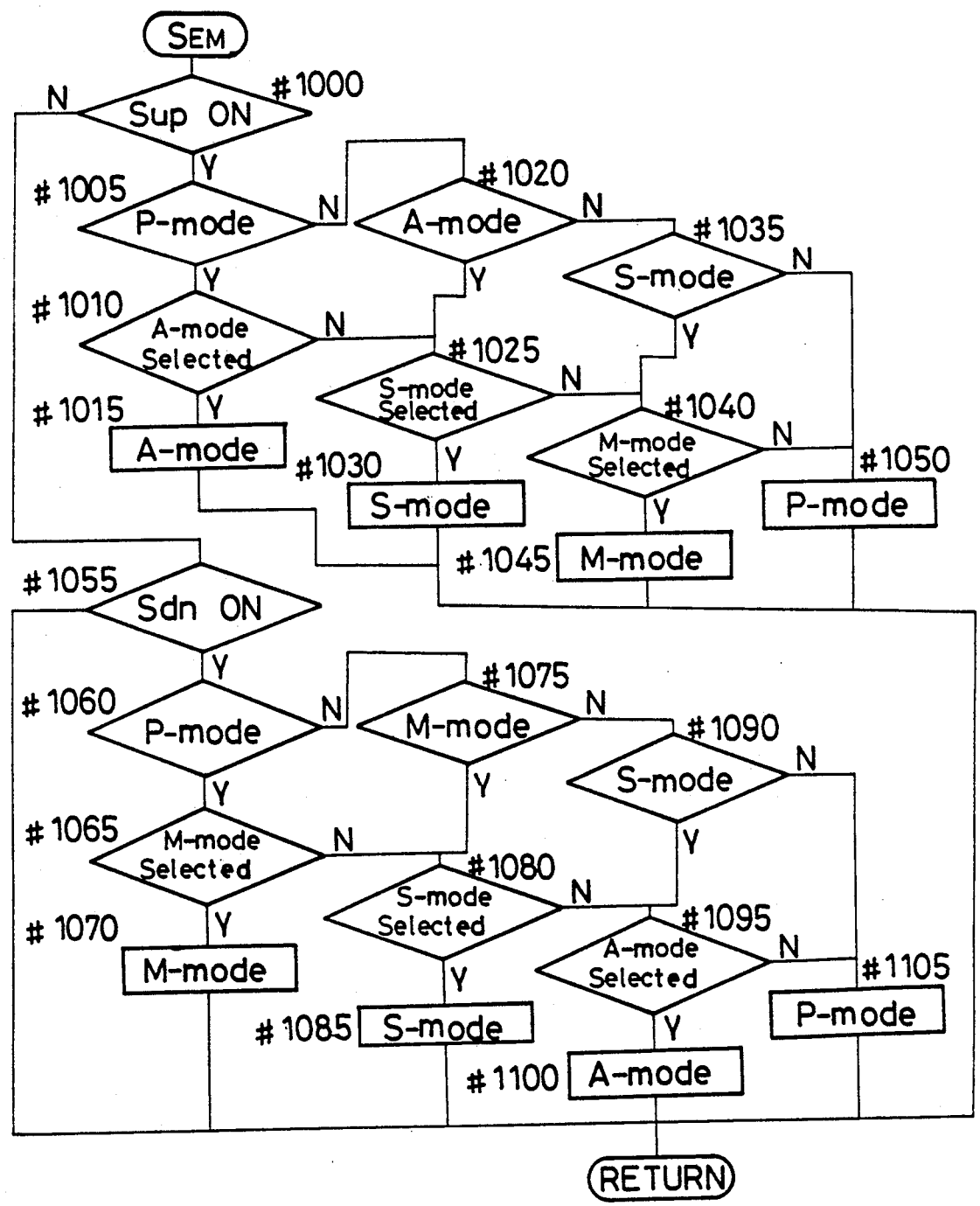
FIG. 13, FIG. 14(a), FIG. 14(b), FIG. 15, FIG. 16, FIG. 17 and FIG. 18 are flowcharts of setting routines relating to various key switches.

FIG. 13 and FIG. 14 respectively show the above-mentioned two subroutines, step #915 and step #925. First, in the case of the exposure mode change (step #915), the mode changes in a sequence of P→A→S→M→P (return) cyclically every time the up switch Sup is turned ON, and changes in reverse P→A→S→M→P cyclically every time the down switch Sdn is turned ON. The change is made responding to the exposure mode set by the IC card CD, and the mode not selected by the IC card CD is skipped.

This routine is explained with reference to FIG. 13. In step #1000, the micro-computer $\mu$C judges whether or not the up switch Sup is ON, and when it is not ON, processing proceeds to step #1055. When it is ON, processing proceeds to step #1005, and the bits Fb$_0$ and Fb$_1$ of the function data Fbn of the RAM are checked, and judgement is made on whether or not P mode is set at present as the controlled exposure mode. When it is set, processing proceeds to step #1010, whether or not A mode has been selected by the IC card is judged through MSb$_6$ to MSb$_8$ of the E$^2$PROM (Table 4). If A mode is selected, the exposure mode is changed from P to A, and the function data Fb$_0$ and Fb$_1$ are changed from (0, 0) to (0, 1) in step #1015, and the processing returns. In the above-mentioned step #1010, when it is judged that A mode is not selected by the IC card, processing proceeds to step #1025, when it is judged whether or not S mode is selected. When S mode is not selected, processing further proceeds to step #1040, where it is judged whether or not M mode is selected. Thus, any mode selected by the card is searched for in sequence. Then, if any selected mode exists, the mode is set. When any of A, S and M modes is not selected, P mode is automatically selected (#1050).

Likewise, when A mode is set as the controlled exposure mode (Fb$_0$, Fb$_1$=0, 1), it is judged whether or not S mode is selected by the IC card, and when it is not selected further, it is judged whether or not M mode is selected. Thus the exposure mode is changed to the selected mode, and the bits Fb$_0$ and Fb$_1$ are changed accordingly (#1020 to #1030).

When S mode is set as the controlled exposure mode (Fb$_0$, Fb$_1$=1, 1), it is judged whether or not M mode is selected by the IC card. When M mode is selected, M mode is set, and when not, P mode is set (#1035-#1045). When S mode is not set as the exposure mode in step #1035 (i.e. when the M mode is set), next P mode is set (#1050). This is because P mode is selected without fail in this embodiment. When the down switch Sdn is ON in step #1055, process is performed like the above-described up switch Sup except that the changing direction of the exposure mode differs, and therefore its description is omitted.

When both of the switches Sup and Sdn are OFF, processing returns without performing anything.

Next, description is made on the process when the function changing switch S$_{FUN}$ is ON referring to FIG. 14($a$). The micro-computer $\mu$C detects by bits MSb$_0$–MSb$_3$ of the E$^2$PROM whether at least one function has been selected among the four functions, namely, highlight/shadow (H/S), exposure adjustment ($\pm$), single-frame-/continuous-advancing (S/C) and single-spot AF/multi-spot AF (S/A). When none of these bits is set, it is assumed that no mode selection has been made, and processing returns (#1200). When at least one bit is set, it is assumed that at least one function has been selected, and processing proceeds to the flow of steps #1205 et seq., where data is changed. The micro-computer $\mu$C judges whether or not the switch S$_{SE}$ selecting the function-to-be-changed is ON. When it is ON, search of the function-to-be-changed proceeds in a sequence of H/S→$\pm$→S/C→S/A→H/S (return) cyclically, and skips the function which is not selected by the IC card. In step #1210, when the function-to-be-changed shows H/S (CDb$_0$, CDb$_1$, CDb$_2$ of RAM data as shown in Table 5=0, 0, 0), whether or not the $\pm$ function is selected by the IC card is judged based on the bit MSb$_1$ of the E$^2$PROM. When the $\pm$ function is selected, the data change mode of the $\pm$ function is set, and data CDb$_0$, CDb$_1$, CDb$_2$=0, 0, 1 is set (#1220), and then processing returns. When the $\pm$ function is not selected, processing proceeds to step #1227, where it is judged whether or not the S/C function is selected based on MSb$_2$. When this function is not selected either (MSb$_2$=0), processing proceeds to step #1240, where whether or not the A/S function is selected is judged based on MSb$_3$. When this is not selected either (MSb$_3$=0), processing further proceeds to step #1250, where whether or not the H/S function is selected is judged (MSb$_0$). Since, in the embodiment, at least the H/S function is selected, CDb$_0$, CDb$_1$, CDb$_2$=0, 0, 0 is set to change the mode in the H/S function. When the S/C function and the A/S function are selected, CDb$_0$ to CDb$_2$ are set accordingly to change their modes. Likewise, judgement is made on whether or not the function following the currently set one to be mode-changed (e.g., if currently H/S then $\pm$; if currently $\pm$, then S/C; if currently S/C, then S/A; and if currently S/A, then H/S) has been selected by the card. If it is selected, the function is set as the function to be mode-changed, and when it is not selected, the function selected by the IC card is searched for in a sequence of H/S→±→S/C→S/A→H/S, and the selected function is assumed to be the function to be mode-changed, and data $CDb_0$ to $CDb_2$ are set accordingly, and the processing returns.

As is understood from the above, the function that is not selected by the card is skipped as to the change of the mode. For example, when two functions, ± and S/C, are selected, the flow goes to step #1225 when the function-changing switch $S_{FUN}$ is depressed. Then the processing proceeds to step #1227, and S/C becomes the function to be mode-changed. This means that the triangle cursor moves from ± to S/C on the display. Subsequently, when the function-changing switch $S_{FUN}$ is depressed again, the flow goes to step #1235, and then proceeds sequentially to step #1215 through the step #1240 and #1250, and the ± function becomes the function to be mode-changed, and the cursor on the display moves to ±. In this case, since H/S and A/S are not selected, they are virtually skipped.

In step #1205, when the switch $S_{SE}$ is not ON, processing proceeds to step #1265 where it is judged whether or not the up switch Sup is ON. When it is ON, the function to be mode-changed is determined based on data $CDb_0$ to $CDb_2$. If it is the H/S function, current mode in the function is detected based on data $Fb_6$ and $Fb_7$, and data $Fb_6$ and $Fb_7$ are changed to change to the next mode (as H→S→no-H/S→H in a cyclic order) (#1270, #1275), and the processing returns.

If the function is ±, 0.5 is added to a quantity of exposure adjustment ΔEv in step #1285, and the processing proceeds to a subroutine for judging its magnitude. FIG. 14(b) shows this subroutine. In FIG. 14(b), if the quantity of adjustment ΔEv is positive, data [$Fb_4$, $Fb_5$=0, 1] is set as a positive direction adjustment, and if it is a negative direction adjustment, data [$Fb_4$, $Fb_5$=1, 0] is set, and further if the adjustment is zero, data [$Fb_4$, $Fb_5$=0, 0] is set, and the processing returns (#1350-#1370).

Figure 14A:
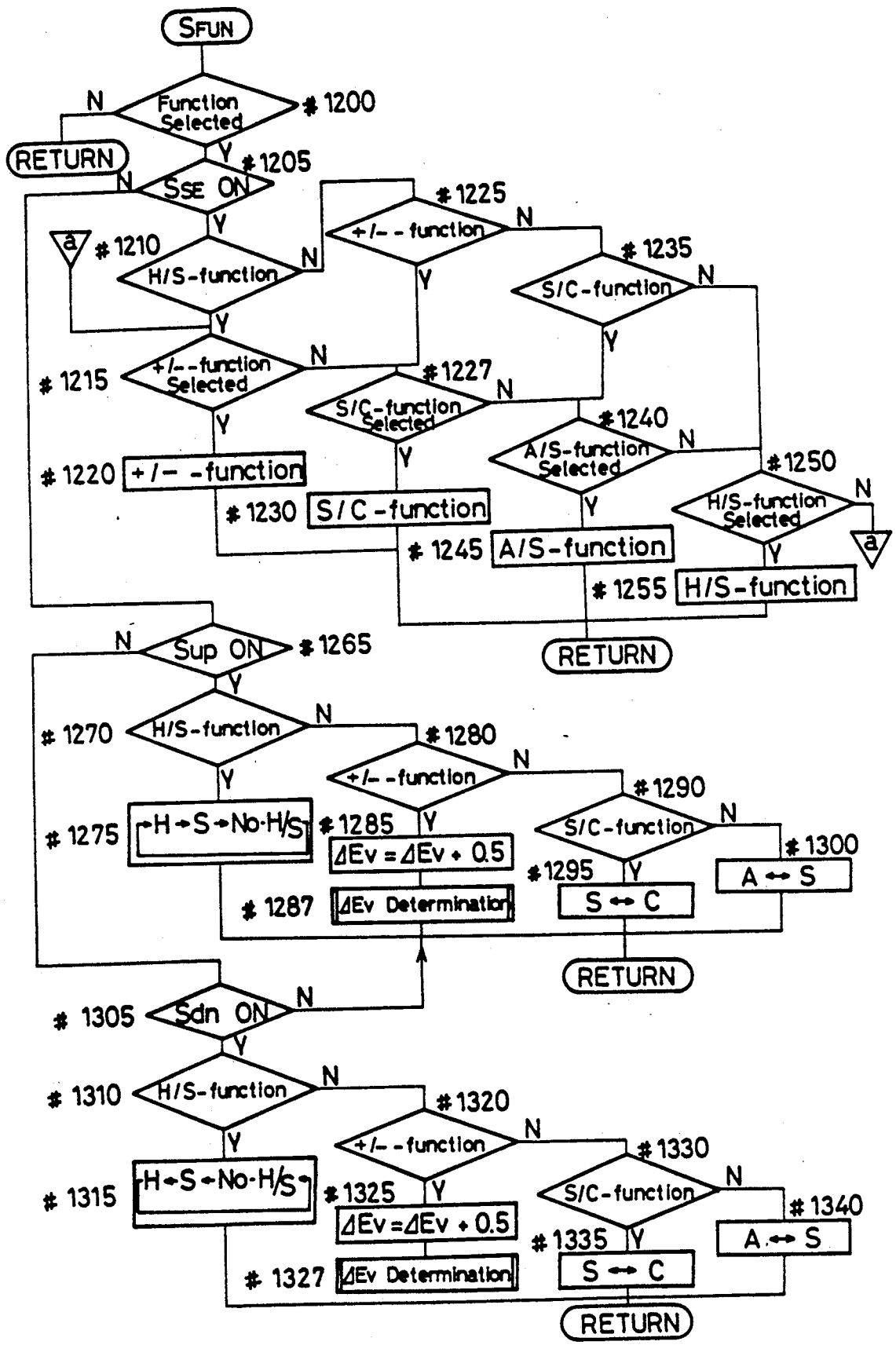
Figure 14B:
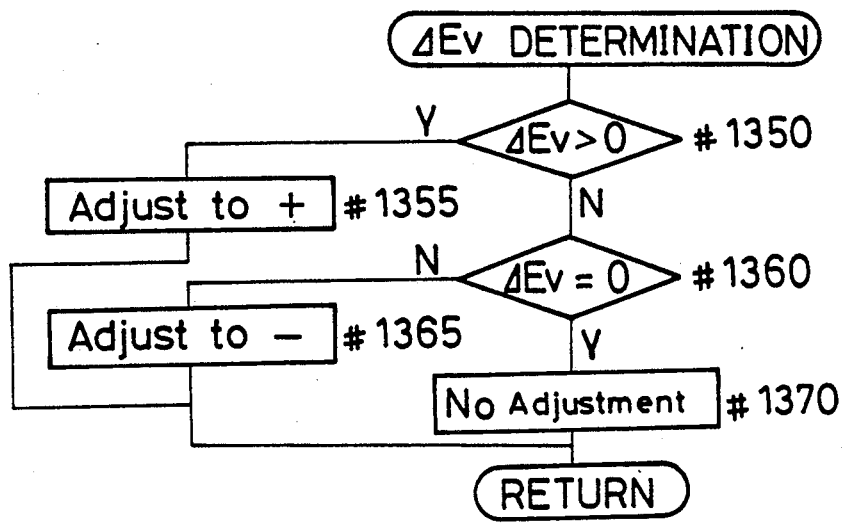

Reverting to FIG. 14(a), if the S/C function is selected, whether or not the present mode is one-shot(S) or continuous-shot (C) is judged based on data $Fb_3$, and the data is changed so that the mode changes to the other mode (#1295), and the processing returns. When the function is not any of the above-mentioned three (H/S, ±, and S/C), that is, when currently A/S, it is judged through data $Fb_2$ whether the present mode is the single-spot AF (S) or multi-spot AF (A), and the data $Fb_2$ is changed so that the mode changes to the other mode (#1300), and the processing returns.

When the up switch Sup is not ON in step #1265, processing proceeds to step #1305, where it is judged whether or not the down switch Sdn is ON. When it is not ON, processing returns. When it is ON, the flow is like the flow when the above-described up switch Sup is ON except that, in H/S, mode is changed reversely (←H←S ←no-H/S ←), and except that, in ±, 0.5 Ev is subtracted from the quantity of exposure correction ΔEv (#1310-#1340). Accordingly its description is omitted.

Reverting to FIG. 12, when both the exposure mode changing switch $S_{EM}$ and the function-changing switch $S_{FUN}$ are OFF, processing proceeds to step #927 and executes a subroutine of changing the aperture value Av and the shutter speed TV by the up switch Sup and the down switch Sdn.

Figure 21A:
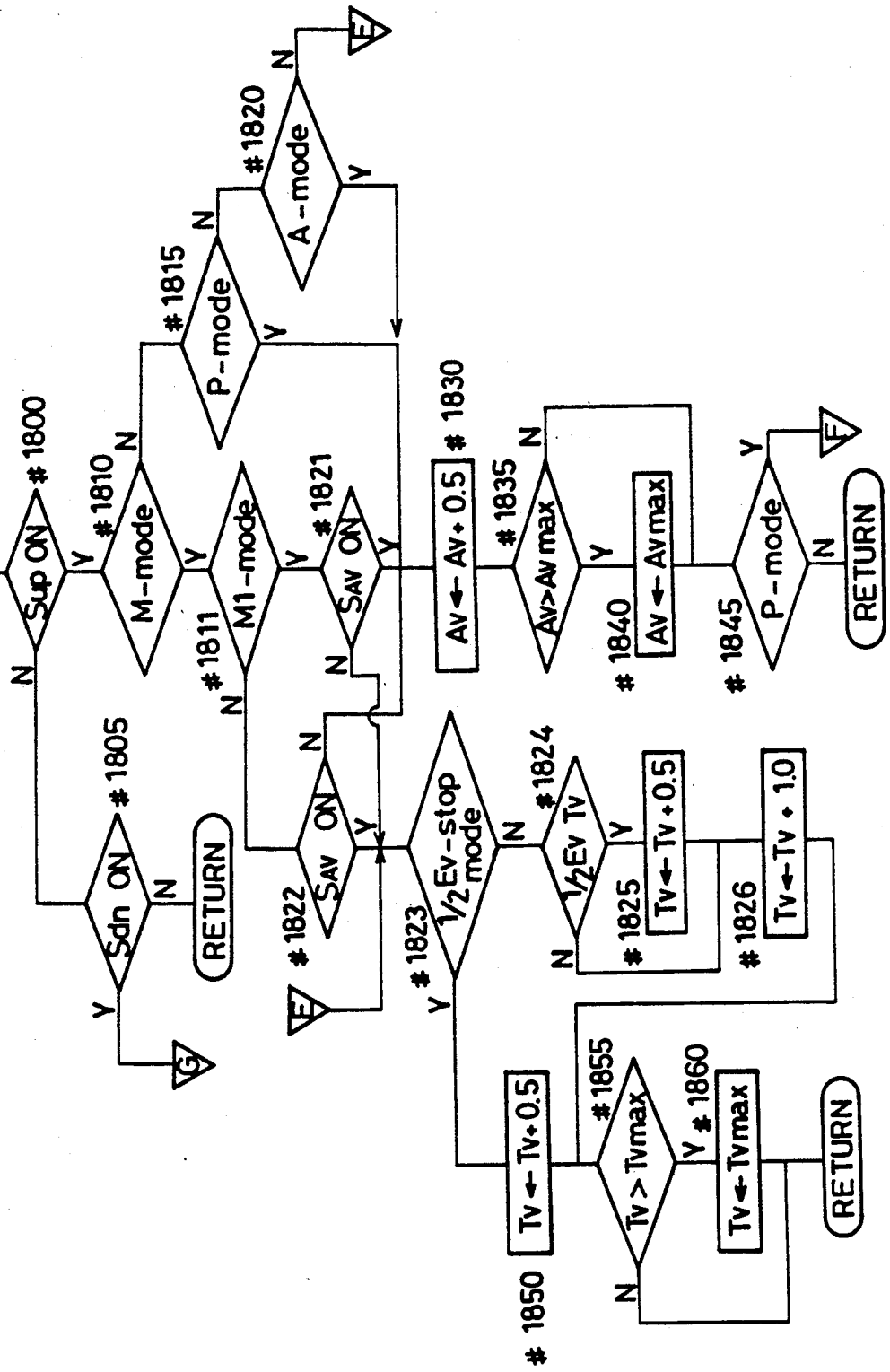
FIGS. 21(a) and 21(b) are flowcharts of a routine for setting the aperture value and the shutter speed.
Figure 21B:
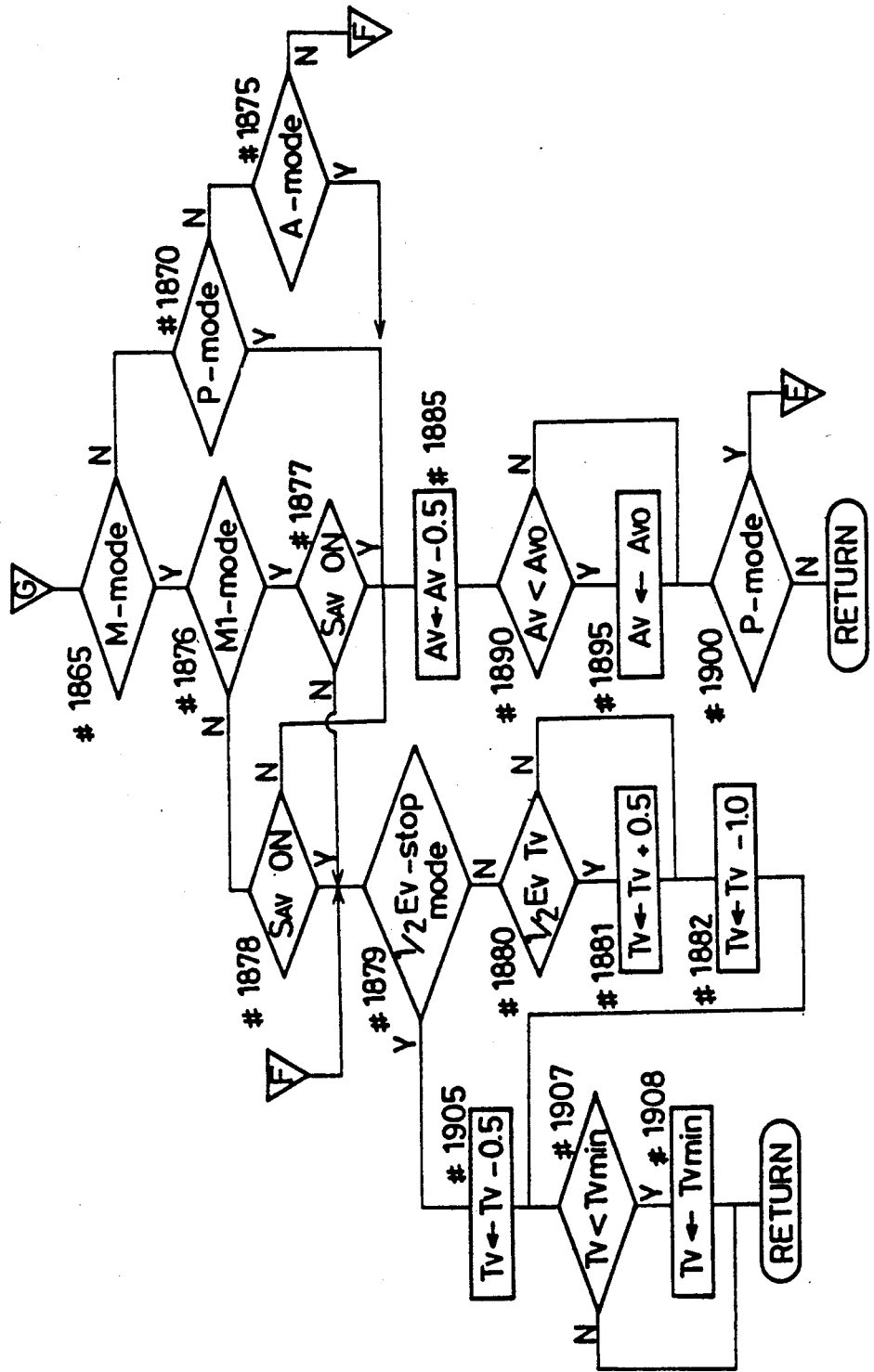
Figure 22:
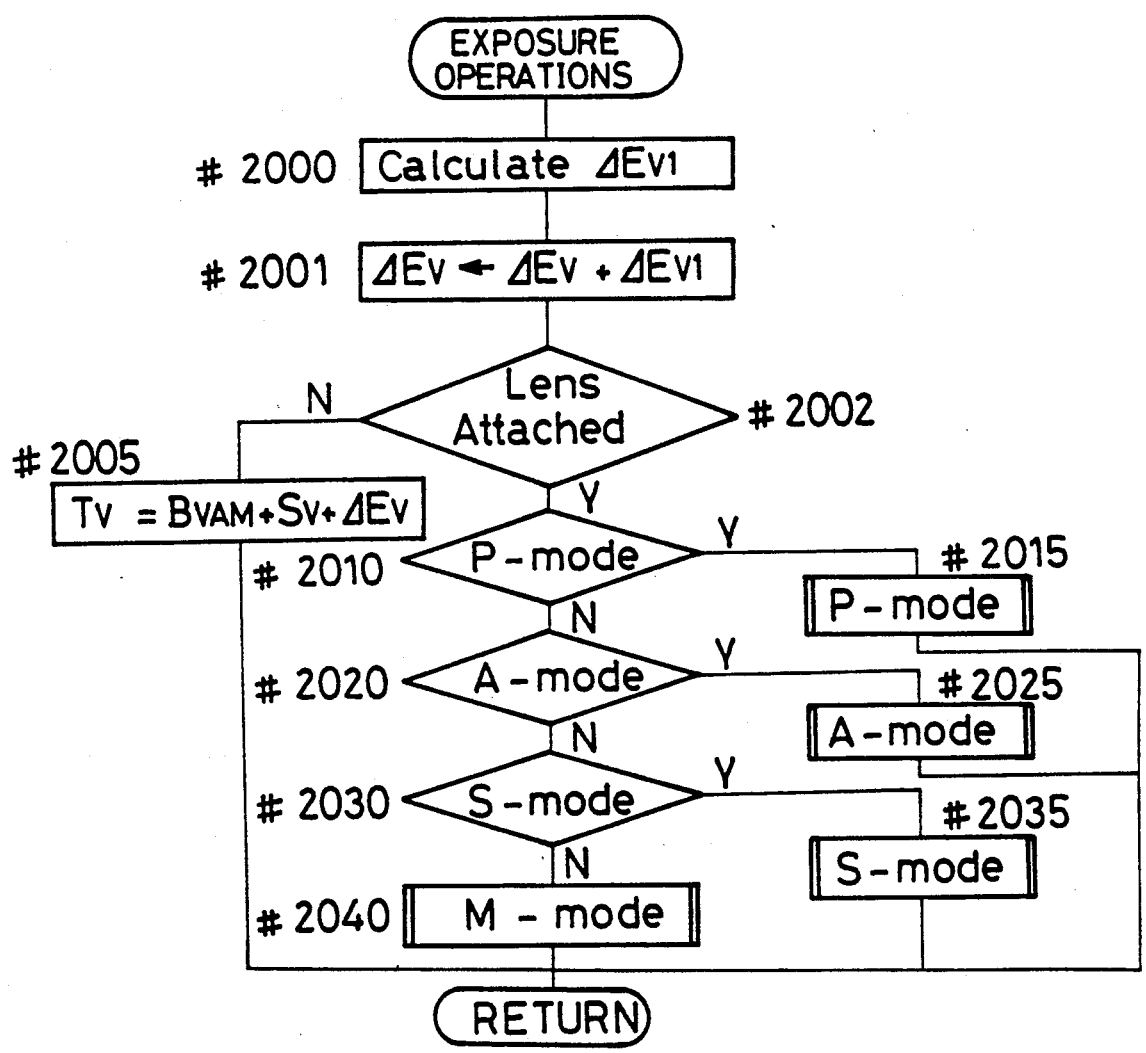
FIG. 22 is a flowchart of a routine of exposure operations.

FIGS. 21(a) and 21(b) show this subroutine. In this subroutine, first, the micro-computer μC judges whether or not the up switch Sup is ON in step #1800, and when it is not ON, processing proceeds to step #1805, where it is judged whether or not the down switch Sdn is ON. When it is not ON, processing returns. When the up switch Sup is ON, processing proceeds from step #1800 to step #1810, where it is judged whether or not M mode is set. When M mode is set ($Fb_0$, $Fb_1$=1, 0), it is determined at step #1811 whether it is currently $M_1$ mode based on the bit $MSb_{28}$ of the $E^2PROM$. If currently $M_1$ mode ($MSb_{28}$=0), next step #1821 determines whether the aperture changing switch $S_{AV}$ is ON. If the switch $S_{AV}$ is ON ($IP_{13}$="L"), the aperture is changed at steps #1830 et seq. The micro-computer μC of the present embodiment can change the aperture or the shutter speed by ½ Ev stops, but the photographer can select ½ Ev-stops or 1 Ev-stops. Thus, at step #1823, the bit $MSb_{29}$ is checked to determine either stop mode. When ½ Ev-stop mode is selected ($MSb_{29}$=1), current shutter speed Tv is changed by adding 0.5 at step #1850, followed by step #1855. When 1 Ev-stop mode is selected ($MSb_{29}$=0), current shutter speed is determined at step #1824 whether it is at a half-stop position, i. e. at (n±½) Ev (n: natural number) [e.g. Tv=6.5 or 1/90 sec.]. If so, current shutter speed Tv is added by 0.5 at step #1825 [e.g. Tv=6.5→Tv=7, or 1/90 sec→1/120 sec.] to round the Ev number, and further 1 Ev is added to the shutter speed Tv at step #1826, followed by step #1855. At step #1855, the changed shutter speed Tv is checked whether it exceeds a predetermined maximum value Tvmax. If so, the shutter speed Tv is set at Tvmax at step #1860. Then the process returns.

If the aperture changing switch $S_{AV}$ is ON at step #1821, the aperture value Av is added by 0.5 at step #1830. When the changed aperture value Av exceeds the maximum value Avmax at step #1835 set by the lens, Av is set at Avmax at step #1840. Then it is determined at step #1845 whether current mode is P mode. If so, process goes to step #1879 of FIG. 21(b), and otherwise returns.

If $M_1$ mode is not selected at step #1811 ($MSb_{28}$=1), it is determined at step #1822 whether the aperture changing switch $S_{AV}$ is ON. If ON, steps #1823 et seq. are executed to change the shutter speed, but otherwise steps #1830 et seq. are executed to change the aperture value.

When M mode is not set in step #1810, processing proceeds to the flow of step #1815 and step #1820, where it is judged whether or not P mode or A mode is set. If the mode is either P mode or A mode ($Fb_0$, $Fb_1$=0, 0 or 0, 1), processing proceeds to step #1830, where the micro-computer μC increases the aperture value Av. However, if the mode is neither of them, that is, S mode ($Fb_0$, $Fb_1$=1, 1), processing proceeds to step #1823, where the micro-computer μC increases the shutter speed Tv.

When the down switch Sdn is ON in step #1805, processing proceeds to the flow of FIG. 21(b). First in this routine, the micro-computer μC judges whether or not M mode is set at step #1865. When M mode is set ($Fb_0$, $Fb_1$=1, 0), further it is determined at step #1876 whether current mode is $M_1$ mode. If so ($MSb_{28}$=0), the aperture changing switch $S_{AV}$ is checked at step #1877 whether it is ON. If ON, steps #1885 et seq. are executed to change the aperture value, and otherwise steps #1879 et seq. are executed to change the shutter speed. At step #1879, it is determined whether the half-Ev ($\frac{1}{2}$ Ev) stop mode is selected. If so (MSb$_{29}$=1), 0.5 Ev is subtracted from the current shutter speed Tv at step #1905, and it is conpared with a predetermined minimum speed Tvmin of the camera at step #1907. If Tv<Tvmin, Tv is set at Tvmin. Then the process returns. If the 1 Ev stop mode is selected (MSb$_{29}$=0), current shutter speed is determined at step #1880 whether it is at a half-stop position. If so, 0.5 Ev is added at step #1881, and then 1.0 Ev is subtracted at step #1882, followed by the step #1907. If current mode is determined to be the aperture changing mode (S$_{AV}$ is ON) at step #1877, the aperture value Av is decreased by 0.5 Ev at step #1885, and compared with the open aperture value Avo of the lens at step #1890. If Av is smaller than Avo, Av is set at Avo at step #1895, followed by step #1900 where current mode is determined whether to be P mode. When Av≧Avo at step #1890, step #1895 is skipped. If current mode is determined to be P mode at step #1900, the above-described steps #1823-#1860 of FIG. 21(a) are executed to increase the aperture value, but otherwise returns.

If current mode is not M$_1$ mode (MSb$_{28}$=1) at step #1876, it is determined at step #1878 whether the aperture changing switch S$_{AV}$ is ON. If ON, shutter speed is changed at steps #1879 et seq., and otherwise steps #1885 et seq. are executed to change the aperture value.

If current mode is not M mode at step #1865, steps #1870 and #1875 are executed to determine whether it is P mode or A mode. In either case, the aperture value is decreased at steps #1885 et seq., otherwise (i.e. S mode) the shutter speed is decreased at steps #1879 et seq.

Reverting to FIG. 12, after passing through the step #927, which is a subroutine for changing the aperture value Av and the shutter speed Tv as described above, processing proceeds to step #930. In this step #930, judgement is made on whether or not the normally-opened switch S$_{CD}$ enabling/disabling the function set by the card is ON. When it is ON, processing proceeds to the proper subroutine in step #935.

Figure 15:
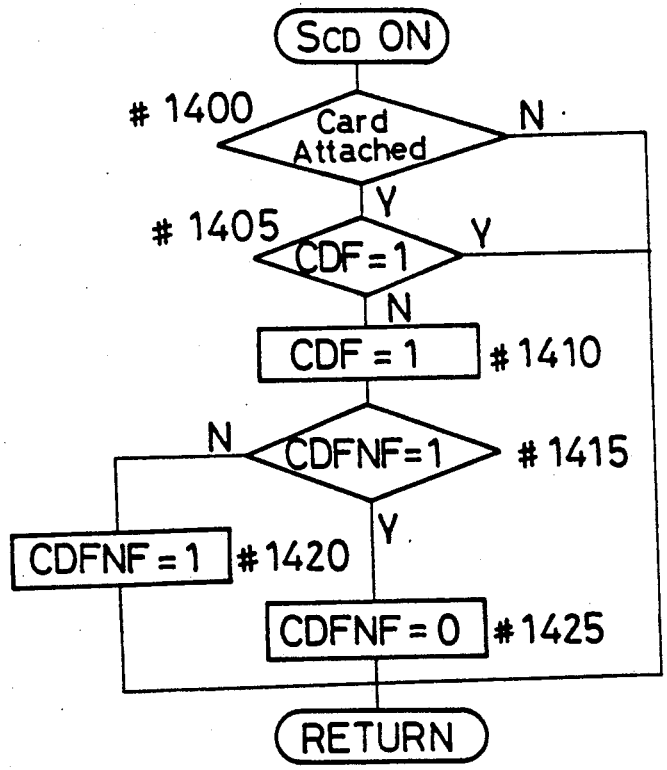

This subroutine is explained based on FIG. 15. First, in step #1400, whether or not the IC card CD is attached to the camera body is judged based on data CKb$_0$, and when IC card is not attached (CKb$_0$=0), processing returns immediately. When a mode setting card is attached, judgement is made on whether or not a flag CDF showing that processing has passed through this flow once after the switch S$_{CD}$ is operated is set (#1405). When the flag CDF is set, it is assumed that a change between enable/disable has been already finished, and processing returns. When it is not set, processing proceeds to the following step #1410. In step #1410, the micro-computer sets this flag CDF, and subsequently checks a flag CDFNF showing that the card function is enabled or disabled in step #1415. When it is not set, it is set to enable the card function (#1420), and when it is set, it is reset to disable the card function (#1425), and processing returns. Description above is about the flow when the card function enable/disable switch S$_{CD}$ is determined ON at step #930 in FIG. 12.

Figure 16:
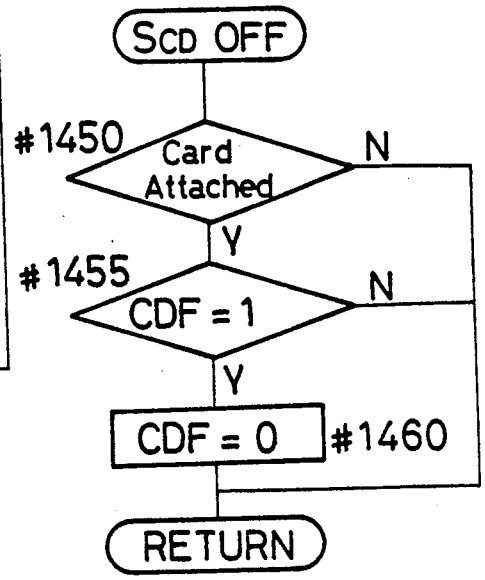

When the card function enable/disable switch S$_{CD}$ is determined OFF in step #930, processing proceeds to step #940 which is detailed in FIG. 16. First, in step #1450, whether or not the IC card is attached is judged, and when no IC card is attached (b$_0$=0 in 20 H), processing returns. When the IC card is attached (b$_0$=1 in 20 H), processing proceeds to step #1455, where the micro-computer μC judges whether or not the flag CDF showing that processing has passed once through the flow of the above-described step #1405 et seq. in FIG. 15 is set. When this flag CDF is set, the micro-computer μC resets this flag in step #1460 and returns, and when the flag CDF is not set, process returns intact.

Reverting to FIG. 12, next, the micro-computer μC checks ON or OFF of the card data setting switch S$_{CDS}$ in step #945, and according to ON or OFF of the switch S$_{CDS}$ processing passes through step #955 or step #950 respectively and returns. These subroutines are shown in FIG. 17 and FIG. 18.

Figure 17:
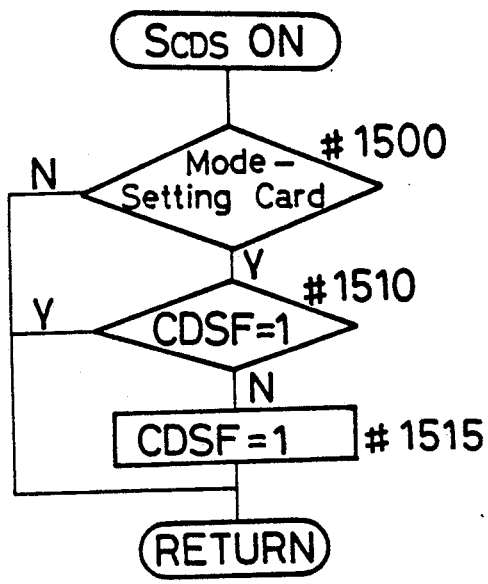

FIG. 17 shows a subroutine for the switch S$_{CDS}$ at ON. At its first step #1500, the micro-computer μC judges whether or not a mode setting card is attached. When no card is attached (b$_2$=0 in 20 H), processing returns immediately. When a mode setting card is attached (b$_2$=1 in 20 H), judgement is made on whether or not a flag CDSF showing that processing has passed through this flow once is set (#1510), and when the flag is not set, it is set (#1515), and when the flag is set, processing skips step #1515 and returns.

Figure 18:
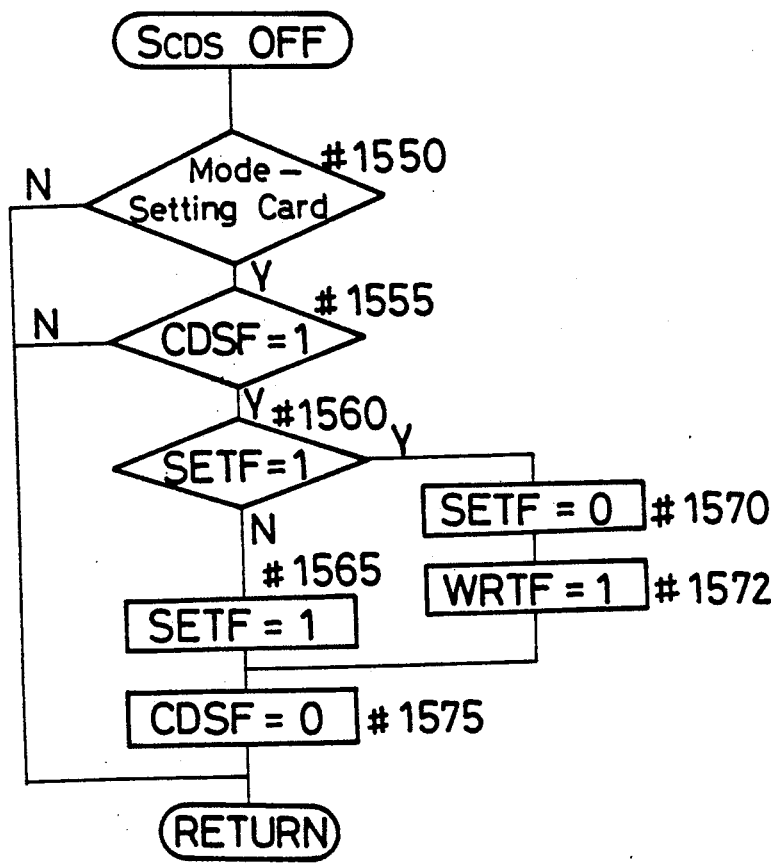

Next, description is made for a subroutine for the switch S$_{CDS}$ at OFF referring to FIG. 18. First, whether or not a mode setting card is attached is judged in step #1550. When no card is attached (b$_2$=0 in 20 H), processing returns. Even when a card is attached (b$_2$=1 in 20 H), the process returns when the flag CDSF is not set in step #1555. The flag CDSF shows that the switch S$_{CDS}$ has been operated and the flow of this [S$_{CDS}$ ON] has been executed. If the flag CDSF is set, it is judged whether or not the flag SETF which indicates the state of the switch S$_{CDS}$ for determining the entering to data setting is set in step #1560. When the flag SETF is set, it is reset in step #1570, and subsequently in step #1572, a flag WRTF showing data write to the E$^2$PROM is set. Then, the flag CDSF is reset to release the data setting mode in step #1575. If the flag SETF is not set, this flag SETF is set to enter the data setting mode (#1565), and the flag CDSF is reset (#1575), and processing returns.

Figure 19:
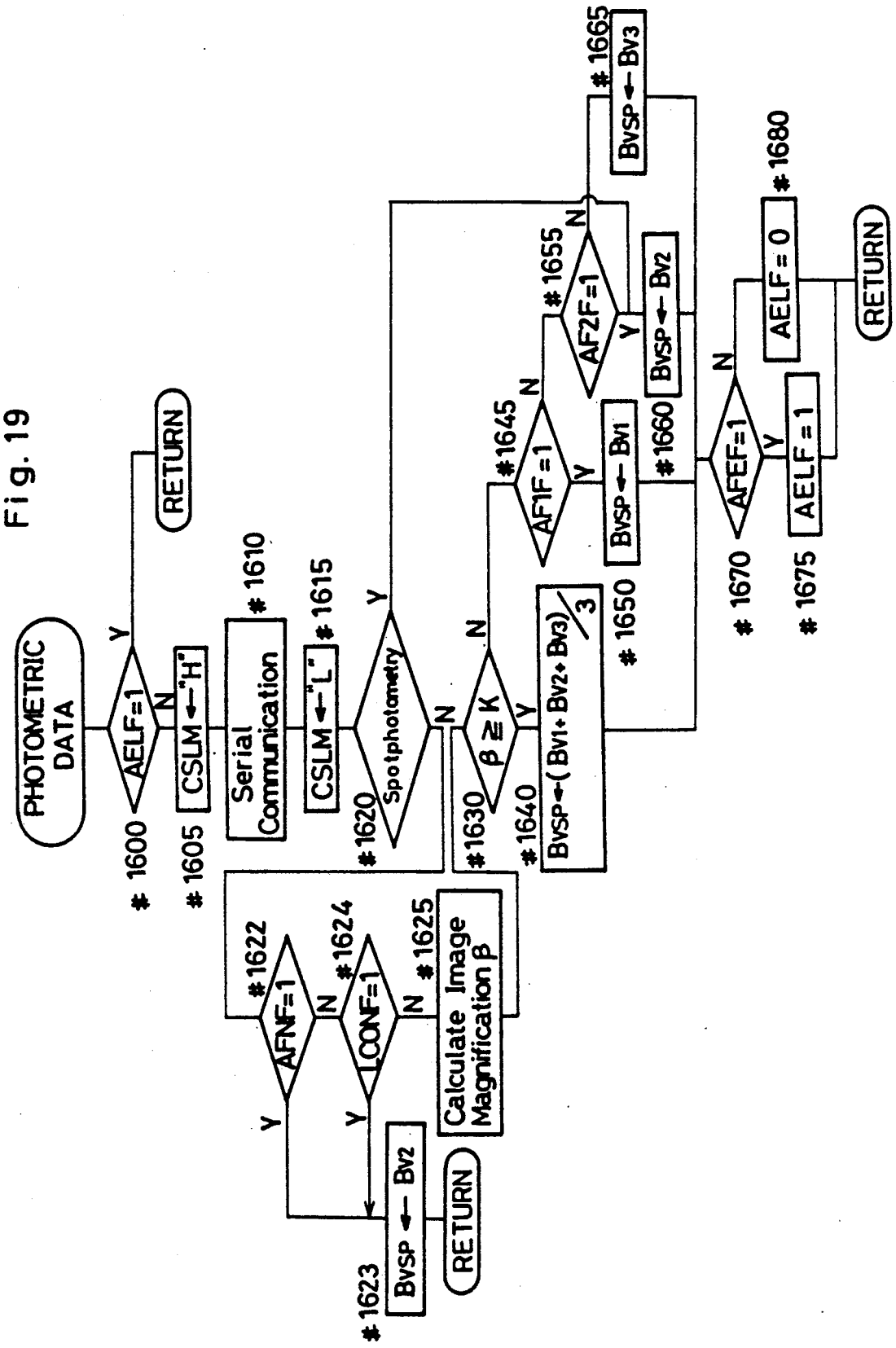
FIG. 19 is a flowchart of a routine for preparing photometric data.

After completing the setting control as shown in FIG. 12 as described above, the micro-computer μC proceeds from step #440 to step #445 in FIG. 6, where photometric data is inputted into the micro-computer μC from the photometric circuit LM, and a spot photometric value used for exposure control is calculated. Here, description is made for the photometric value in reference to the photometric zones as shown in FIG. 11 and the flowchart about photometric data of the micro-computer as shown in FIG. 19. In FIG. 19, first, the micro-computer μC judges whether or not the flag AELF showing AE-lock is set in step #1600, and when the flag AELF is set, processing returns without performing renewal of the photometric value. When the flag AELF is not set, a terminal CSLM is set to the "H" level, and a command for output of photometric data is sent to the photometric circuit LM, and serial communication is performed (#1605, #1610).

Luminance values Bv$_1$ to Bv$_4$ representative of the four photometric zones LM$_1$ to LM$_4$ as shown in FIG. 11 are inputted into the micro-computer μC by this communication. On completing the communication, the terminal CSLM is set to the "L" level (#1615).

Then, in the following step #1620, it is judged whether or not single-spot photometry mode is selected, and when it is selectED (FB$_{12}$=1), the luminance value Bv$_2$ of the central photometric zone LM$_2$ is set as the spot value Bvsp (#1660). When the mode is multi-spot (Fb$_{12}$=0), processing proceeds from step #1620 to step #1622, and judgment is made on whether or not the flag AFNF showing non-AF mode is set and whether the flag LCONF showing that focusing is impossible is set. When either flag is set, processing proceeds to the above-mentioned step #1660, where the small photometric zone LM$_2$ at the center is adopted for the spot value Bvsp, and processing returns. When neither flag AFNF nor LCONF is set, the image magnification $\beta$ is calculated by $\beta$=(focal length)/(subject distance) (#1625). Then, in the next step #1630, judgment is made on whether or not this image magnification $\beta$ is not less than a predetermined value KB. If the calculated value $\beta$ is not less than the predetermined value KB, the subject is assumed to be large in the photographing frame, and in step #1640, an average value of the luminance values Bv$_1$, Bv$_2$ and Bv$_3$ of the respective photometric zones LM$_1$, LM$_2$ and LM$_3$ is adopted as a spot photometric value Bvsp, and processing returns.

When the above-mentioned image magnification $\beta$ is less than the predetermined value KB, the photometric zone including the focusing spot used for detection of focus condition is adopted as the photometric value Bvsp of the main subject. In this embodiment, the focusing spot is determined by which of the flags AF1F to AF3F is set. So, if the flag AF1F is set, the luminance value Bv$_1$ of the photometric zone LM$_1$ is adopted, and if the flag AF2F is set, the luminance value Bv$_2$ of the photometric zone LM$_2$ is adopted, and if the third island AF$_3$ is selected, the luminance value Bv$_3$ of the photometric zone LM$_3$ is adopted respectively as the spot photometric value Bvsp (#1645-#1665).

Then the flag AFEF is checked at step #1670 whether the right focus is obtained now. If YES (AFEF=1), an AE-lock flag AEFL is set at step #1675 to lock AF and AE, and otherwise (AFEF=0) the flag AEFL is reset at step #1680. The process then returns.

Figure 20:
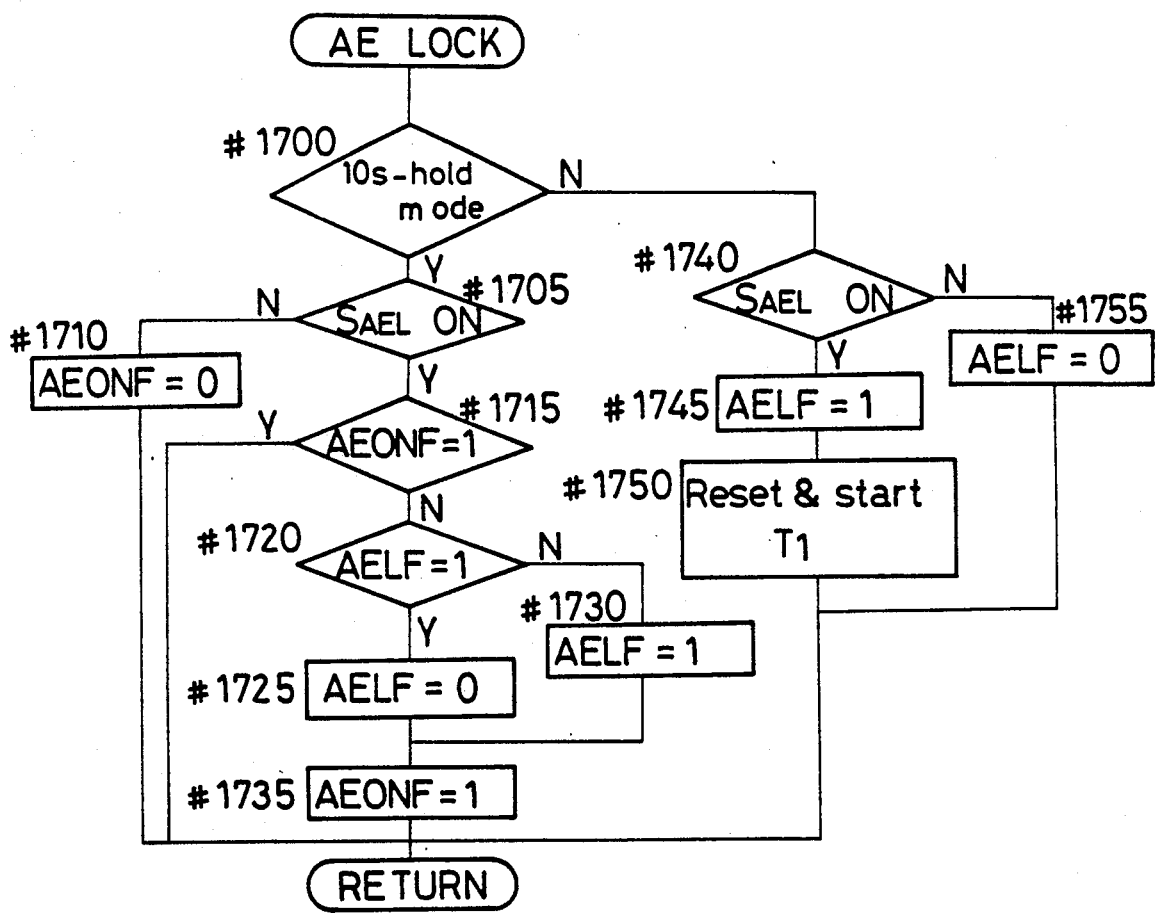
FIG. 20 is a flowchart of a routine of AE lock.

After determining the spot photometric value in such a manner, in FIG. 6(a), processing proceeds to step #450, and performs the control relating to AE-lock. This control is described in reference to a flowchart as shown in FIG. 20. It is noted that there are two modes: in the first mode, once the AE-locking switch S$_{AEL}$ is depressed, exposure value is locked and the AE lock is released by depressing the AE locking switch S$_{AEL}$ again or by releasing the power-hold (10-second hold mode); and in the second mode, the AE-locked state is held only during depression of the AE locking switch. These modes are selected by the IC card. In step #1700 of FIG. 20, first, the micro-computer $\mu$C judges which of the above-mentioned two modes is set based on data MSb$_5$ of the E$^2$PROM, and when it is the first mode (the 10-second hold mode), it proceeds to step #1705, and judges whether or not the AE-locking switch S$_{AEL}$ is ON. When the switch S$_{AEL}$ is not ON, the micro-computer $\mu$C resets a flag AEONF in step #1710 and returns. The flag AEONF shows that the AE-lock switch has been operated and the flows of step #1705 et seq. have been executed.

When the AE-locking switch S$_{AEL}$ is ON in step #1705, whether or not the above-mentioned flag AEONF is set is judged in step #1715, and when it is set, processing returns immediately. When it is not set, processing proceeds to step #1720, and judgment is made on whether or not the flag AELF showing that AE-lock is effective is set. When the flag AELF is not set, it is assumed that the AE-lock switch operation is made to effect AE-lock, thus this flag is set (#1730) and processing proceeds to step #1735. When the flag AELF is set, it is assumed that the switch operation is made to release the AE-lock state, and the flag AELF is reset (#1725), and processing proceeds to step #1735. In step #1735, the flag AEONF is set. Then processing returns.

In step #1700, when the mode is not the 10-second hold mode, in step #1740, judgment is made on whether or not the AE lock switch S$_{AEL}$ is ON, and when it is not ON, the flag AELF is reset (#1755). When it is ON, a flag AELF$_1$ is set (#1745), and the timer T$_1$ for holding power is reset and started (#1750), and processing returns. Thus, while the AE locking switch S$_{AEL}$ is ON, power is held.

In FIG. 6(a), on completing the control of this AE-lock, the micro-computer $\mu$C performs a second-time communication with the card. This data communication is described in reference to FIG. 5(b). In step #325, the micro-computer $\mu$C judges whether or not the card is attached, and when it is not attached (CKb$_0$=0), processing by the micro-computer returns without performing data communication. When the card is attached, the terminal CSCD is set to the "H" level (#330), and data is outputted to the IC card CD (#335) to show that the IC card is the input side. Then, in step #340, judgment is made on whether or not the IC card attached to the camera is a mode-setting card. When it is a data setting card (b$_2$=1 in 20H), switch data stored in step #900 in FIG. 12 is set to a register (#344), and serial communication is performed (#348), and switch information is outputted to the IC card CD. Then, the terminal CSCD is set to the "L" level (#350), and processing returns.

When the card is a program card (b$_2$=0 in 20H), exposure control data, flash data and lens data which are required for exposure operation are set (#346), and serial communication is performed (#348), and these data are outputted to the IC card. Then the terminal CSCD is set to the "L" level (#350). The second-time data communication is thus completed, and processing returns.

The data for exposure control include the photometric values B$_{VS}$ and B$_{VAN}$, the film speed Sv and data showing a positive or negative type of the film. The lens data include the focal length data, the open aperture value Avo, and the maximum aperture value Avmax. The flash data include data showing full flashlight emission or auto flashlight emission, data showing whether flashing unit is not attached yet (including power-OFF), guide number GN and data of completion or non-completion of charging.

In FIG. 6(a), after completing the above-described data communication II, the micro-computer $\mu$C proceeds to step #460, and performs exposure calculations.

Description is made for the flow of this control according to FIGS. 22-26. First, in the step #2000 of FIG. 22, the micro-computer $\mu$C determines from MSB$_{32}$-MSB$_{34}$ of E$^2$PROM the regular exposure adjustment value $\Delta$Ev$_1$, and add it to a manually set value $\Delta$Ev at step #2001 to make the exposure adjustment value $\Delta$Ev. Then at step #2002, it is determined whether or not a lens is attached based on the inputted lens data. When a lens is not attached, the micro-computer $\mu$C adds the film speed Sv and the exposure adjustment value ΔEv to the photometric value $B_{VAM}$ of the photometric zone $LM_4$ (in place of this, the average value of the whole may be used), and thereby calculates the shutter speed Tv like the stopped-down-aperture metering method, and returns (#2005). When a lens is attached, it performs an exposure operation corresponding to each exposure mode (#2010-#2040). Then, description is made for exposure operation of the P mode according to FIGS. 23(a) to 23(c). First, in step #2100 of FIG. 23(a), the micro-computer μC judges that it is the back-light state when the difference between the photometric value $B_{VAM}$ of the photometric zone $LM_4$ and the spot photometric value $B_{VSP}$ obtained in step #445 is not less than 2 Ev. If the difference is not less than 2 Ev(#2100), it is judged whether or not the flash apparatus has completed preparation for light emission (the main condenser is fully charged) in step #2105. When preparation of light emission is completed, a terminal FLOK is set to the "H" level (#2110) to make flashlight photographing possible, and a control exposure value Ev is calculated as $Ev = B_{VAM} + Avo + Sv - 1 + \Delta Ev$ (#2115). Here, 1 is subtracted because the background level is raised by 1 Ev to pretend the counter back-light. The main subject will be illuminated adequately by a flashlight from the flash apparatus. Then, processing proceeds to a subroutine of a program I (#2120) for determining the aperture value Av and the shutter speed Tv, and returns. This subroutine is explained according to FIG. 23(b). A control value Tvc of the shutter speed is set to a synchronizing speed of Tv=7 (1/125 sec.) in step #2200, and the aperture value Av is calculated by subtracting 7 (shutter speed) from the exposure value Ev (#2205). And then whether or not this aperture value is larger than 7 (F=11) is judged in step #2210, and when this value Av is larger, the control aperture value Avc is restricted to 7, and processing returns (#2215). When the aperture value Av is 7 or less, it is judged whether or not the calculated aperture value Av is smaller than the open aperture value Avo (#2220). When the calculated value Av is smaller, the open aperture value Avo is set as the control aperture value Avc (#2225). When the calculated value Av is not smaller, the calculated value Av is set as the control aperture value Avc (#2230). After each of steps #2215, #2225 and #2230, processing returns.

Figure 23A:
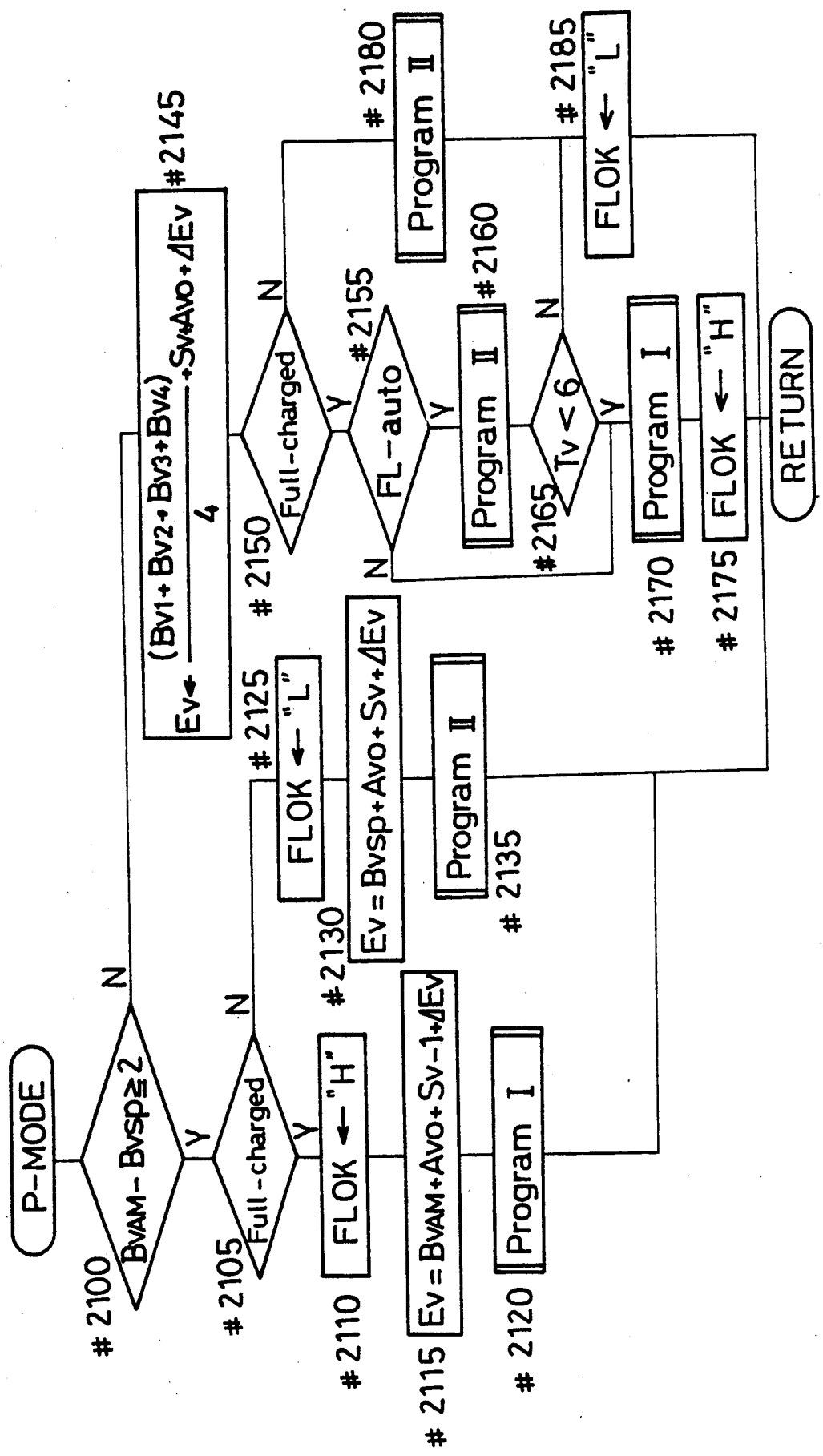
FIGS. 23(a) to 23(c), FIG. 24, FIG. 25 and FIG. 26 are flowcharts for the respective modes in the flowchart in FIG. 22.
Figure 23B:
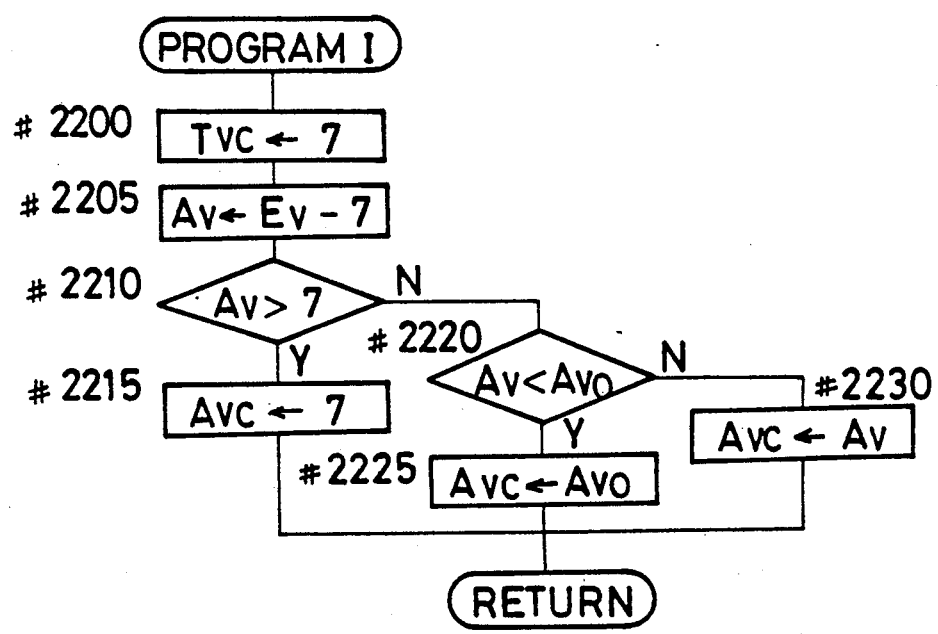

Reverting to FIG. 23(a), in step #2105, when the preparation of light emission of the flash apparatus FL is not completed, the terminal FLOK is set to the "L" level (#2125). Then, in order to achieve a proper exposure of the main subject, the control exposure value Ev is calculated by $Ev = Bvsp + Avo + Sv + \Delta Ev$ (#2130), and processing proceeds to a subroutine of a program II for determining the aperture value Av and the shutter speed Tv, and returns.

Figure 23C:
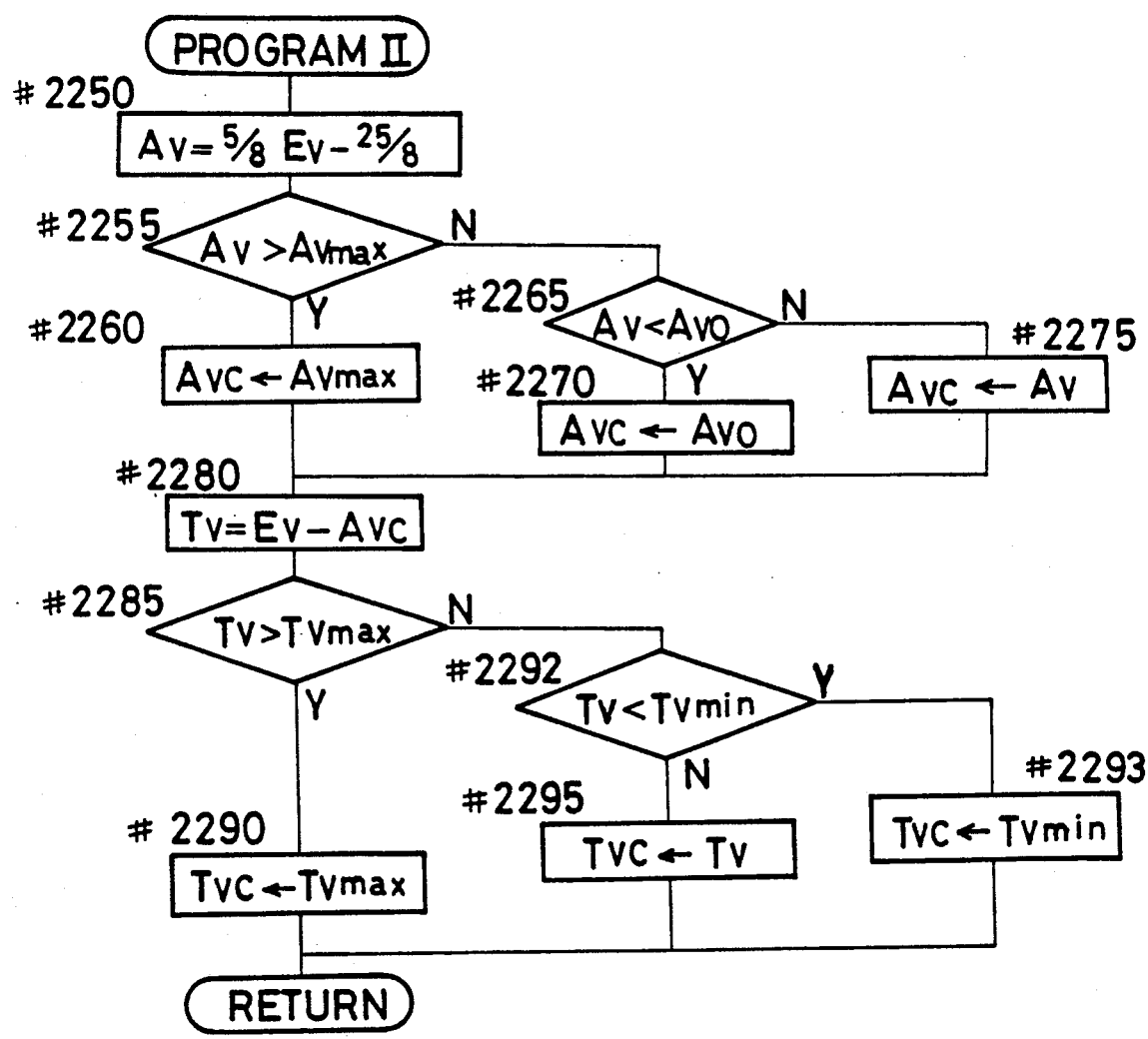

This subroutine is shown in FIG. 23(c). First, in step #2250 of FIG. 23(c), the aperture value Av is calculated by $Av = \frac{3}{8}Ev - 25/8$, and judgment is made on whether or not this aperture value Av is larger than the maximum aperture value Avmax of the lens (#2255). When the value Av is larger, the maximum aperture value Avmax is set as the control aperture value Avc (#2260), and processing proceeds to step #2280. When the aperture value Av is not larger than the maximum aperture value Avmax in step #2255, judgment is made on whether or not the aperture value Av is smaller than the open aperture value Avo (#2265), and when the value Av is smaller, the open aperture value Avo is set as the control aperture value Avc (#2270), and when the value Av is not smaller, the aperture value Av is set as the control aperture value Avc (#2275), and processing proceeds to step #2280, respectively.

In step #2280, the shutter speed Tv is calculated by subtracting the control aperture value Avc from the exposure value Ev, and in the next step #2285, judgment is made on whether or not this value Tv is larger than a highest shutter speed Tvmax. When the value Tv is larger, the control shutter speed Tvc is restricted to Tvmax (#2290), and when the value Tv is not larger, the shutter speed Tv is set as the control shutter speed, (#2295), and processing returns, respectively.

Reverting to FIG. 23(a), in step #2100, when the difference $B_{VAM} - Bvsp$ is less than 2, it is assumed not to be the back-light state, and processing proceeds to step #2145, where the exposure value Ev is calculated from the average photometric value $(Bv_1 + Bv_2 + Bv_3 + Bv_4)/4$ of the photometric zones $LM_1$-$LM_4$, and whether or not the flash apparatus has completed preparation for light emission is judged (#2150).

When it has completed preparation for light emission, processing proceeds to step #2155, and judgment is made on whether or not the mode is the auto flashlight photographing mode in which the system automatically judges whether or not flashlight photographing should be performed. When it is the auto mode, the aperture value Av and the shutter speed Tv are determined by the above-mentioned program II (#2160), and then judgment is made on whether or not this shutter speed Tv is less than the blur-warning speed (Tv=6, 1/60 sec.) (#2165). When the speed Tv is less (slower) than the blur-warning speed, processing proceeds to step #2170 to perform flashlight photographing. When the mode is not the auto mode in step #2155, processing proceeds also to step #2170 to perform full light emission. Then the aperture value Av and the shutter speed Tv at flashlight photographing are determined by the program I, and subsequently the terminal FLOK is set to the "H" level (#2175) to make flashlight photographing possible.

However, when the preparation for light emission is not completed, processing proceeds from step #2150 to step #2180 to perform photographing by natural light, and the aperture value Av and the shutter speed Tv are determined by the program II, and subsequently the terminal FLOK is set to the "L" level (#2185), and processing returns. Also, in step #2165, when the shutter speed Tv is 7 or more (higher than the tuning speed), process also proceeds to step #2185, and returns.

Figure 24:
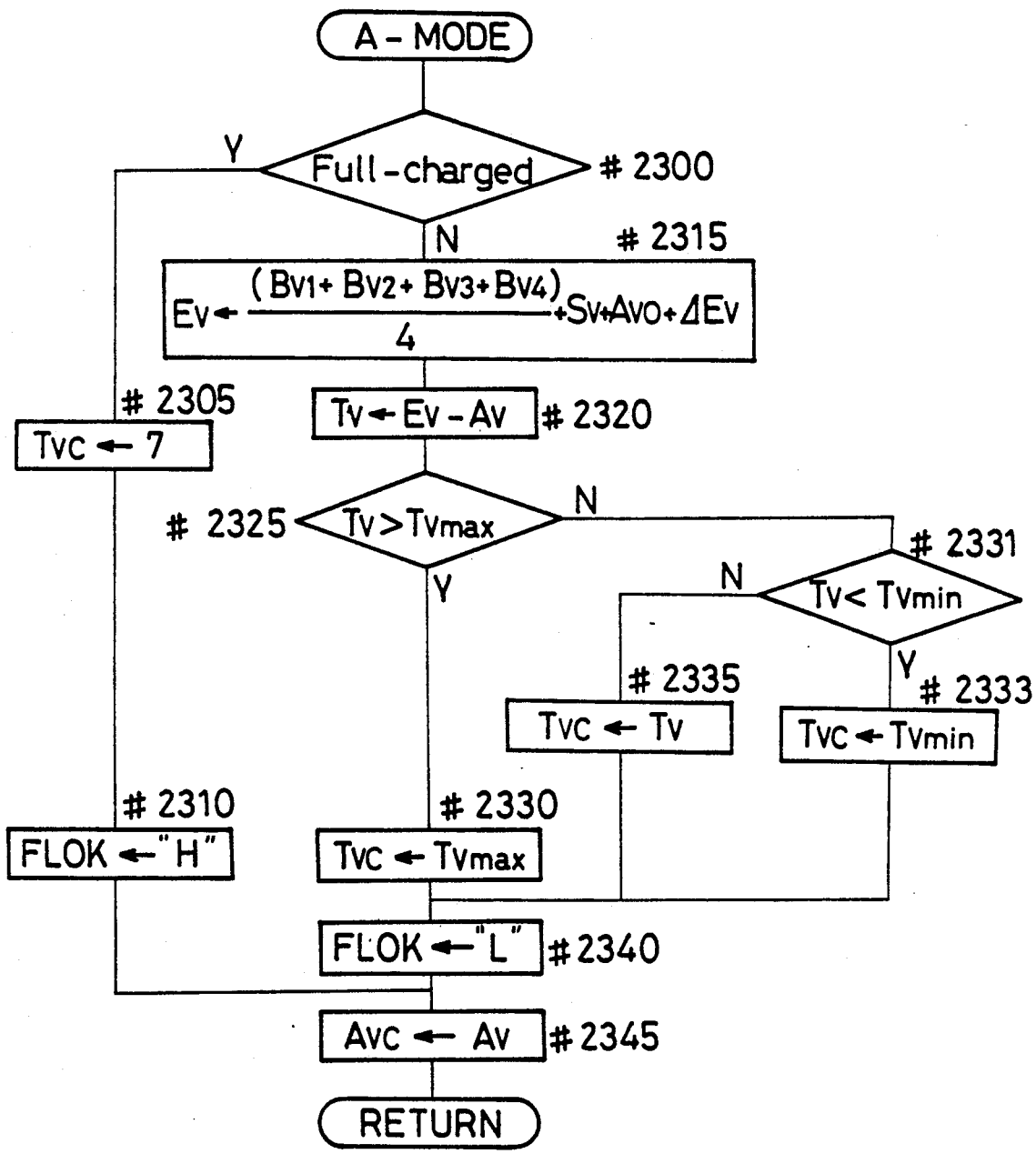

Next, description is made for a flowchart of determining the aperture value Av and the shutter speed Tv in the A mode according to FIG. 24. First, judgment is made on whether or not the flash apparatus has completed preparation for light emission, and if the preparation is completed, the control shutter speed Tvc is set to 7 (1/125 sec.), the terminal FLOK is set to the "H" level, and the set aperture value Av is adopted as the control aperture value Avc, and process returns (#2300-#2310 and #2345). When preparation for light emission in not completed, the exposure value Ev is calculated as shown in FIG. 24 (step #2315). The value obtained by subtracting the set aperture value Av from this exposure value Ev is adopted as the shutter speed Tv (#2320). Then, in the next step #2325, judgment is made on whether or not this shutter speed Tv is larger than the maximum controllable speed Tvmax. When the speed Tv is higher, the maximum shutter speed Tvmax is set as the control shutter speed Tvc, and when it is not higher, the calculated shutter speed Tv is set as the control shutter speed Tvc (#2325–#2335), and processing proceeds to step #2340. In step #2340, the terminal FLOK is set to the "L" level, and in the following step #2345, the set aperture value Av is set as the control aperture value Avc.

Figure 25:
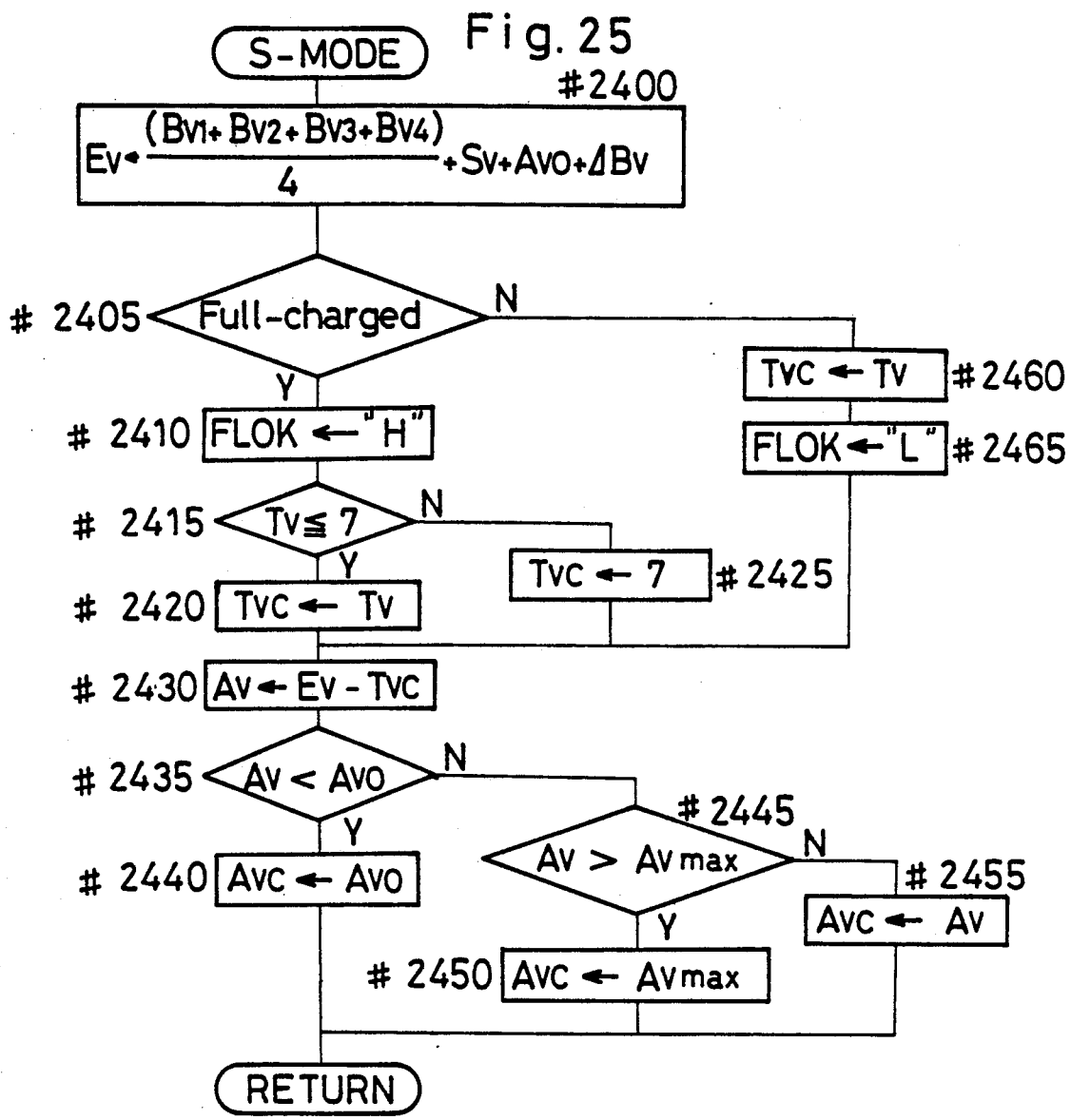
Figure 26:
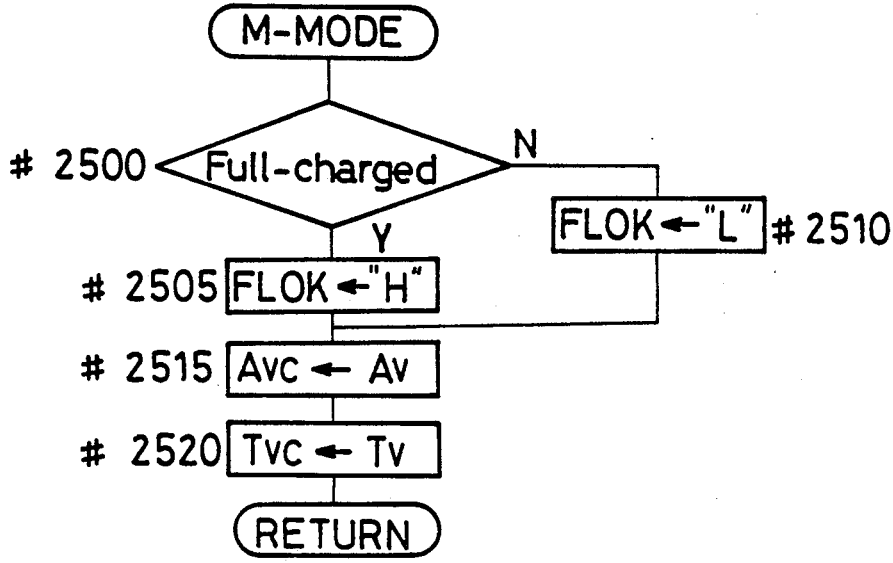

Next, description is made on control in the S mode based on FIG. 25. First, in step #2400, the exposure value Ev is evaluated from the average photometric value and the like, and in step #2405, judgment is made on whether or not preparation for light emission is completed, and when the preparation is completed, the terminal FLOK is set to the "H" level (#2410).

Next, in step #2415, whether or not the shutter speed Tv is 7 or less is judged, and if it is 7 or less, the set shutter speed Tv is set as the control shutter speed Tvc (#2420), and if it exceeds 7, the tuning speed 7 is set as the control shutter speed Tvc (#2425), and processing proceeds to step #2430, respectively.

In step #2430, the aperture value Av is calculated by subtracting the control shutter speed Tvc from the calculated exposure value Ev, and judgment is made on whether or not this aperture value Av is smaller than the open aperture value Avo (#2435). When the value Av is smaller, the open aperture value Avo is set as the control aperture value Avc (#2440), and processing returns. On the other hand, when the aperture value Av is not smaller than the open aperture value Avo, whether or not it is larger than the maximum aperture value Avmax is judged (#2445), and when it is larger, the maximum aperture value Avmax is set as the control aperture value Avc (#2450), and when it is not larger, the calculated aperture value Av is set as the control aperture value Avc, and processing returns.

In step #2405, when preparation for light emission is not completed, the set shutter speed Tv is set as the control shutter speed Tvc (#2460), and the terminal FLOK is set to the "L" level (#2465), and processing proceeds to step #2430.

Next, when the mode is the M mode (FIG. 26), whether or not preparation for light emission is completed is judged in step #2500. When it is not completed, the terminal LFOK is set to the "L" level, and when it is completed, the terminal FLOK is set to the "H" level, and processing proceeds to step #2515 respectively. In this step #2515, the aperture value Av set in advance is set as the control aperture value Avc, and in the following step #2520, the shutter speed Tv is set as the control shutter speed Tvc, and processing returns.

Reverting to FIG. 6(a), after completing exposure operation (#460), the micro-computer μC performs a third-time data communication with the IC card CD (#465). A flowchart of this data communication is explained based on FIG. 5(c). First, the terminal CSCD is set to the "H" level (#355), and the micro-computer μC performs serial communication with the IC card CD to inform the IC card that the IC card is the output side (#360). Here, it waits for a time (#365), and inputs data from the IC card CD by serial communication (#370). After completing this data communication, it sets the terminal CSCD to the "L" level, and returns.

In this flow, the data sent from the mode setting card differs from the data sent from the program card. In the case of the mode setting card, the data include mode-setting data, and display-controlling data determining whether or not display is to be made. The data include (Table 7), ① the control shutter speed C·Tvc, ② the control aperture value C·Avc, ③ with/without flashlight emission, ④ full/non-full emission of flashlight and ⑤ control/non-control by the card.

Figure 27:
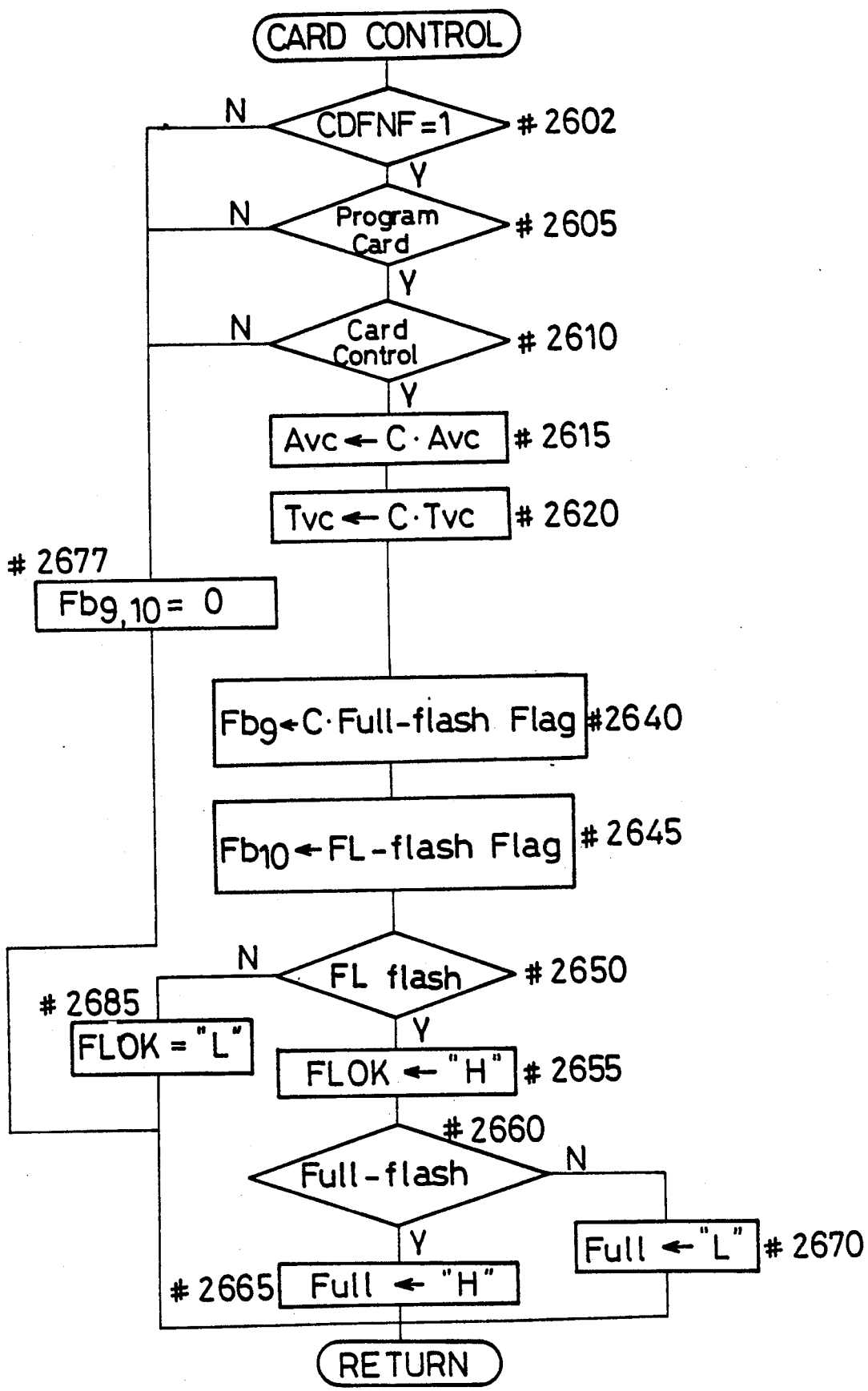
FIG. 27 is a flowchart of a control by the IC card (particularly the program card).

In FIG. 6(a), after completing this card data communication III, the micro-computer μC executes the subroutine of the card control in step #470. Based on the inputted data, this subroutine determines whether or not control of the camera by the IC card (in this case, the program card) is to be performed, and, if to be performed, operation of the camera in performing the control. This is shown in FIG. 27. First, in step #2602, the micro-computer μC judges whether or not a card function is selected, and when a card function is selected (CDFNF=1), processing proceeds to step #2605. On the other hand, when no card function is selected (CDFNF=0), function bits Fb9 and Fb10 are reset to 0 respectively in step #2677, and processing returns. When a card function is selected, next, judgment is made on whether or not a program card is attached (#2605). When a program card is attached ($b_2=0$ in 20H), judgment is made on whether or not the camera is controlled by the IC card based on the data inputted from the IC card CD (#2610). When the card is not a program card ($b_2=1$ in 20H), or when the camera is not to be controlled by the IC card, processing proceeds to step #2677.

When it is judged that the camera is controlled by the IC card, the control aperture value Avc, the control shutter speed Tvc, full/non-full light emission, with/without flashlight emission are determined respectively based on the data inputted from the IC card (#2615–#2645). Subsequently, whether or not the mode is of flashlight emission is judged based on the inputted data (#2650), and when the mode is not of flashlight emission, the terminal FLOK is set to the "L" level (#2685), and processing returns. When the mode is of flashlight emission, the terminal FLOK is set to the "H" level (#2655), and whether or not the mode is of full light emission is judged (#2660). When the mode is of full light emission, a terminal Full is set to the "H" level is step #2665, and processing returns. When the mode is not of full light emission, the terminal Full is set to the "L" level (#2670), and processing returns.

After completing the above-described subroutine (#470) in FIG. 6(a), processing proceeds to a display control (#472).

The data sent from the micro-computer μC to the display control circuit DISPC are listed in Table 9. The shutter speed and the aperture value data are adopted from the set value or calculated value. Various mode display data are derived from the data of the current modes. Data for the AE-mode display is made from the data of currently selected mode ($b_0$, $b_1$), and from the data read out of the $E^2$PROM ($b_2$–$b_4$). Bits $b_2$–$b_4$ correspond to the changing mode II. Data for the display relating to the card and the data-change is made according to the respective current mode. The bit $b_7$ is set ($b_7=1$) when the multi/single-spot display flag is set, and is used to make the multi-spot mode or single-spot mode display in the camera body display panel (DISPj) when either mode is preferentially selected (e.g. single-spot or multi-spot mode selected by the program card, or single-spot AF mode selected by the lens switch $S_Q$) and mode change between them is not allowed.

The frame number data (06H), and the film present-/absent-indicating data (07H) are made according to the current status. Display data for modes relating to IC card are made as: "$b_0$" in (I) (08H) is set according to the card attached; (II) and (III) are set either according to $E^2PROM$ (when data is not set) or according to data of change-mode sent from the IC card (when data is set). The display control is performed according to the predetermined sequence of the camera, and the display control circuit DISPC determines which item to display according to this display data. If the display DIS-$P_{II}$ is required, the corresponding data is set. The display sequence is explained referring to FIG. 28.

First, in step #2700, the micro-computer $\mu C$ judges whether or not the flag CDFNF is set. The flag shows whether or not the card function is actuated. When the flag is set, in next step #2710, the micro-computer judges whether or not the flag CDIF showing that processing has passed once through the following steps #2710–#2720 is set. When the flag CDIF is not set, this is set in step #2715, and a flag DISPIF is also set in step #2720, and processing proceeds to step #2725. The flag DISPIF is prepared for performing display of the function added by the card for a predetermined time when the state that the card function is not actuated is changed to the actuated state. When the card function is not actuated (CDFNF=0), the flag CDIF is reset in step #2705, and processing proceeds to step #2725. When this flag CDIF is set, processing proceeds from step #2710 to step #2725 without performing anything.

In step #2725, whether or not the above-mentioned flag DISPIF is set is judged, and when it is set, whether or not the card is a program card is judged in step #2727. In the case of program card, data for a display "PRO" (program card) and data for a display "CARD" (the card is functioning) are prepared in step #2728. The display in this case is shown in FIG. 35(a).

Bits $b_5$, $b_6$ at address 05H of the display register (RAM) is set as "1, 0" and $b_1$–$b_4$ as "0, 0, 0, 0". The display control circuit DISPC displays as in FIG. 35(a) based on this data.

When the card is not a program card, i.e. when the card is a mode setting card or when no card is attached, the function given by the card which has been set in the camera is displayed as in FIGS. 34(a)–(e) by setting $b_1$–$b_4$=0 and $b_5$, $b_6$=1, 1 at 0AH. Display data and display are changed responding to the set data.

When the flag DISPIF is not set in step #2725, it is judged whether or not display control by the card is performed in the next step #2730. When display control by the IC card CD is performed, display data corresponding to the mode setting data inputted into the micro-computer $\mu C$ from the IC card is prepared (#2735) by setting $b_5$, $b_6$=0, $b_1$–$b_4$=0 at 0AH.

When a card display control signal from the IC card is not inputted (described later) in step #2730, processing proceeds to step #2736, where the micro-computer judges whether or not the write flag WRTF showing a load to the $E^2PROM$ is set. When the write flag WRTF is set, i.e., when the mode of data setting by the card is completed, processing proceeds to a subroutine of mode setting (#2737), and further proceeds to step #2740 where the data is made as $b_5$, $b_6$=0, 1 and $b_1$–$b_4$=0 at 0AH of the display register to make the normal display as shown in FIG. 2(u). When the card function is not activated (CDFNF=0), the data is made as $b_0$=0 at 0AH to cease the display of the symbol "CARD" display. If the card function is activated, the display data is made as $b_0$=1 to display "CARD".

At steps #2728, #2729, #2735 and #2740, the display is made also in the viewfinder display $DISP_{II}$. The bits $b_0$–$b_5$ at address 0CH are set respectively according to right focus flag AFEF, focusing-impossible flag LCONF, subject-following mode flag (follow-flag), continuous-AF mode flag bit $Fb_8$, multi-/single-spot focusing flag bit $Fb_2$, and $S_1$ ON/OFF flag S10NF. The display control circuit DISPC turns off the viewfinder display regardless of the data $b_0$–$b_4$ when the switch $S_1$ is OFF.

After any of steps #2728, #2729, #2735 and #2740, the process proceeds to step #2745 where the terminal CSDISP is set "H" level. A serial communication from the camera to DISPC is performed (#2750), and the terminal CSDISP is set "L" level (#2755).

Next, in step #2760, judgement is made on whether or not the flag DISPIF is set, and when the flag is set, processing waits for 2.5 second (#2765) during which display is performed.

In the next step #2770, the flag DISPIF is reset, and processing proceeds to step #2780. When the flag DISPIF is not set in the above-mentioned step #2760, processing skips steps #2765 and #2770, and proceeds to step #2780. In step #2780 it is judged whether or not the control shutter speed Tvc is less than 6 (1/60 sec.). If it is less than 6, judgment is made on whether or not the buzzer-warning mode is selected (#2785). If this mode is selected ($MSb_9$–$MSb_{12}$=0H, 2H, 4H, 6H, 8H, AH, CH, EH), pulses of a predetermined frequency are outputted for a certain time from a terminal 0BZ to perform a warning by a buzzer BZ (#2790), and processing proceeds to step #2792.

When the control shutter speed Tvc is 6 or more or in the case of the non-buzzer-warning mode ($MSb_9$–$MSb_{12}$=1H, 3H, 5H, 7H, 9H, BH, DH, FH), processing proceeds to step #2792 without performing a buzzer warning.

In step #2792, a flag WRTF is checked. When the flag WRTF is set, the mode-setting data ($b_1$–$b_4$ at 22H; $b_0$–$b_2$ and $b_4$–$b_7$ at 23H, $b_0$–$b_6$ at 24H, and $b_0$–$b_2$ at 26H) is copied to the corresponding bits of $E^2PROM$ ($MSb_0$–$MSb_3$, $MSb_5$–$MSb_{12}$, $MSb_{26}$–$MSb_{34}$) at step #2794. Then the flag WRTF is reset at step #2796, and the process returns. If the flag WRTF is not set in step #2792, process directly returns.

Figure 30:
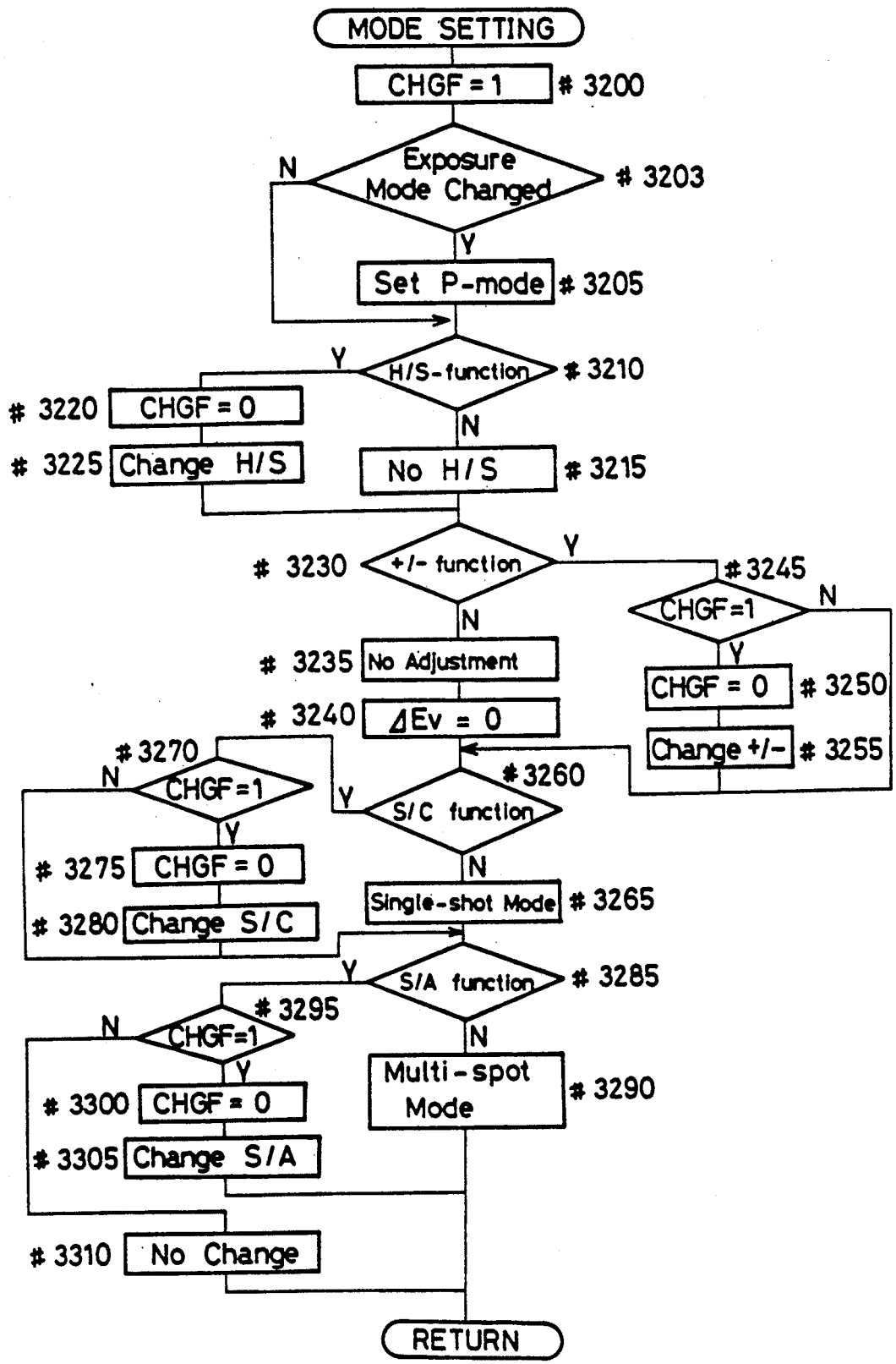
FIG. 30 is a flowchart of a routine for mode setting.

A subroutine (#2737) of the above-mentioned mode setting is shown in FIG. 30. Here, judgement is made on whether or not the mode set at present is included in the modes to be selected by the IC card CD anew, and if it is not included, the mode is changed to another selected mode. For example, when A mode has been excluded from selection of the exposure mode by the IC card, it is not proper to perform the display and control of the A mode, therefore this is prevented.

In the flow of FIG. 30, first the micro-computer $\mu C$ sets a flag CHGF which is reset when the changeable mode for selecting one exposure mode is present (#3200), and judges whether or not any changeable exposure mode has been changed by comparing data $MSb_6$–$MSb_8$ of the $E^2PROM$ with data $b_0$–$b_2$ at 23H inputted from the IC card CD (#3203). When they differ (that is, when that exposure mode has been changed), data $Fb_0$, $Fb_1$ are set to 0, 0 (#3205) to forcedly change the exposure mode to P mode, and processing proceeds to step #3210.

Subsequently, in step #3210, whether or not the H/S mode exists is judged, and when it exists ($b_1$=1 at 22H), the above-mentioned flag CHGF is reset (#3220), and changing data $CDb_0$–$CDb_2$ are set to (0, 0, 0) as H/S change mode in step #3225, and processing proceeds to step #3230.

When it is not in the H/S mode ($b_1=0$ at 22H), data $Fb_6$ and $Fb_7$ are set to 0, 0 (no-H/S change), and processing proceeds to step #3230.

In step #3230, whether or not the ± mode exists is judged, and when it exists ($b_2=1$ at 22H), whether or not the flag CHGF is set is judged in step #3245, and when the flag is set, the flag is reset (#3250), and the changing data $CDb_0$–$CDb_1$ are set to (0, 0, 1) showing the ± change mode in step #3255, and processing proceeds to step #3260.

When the flag CHGF is not set in step #3245, processing skips steps #3250 and #3255 and proceeds directly to step #3260.

In step #3230, when it is not in the ± mode ($b_2=0$ at 22H), the function data $Fb_4$ and $Fb_5$ are set to 0, 0 regarding as no adjusting (#3235), and a quantity of adjustment of exposure is set to zero ($\Delta E=0$) in step #3240, and processing proceeds to step #3260.

In step #3260, whether or not the S/C mode exists is judged, and when it exists ($b_3=1$ at 22H), whether or not the flag CHGF is set is judged in step #3270. When the flag is set, this flag is reset (#3275), and further regarding as S/C change, changing data $CDb_0$–$CDb_2$ are set to 0, 1, 0 in step #3280, and processing proceeds to the following step #3285.

When the flag CHGF is not set, processing skips steps #3275 and #3280 and proceeds directly to step #3285. In step #3260, when the S/C mode does not exist ($b_3=0$ at 22H), the function data $Fb_3$ is set to 0 in step #3265 to set the single-frame advancing mode, and processing proceeds to step #3285. In step #3285, it is judged whether or not the S/A mode exists, and when it exists ($b_4=1$ at 22H), it is judged whether or not the flag CHGF is set in step #3295. When the flag CHGF is set, the flag CHGF is reset (#3300), and further in the next step #3305, regarding as S/A change, the changing data $CDb_0$–$CDb_2$ are set to 0, 1, 1, and processing returns. When the flag CHGF is not set in the previous step #3295, no changeable mode is assumed to exist, and the changing data $CDb_0$–$CDb_2$ are set to 1, 0, 1 (#3310), and processing returns.

Also, when the S/A mode does not exist in step #3285 ($b_4=0$ at 22H), the function data $Fb_2$ is set to 0 to set the multi-spot AF mode (A mode) in step #3290, and processing returns.

Figure 29:
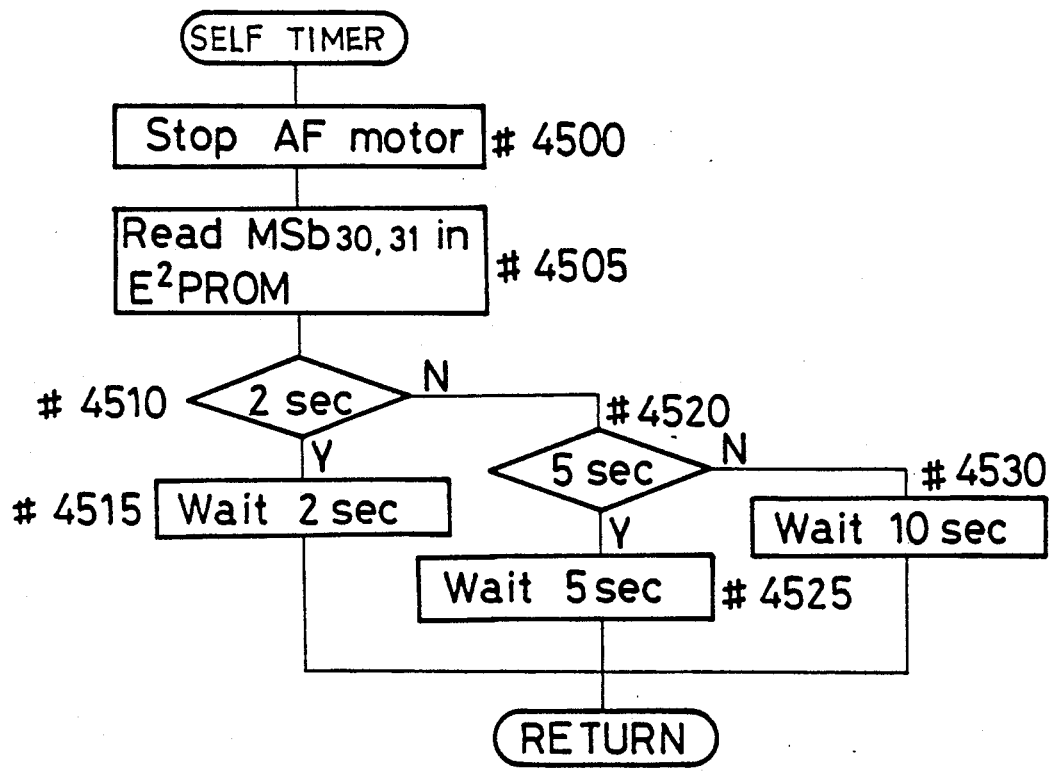
FIG. 29 is a flowchart for performing the SELF function.

In FIG. 6(a), after completing the above-described display control (#472), the micro-computer μC proceeds to step #473, and judges whether or not the release switch $S_2$ is ON, and when the switch is not ON ($IP_7$="H"), it permits interrupts (#474) and returns. When the switch $S_2$ is ON ($IP_7$="L"), it is judged whether it is currently the self-timer mode by checking the state of the self-mode selection switch $S_{SELF}$(#475). When the switch $S_{SELF}$ is ON ($IP_{12}$="L"), the processing proceeds to step #478 where the self-photographing is performed. This subroutine is explained referring to FIG. 29.

First in this routine, the micro-computer μC stops AF motor at step #4500 (because, if there is no subject in front of the lens in the self-timer mode, the auto-focusing would be adjusted to the background). Then at step #4505, a time data for the self-timer is read out from the $E^2$PROM. The time data is first checked at step #4510 whether it is 2 sec. If so ($MSb_{30}$, $MSb_{31}=0$, 0), the process waits 2 seconds at step #4515, and returns to step #490 of FIG. 6(a) where the exposure is controlled (#495). If 5 sec. or 10 sec. is selected, the process waits accordingly at step #4525 or #4530, and returns to step #490 of FIG. 6(a).

If it is not currently self-mode at step #475 ($IP_{12}$="H"), step #480 is executed where it is determined whether current mode is manual-focus (focus-lock or manual-focus-adjusting only for detecting the right-focus; MFF=1). If so, process goes to steps #490 and then #495 to control exposure, and otherwise (A mode) goes to step #485.

At step #485, the flag AFEF (showing right focus) is checked, and if it is not set, process returns without the exposure control. If the flag AFEF is set, or if the current mode is not AF mode (i.e. manual mode): all interrupts into this routine is prohibited at step #490; the exposure is controlled at step #495 (which is detailed later); the film is wound by one frame at step #500 (also detailed later); and the release switch $S_2$ is determined ON or OFF at step #505. If the release switch $S_2$ is ON ($IP_7$="L"), then whether it is continuous-advancing mode is determined at step #510. When it is continuous-advancing mode ($Fb_3=1$), all interrupts are permitted at step #515, and the process proceeds to the branch SO (#400). If it is not continuous-advancing mode ($Fb_3=0$), process returns to step #505 until the release switch $S_2$ is turned OFF, at which time all interrupts are permitted at step #520 and process returns.

Figure 31:
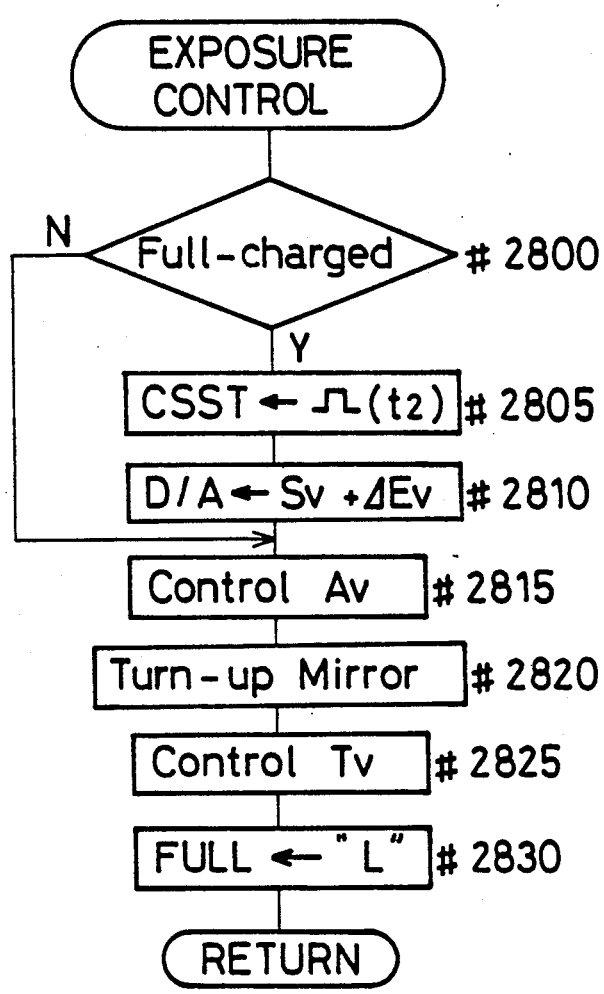
FIG. 31 is a flowchart of a routine of exposure control.

Next, a subroutine of exposure control in the above-mentioned step #495 is shown in FIG. 31. First, in step #2800, based on the data inputted from the flash apparatus ST, judgement is made on whether or not charging is completed, and when charging is completed, the terminal CSST is set to the "H" level in step #2805 for a time $t_2$ to show the exposure mode. Then, as the data for illuminating amount, the film speed Sv and the amount of exposure adjustment $\Delta Ev$ are calculated, and these data are outputted to the light adjusting circuit STC after D-A conversion into analog data (#2810).

In the next step #2815, aperture control is performed based on the control aperture value Avc, mirror-up control is performed (#2820), control of the shutter speed is performed based on the control shutter speed Tvc (#2825), the full light emission signal terminal Full is set to the "L" level (#2830), and processing returns.

Here, description is made on operation of the interface circuit for flashlight emission based on FIG. 9 (b). At flashlight photographiing, the terminal FLOK is set to the "H" level, and on completing a run of the first curtain of the shutter, the X-contact is turned On, and a light-emission-start signal is outputted from an AND circuit $AND_{21}$ to the flash apparatus ST, and the flash apparatus ST inputs this signal and starts light emission. When the mode is not the full light emission mode, the "H" level is outputted to the AND circuit through an inverter $IN_{21}$, and when a pulse signal showing completion of light adjustment from the light adjusting circuit STC is inputted and circuit $AND_{22}$ outputs this signal to the flash apparatus through an OR circuit $OR_{21}$. The flah apparatus ST inputs this signal and stops flashlight emission. In the case of the full light emission mode, the "L" level is inputted to the AND circuit $AND_{22}$, and the AND circuit $AND_{22}$ is put in the non-operating state, and inhibits passage of a light adjust signal, and therefore, a signal for stopping flashlight emission is not outputted to the electric flash apparatus ST.

Figure 32A:
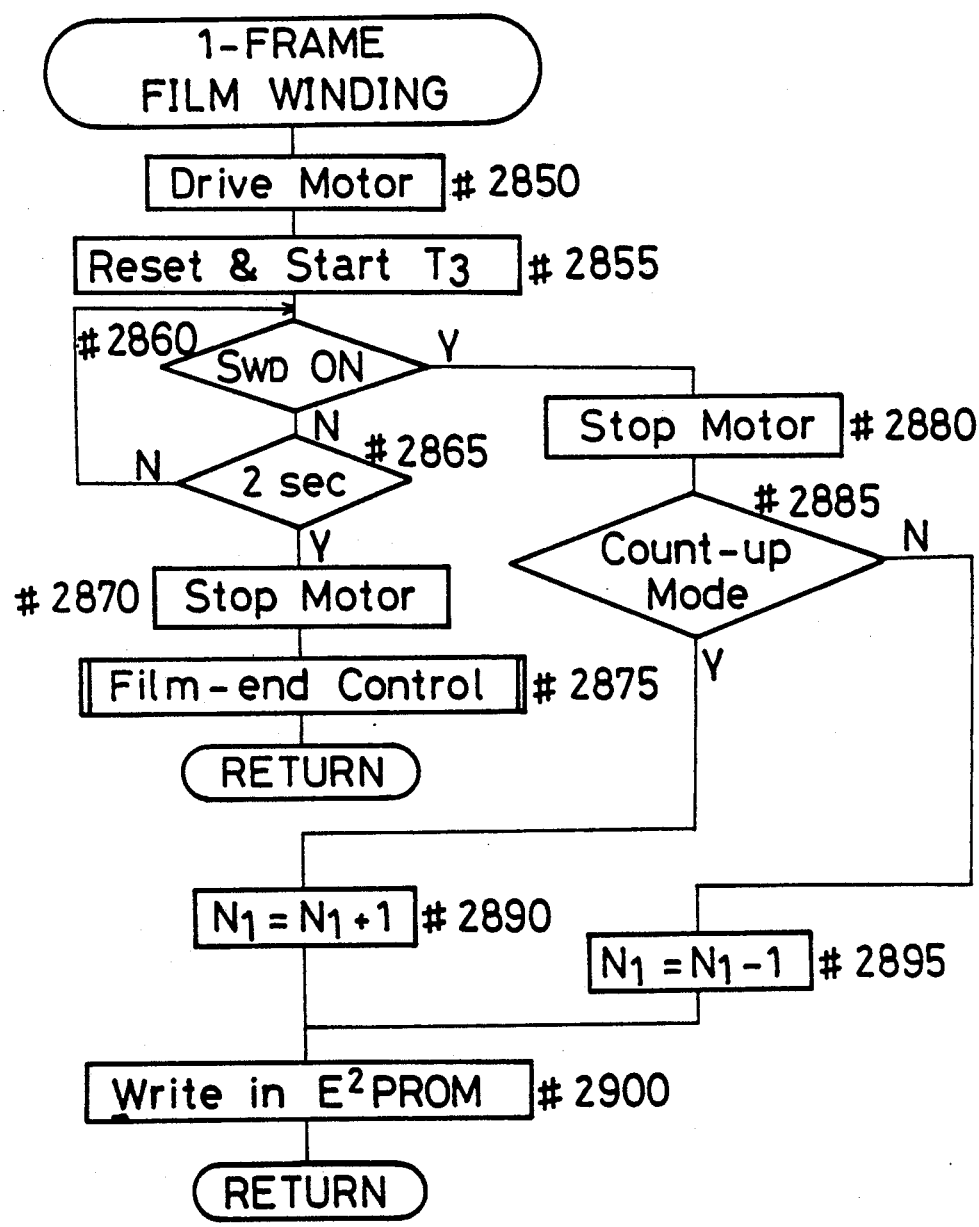
FIGS. 32(a) and 32(b) are flowcharts relating to one-frame winding of a film.
Figure 32B:
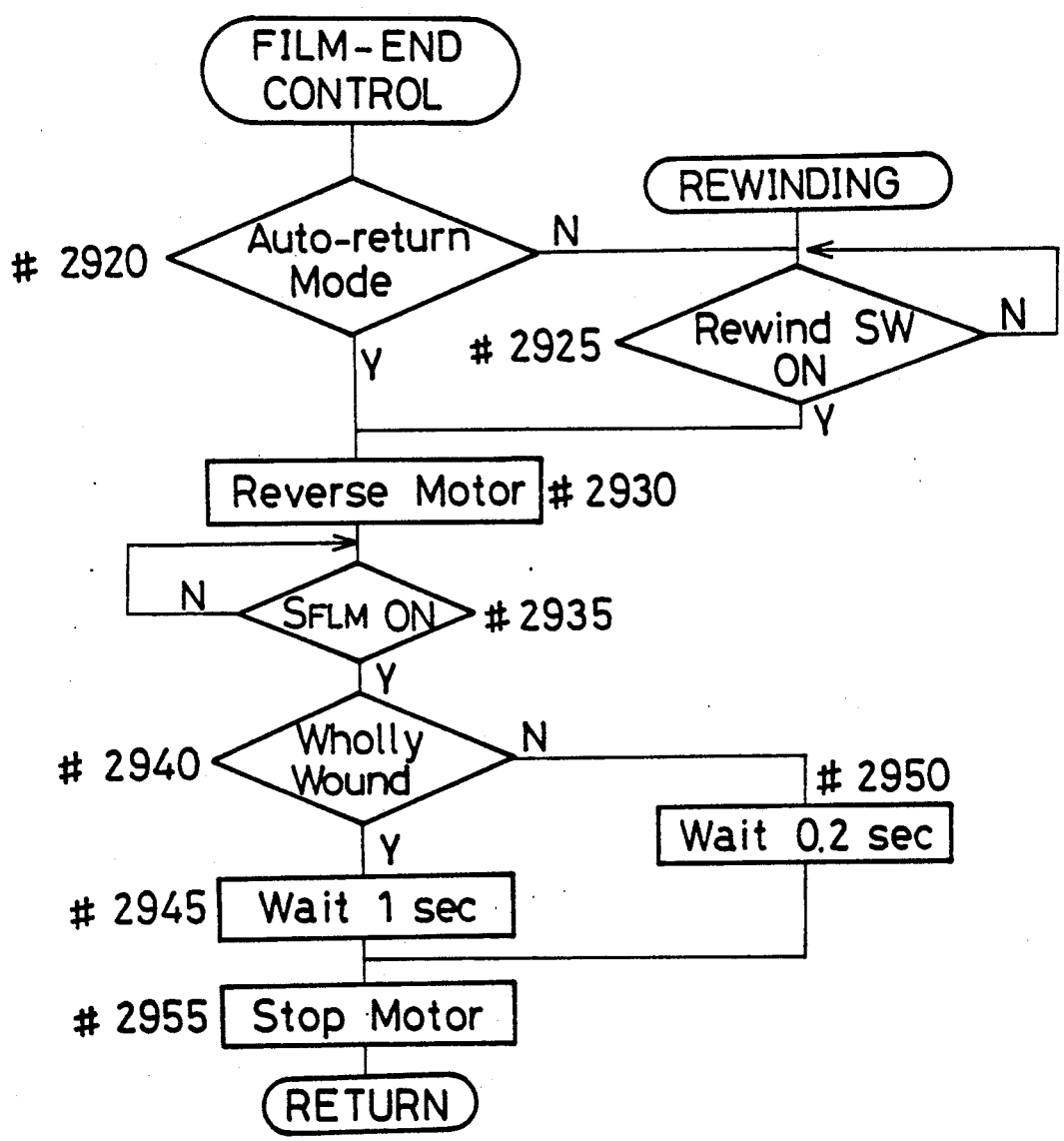

FIGS. 32(a) and (b) show flowcharts of control of one-frame winding-up of the film executed at step #500 in FIG. 6(a). In FIG. 32(a), the micro-computer $\mu C$ outputs a film wind-up signal to a motor controlling circuit MD, and resets and starts a timer $T_3$ (#2850, #2855). This timer $T_3$ is for detecting that the film is wound up to the final frame and the film tenses up. In step #2860, the micro-computer $\mu C$ judges whether or not the switch $S_{WD}$ showing that one frame has been wound up is ON. When it is not ON, the micro-computer $\mu C$ judges whether or not two seconds has elapsed in this state in step #2865. When elapsed, it stops the motor (#2870), and, assuming that the film ends (and it tenses up), performs control for the film-end (#2875), and returns. The subroutine for this control for film-end is shown in FIG. 32(b). In step #2920, judgment is made on whether or not auto return (the film is automatically rewound after it tenses up) is selected, and when it has been selected ($MSb_9$–$MSb_{12}$ = 0H–3H, 8H–BH) a signal of reverse rotation of the motor is given to the motor controlling circuit MD, and processing waits until the film detecting switch $S_{FLM}$ turns ON. Subsequently, when the switch $S_{FLM}$ turns ON, judgment is made on whether or not the film is to be wholly wound into the film cartridge, and if the film is to be wholly wound into the film cartridge ($MSb_9$–$MSb_{12}$ of the $E^2PROM$ = 2H, 3H, 6H, 7H, AH, BH, EH, FH), processing waits for one second (#2945), stops motor (#2955), and then returns.

If the whole film is not to be wound into the film cartridge ($MSb_9$–$MSb_{12}$ of the $E^2PROM$ = 0H, 1H, 4H, 5H, 8H, 9H, CH, DH), processing waits for 0.2 seconds to leave the leading tag outside, stops the motor, and returns (#2950).

When the mode is not of auto return ($MSb_9$–$MSb_{12}$ = 4H–7H, CH–FH) in step #2920, processing proceeds to step #2925 in which it waits until the rewinding switch $S_{RW}$ turns ON, and when it turns ON, processing proceeds to the above-mentioned step #2930.

Reverting to FIG. 32(a), in step #2860, when a one-frame switch $S_{WD}$ turns ON, in step #2880, the motor is stopped. In the next step #2885, judgment is made on whether or not the film counter is in count-up mode. If it is in count-up mode ($MSb_9$–$MSb_{12}$ = 0H–7H), the count number $N_1$ of exposed film frames is increased by 1 in step #2890, and processing proceeds to step #2900. On the other hand, if it is in count-down mode ($MSb_9$–$MSb_{12}$ = 8H–FH), the count number $N_1$ showing the remaining film frames is decreased by 1 in step #2895, and processing proceeds to step #2900. In step #2900, this counter number $N_1$ is written to $MSb_{13}$–$MSb_{18}$ of the $E^2PROM$.

Figure 33:
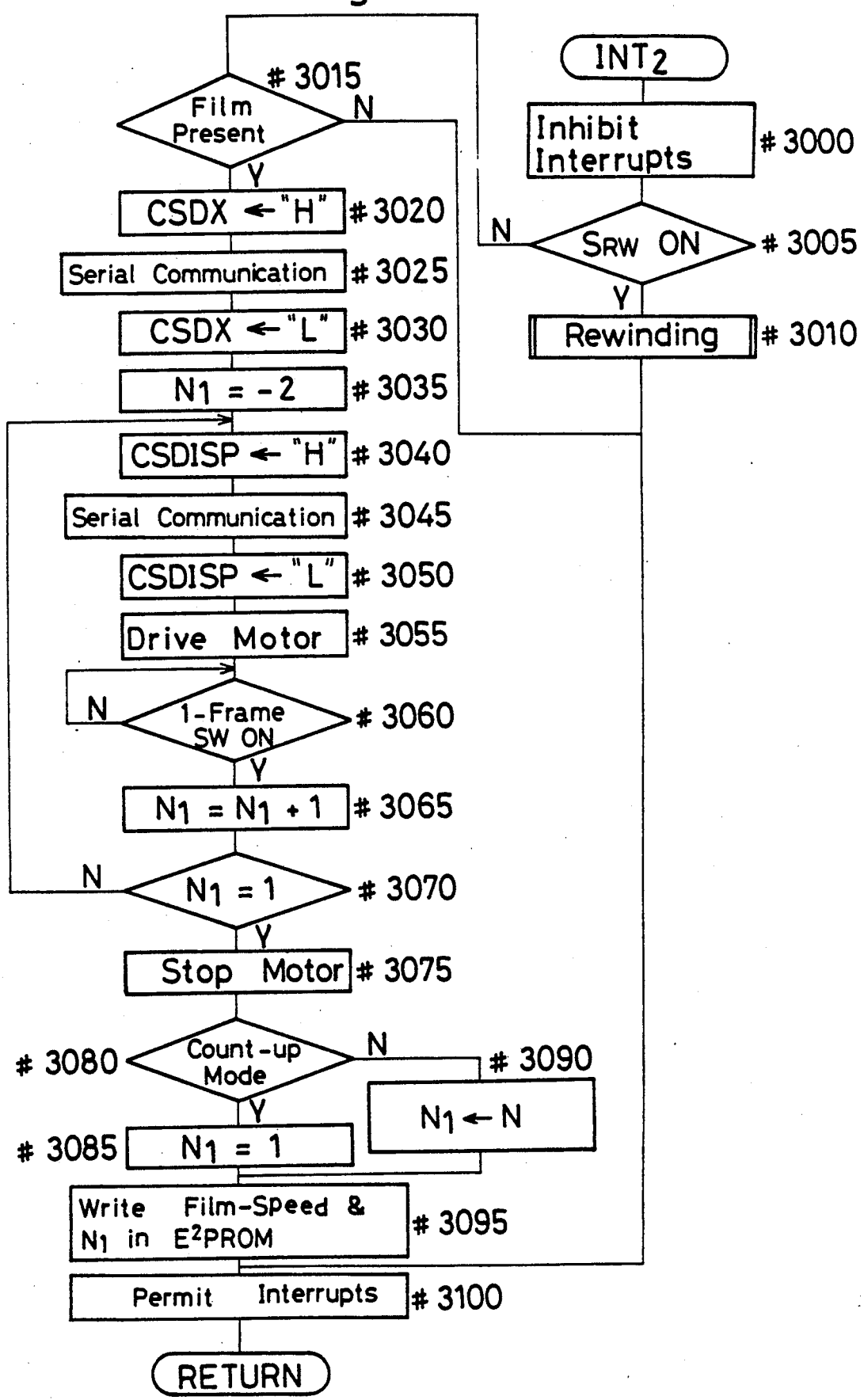
FIG. 33 is a flowchart of an interrupt routine relating to closing a rear lid.
Figure 34A:
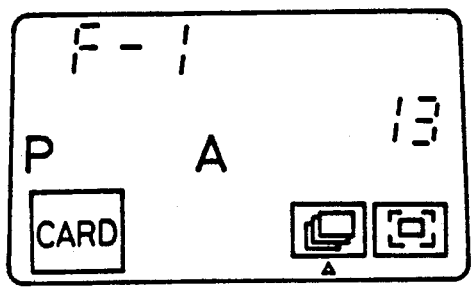
FIGS. 34(a) to 34(e) are examples of display when a card is attached.
Figure 34B:
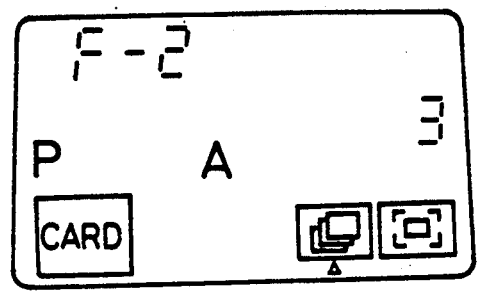
Figure 34C:
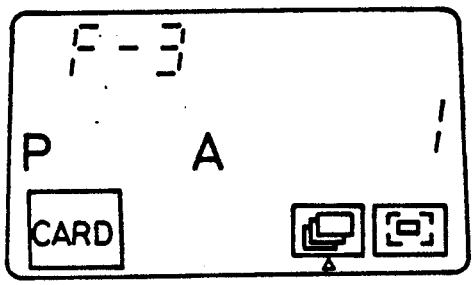
Figure 34D:
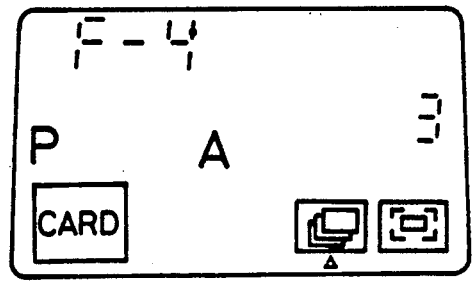
Figure 34E:
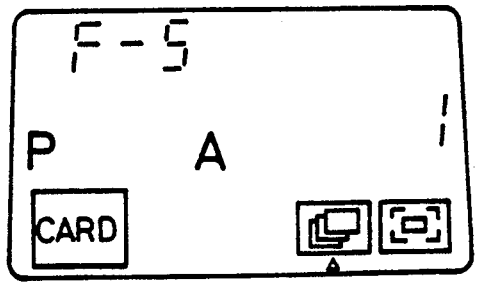

Next, when the rear lid close detecting switch $S_{RC}$ or the rewinding switch $S_{RW}$ is operated, a pulse signal is inputted to a terminal $INT_2$, and the micro-computer $\mu C$ executes an interrupt $INT_2$ as shown in FIG. 33. In the flow in FIG. 33, first, the micro-computer $\mu C$ inhibits interrupts to this flow (#3000), and then in step #3005, detects whether or not the rewinding switch $S_{RW}$ is ON. When it is ON, the micro-computer $\mu C$ executes a rewinding routine as shown in FIG. 32(b) to perform a rewinding operation, permits an interrupt (#3010, #3100), and returns. When the rewinding switch $S_{RW}$ is not ON, the rear lid close detect switch $S_{RC}$ is assumed to be turned ON, and processing proceeds to step #3015, and judgement is made on whether or not the film exists. When no film exists, i.e. the film detecting switch $S_{FLM}$ is OFF, processing proceeds to step #3100 without performing initial loading. On the other hand, when the film exists (the switch $S_{FLM}$ is ON), a terminal CSDX is set to the "H" level, and serial communication is performed with a film speed reading circuit DX. Thereby film speed data Sv and the number of film frames N are inputted into the micro-computer $\mu C$. On completing the communication, the terminal CSDX is set to the "L" level (#3020–#3030). Then, the counter $N_1$ is set to −2 (#3035). Subsequently the terminal CSDISP is set to the "H" level, and serial communication is performed with the display control circuit DISPC (#3045). In the serial communication, only an initial load signal ($b_1 = 1$, $b_2$–$b_6 = 0$ at 0AH) and the counter data $N_1$ are outputted from the micro-computer $\mu C$. Thus only the frame counter data is displayed. After completing the serial communication, the terminal CSDISP is set to the "L" level (#3050). The counter number $N_1$ is displayed using two digits of seven-segment unit. Next, the micro-computer $\mu C$ outputs a signal instructing winding-up of the film to a wind-up control circuit (#3055), and waits until winding-up of one frame ends (#3060). When the one-frame switch $S_{WD}$ turns ON, the micro-computer $\mu C$ adds 1 to the counter $N_1$ (#3065), and judges whether or not it is 1 (#3070), and if it is not yet 1, returns to step #3040. If it has become 1, processing proceeds to step #3075, and the motor is stopped, and in step #3080, it is judged whether or not the film counter is in count-up mode. If it is in count-up mode, in step #3085, numeral 1 is set as $N_1$, and if it is not in count-up mode, the number of frames N of the film read in step #3039 is set as $N_1$, and processing proceeds to step #3095. Then, in step #3095, the above-mentioned $N_1$ and the film speed are written at predetermined adresses of the $E^2PROM$, and after it is completed, all interrupts are permitted (#3100), and processing returns.

In the above description, the operation of the micro-computer $\mu C$ of the camera side of this embodiment are explained using various flowcharts. Next, description is made on operation of the IC card attached to this camera. Here the mode setting-card and the program card are described independently. A micro-computer $\mu C_2$ incorporating an $E^2PROM$ is included in the IC card CD, respectively. A character C affixed to the head of the flag symbol is for discriminating from the flag of the camera side, and the function of this flag is the same as the function of the flag without the character C.

Mode-Setting Card

First, description is made on the mode setting card. When the IC card CD is attached to the camera body, power $V_{DD}$ is supplied to the IC card CD, and as described above, the micro-computer $\mu C$ of the camera is interrupted, and the clock signal is sent to the IC card CD, and the micro-computer $\mu C_2$ of the IC card is operable.

Figure 40A:
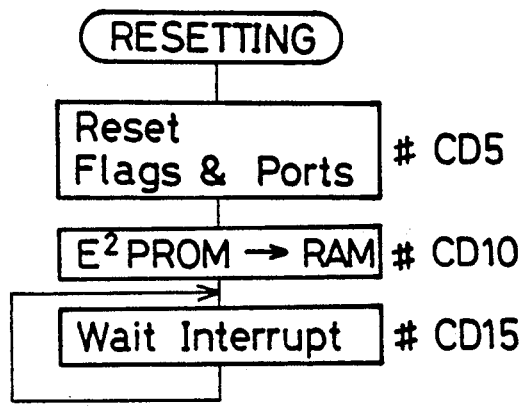
FIGS. 40(a) to 40(h) are flowcharts showing various routines of the IC card.

In the IC card side, by attaching the IC card to the camera body, a signal changing from the "L" level to the "H" level is supplied to a terminal RE, and the micro-computer $\mu C_2$ executes a flow as shown in FIG. 40(a). In this FIG. 40(a), the micro-computer $\mu C_2$ first resets flags and output ports (#CD5), transfers data of the $E^2PROM$ to the corresponding bits of the RAM (#CD10), and waits an interrupt (#CD15).

Figure 40B:
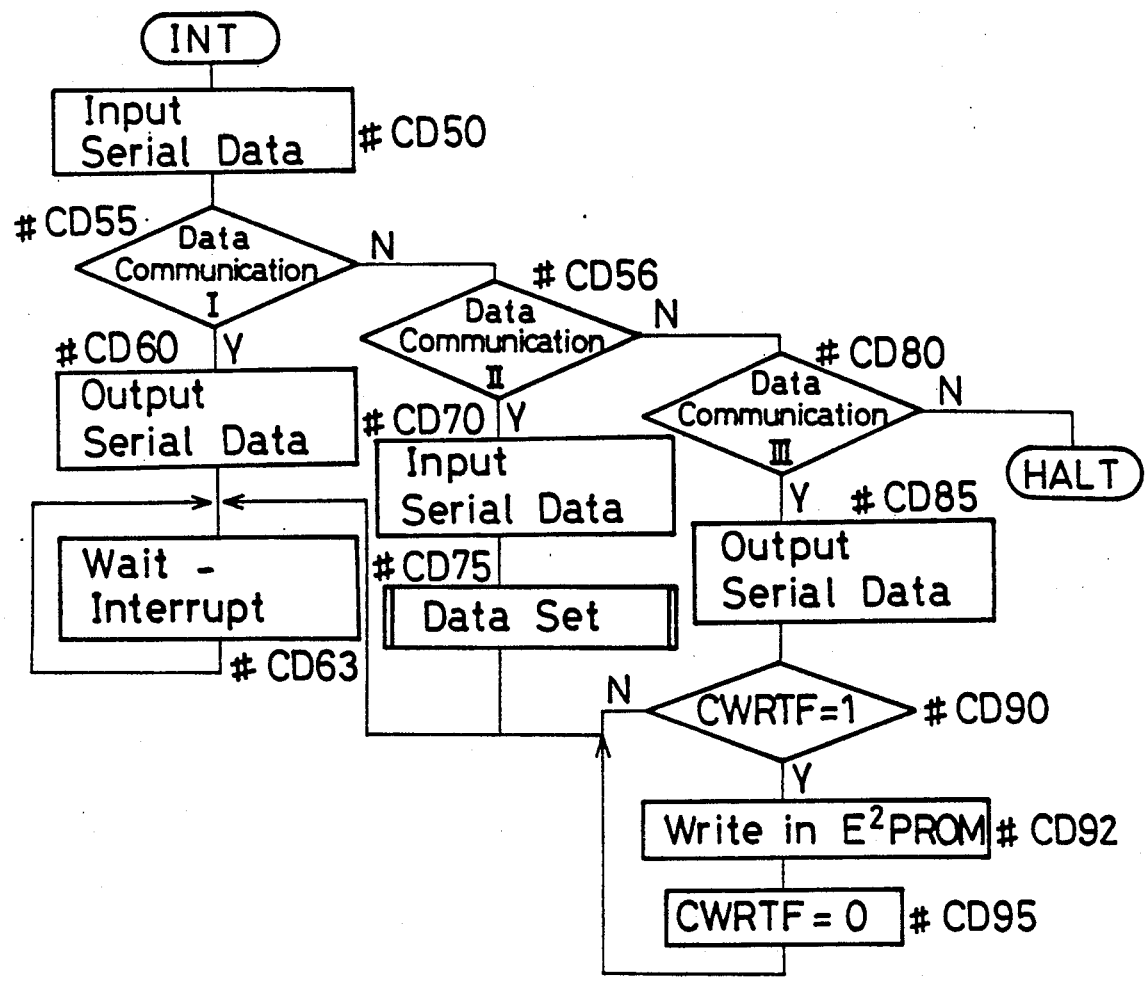

When a signal CSBCK showing data communication request is sent from the camera, the micro-computer $\mu C_2$ of the IC card CD executes an interrupt INT, which is shown in FIG. 40(b). In step #CD50, the micro-computer $\mu C_2$ controls the IC card to perform serial communication with the camera, and inputs data from the camera in synchronism with the clock signal SCK sent from the camera, and determines one of the data comminations I, II and III (#CD55). In the case of the data communication I, first, data showing the kind of the IC card (mode-setting card or program card) is set (mode-setting card in this case), and the data is outputted in synchronism with the clock signal SCK (#CD60), and an interrupt is waited (#CD63). In the case of the data communication II, processing proceeds from step #CD70 to step #CD75, and data sent from the camera (key switch data in this case) is inputted in synchronism with the clock signal SCK. Based on this inputted data, a routine of data setting is executed (#CD75), and any interrupt is waited (#CD63).

Figure 40C:
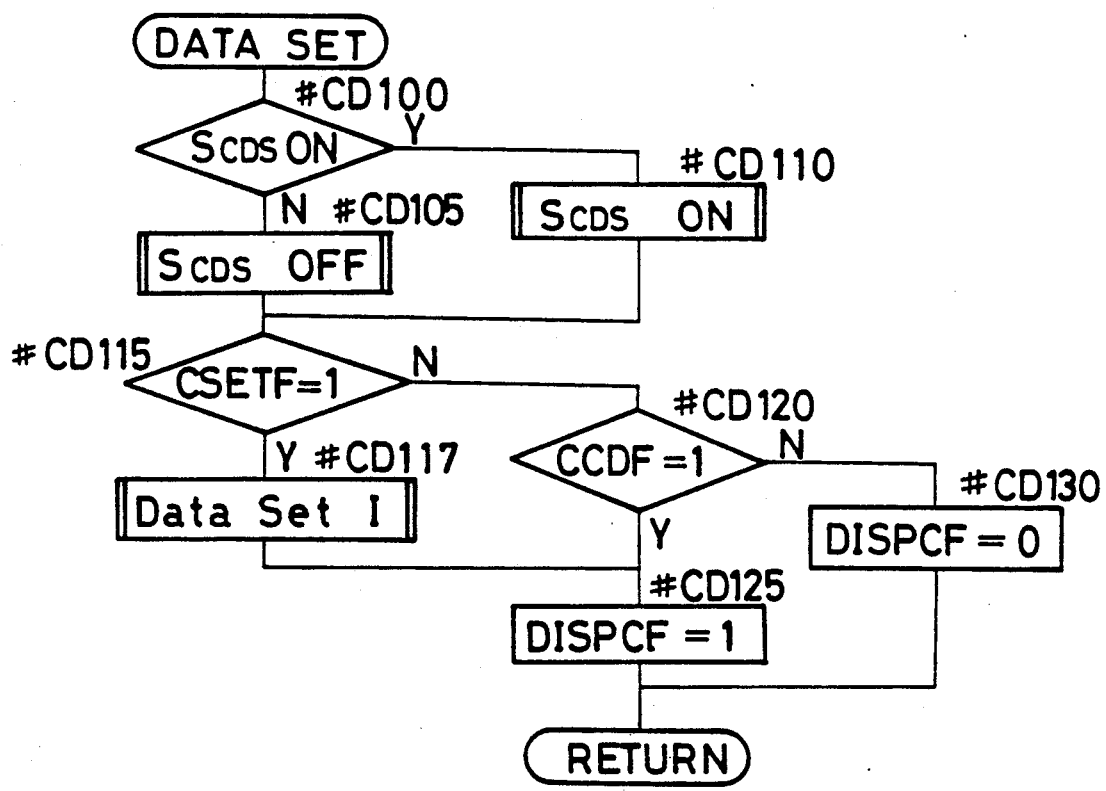

This routine of data setting is shown in FIG. 40(c). It is judged whether or not the card data setting switch $S_{CDS}$ is ON in step #CD100, and it is executed to control $[S_{CDS}\ ON]$ in step #CD110 or control $[S_{CDS}\ OFF]$ in step #CD105 according to ON or OFF of this switch $S_{CDS}$. FIGS. 40(e) and 40(f) show flows of the respective controls $[S_{CDS}\ ON]$ and $[S_{CDS}\ OFF]$. These controls are the same as the controls $[S_{CDS}\ ON]$ and $[S_{CDS}\ OFF]$ as shown in FIG. 17 and FIG. 18 except that the steps of judging the mode setting card, step #1500 and step #1550 do not exist (these are unnecessary in the card side).

Reverting to FIG. 40(c), in step #CD115, whether or not the set flag CSETF is set is judged. When it is not set, processing proceeds to step #CD120, and judgement is made on whether or not a flag CCDSF (set when processing passes through the flow of $[S_{CDS}\ ON]$ once and does not pass through the flow of $[S_{CDS}\ OFF]$) is set.

In this embodiment, processing enters the changing mode in the OFF state of the card data setting switch $S_{CDS}$.

When the flag CCDSF is set, the display control flag DISPCF is set (#CD125), and when the flag CCDSF is not set, it is reset (#CD130), and processing returns.

Figure 28:
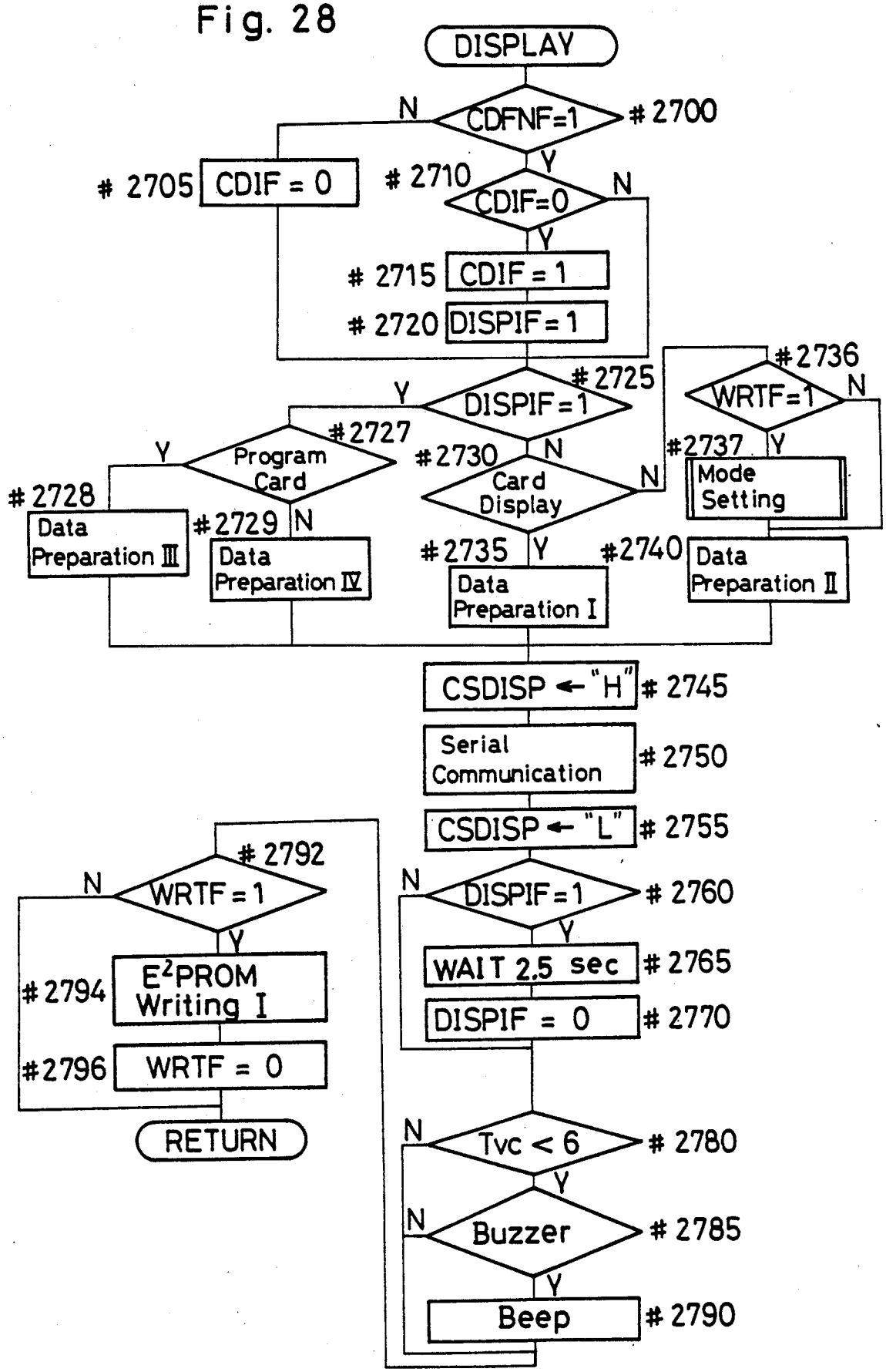
FIG. 28 is a flowchart of a display routine.

The data corresponding to set and reset of the display control flag PISPCF are respectively sent to the camera, and the camera judges according to the data at step #2730 of FIG. 28 described before.

Figure 40D:
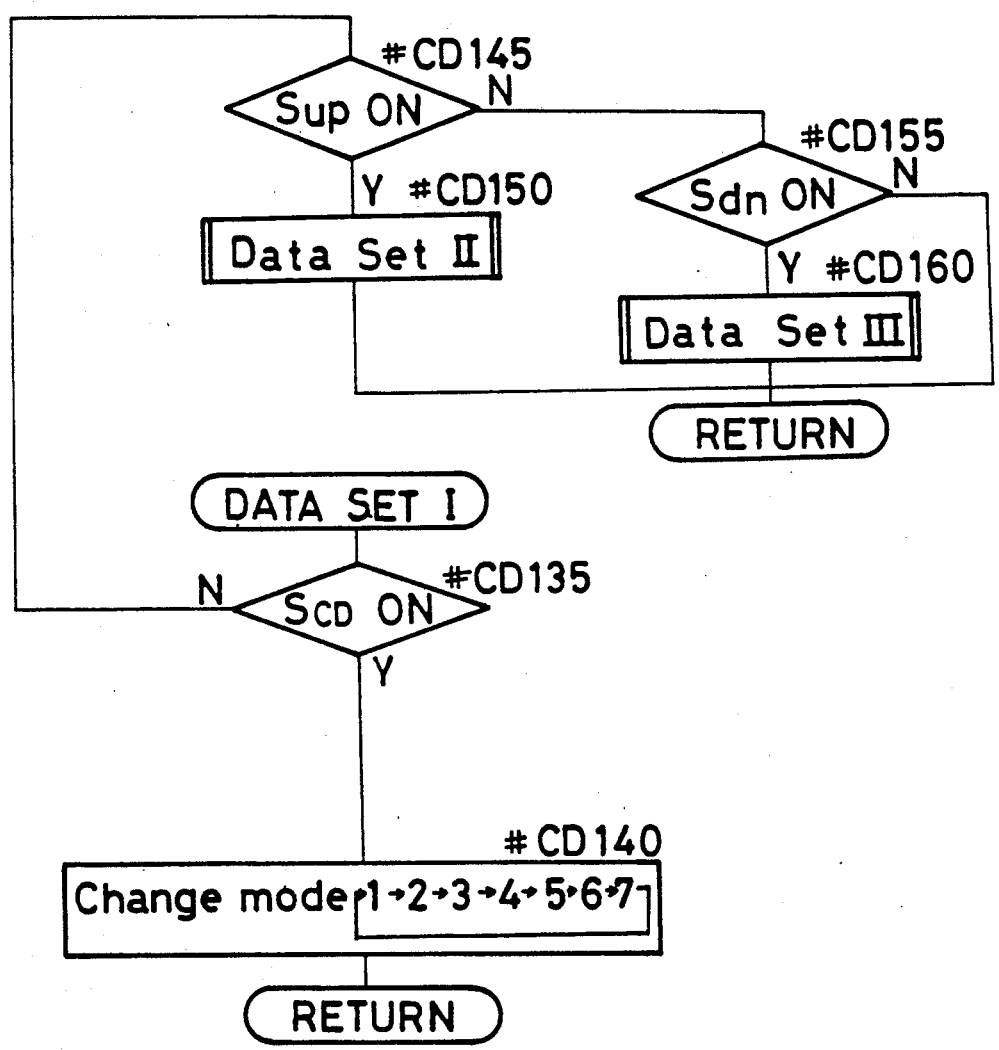
Figure 40E:
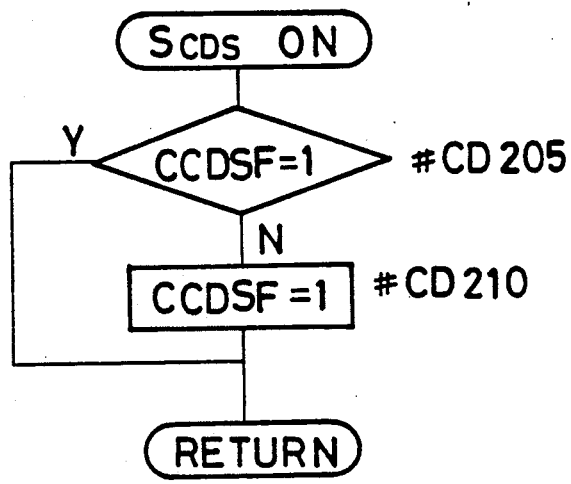
Figure 40H:
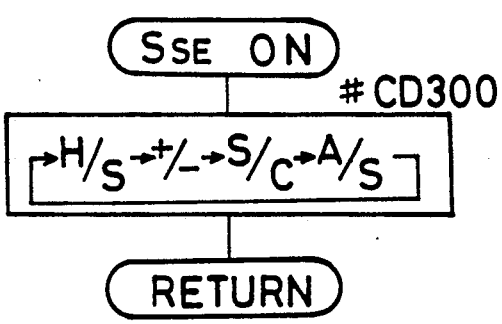
Figure 40F:
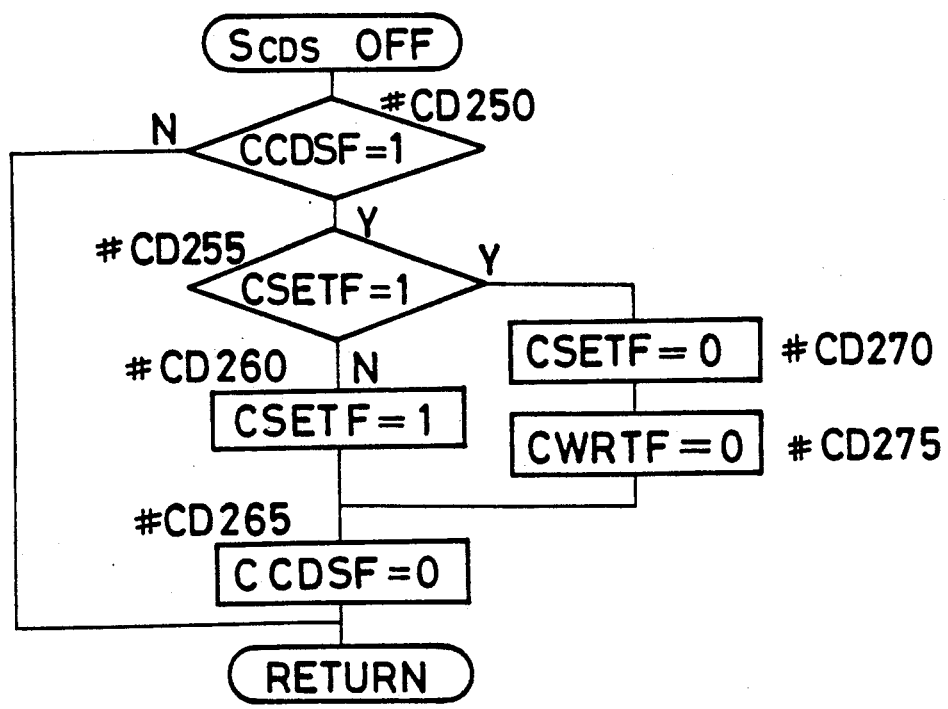
Figure 40:
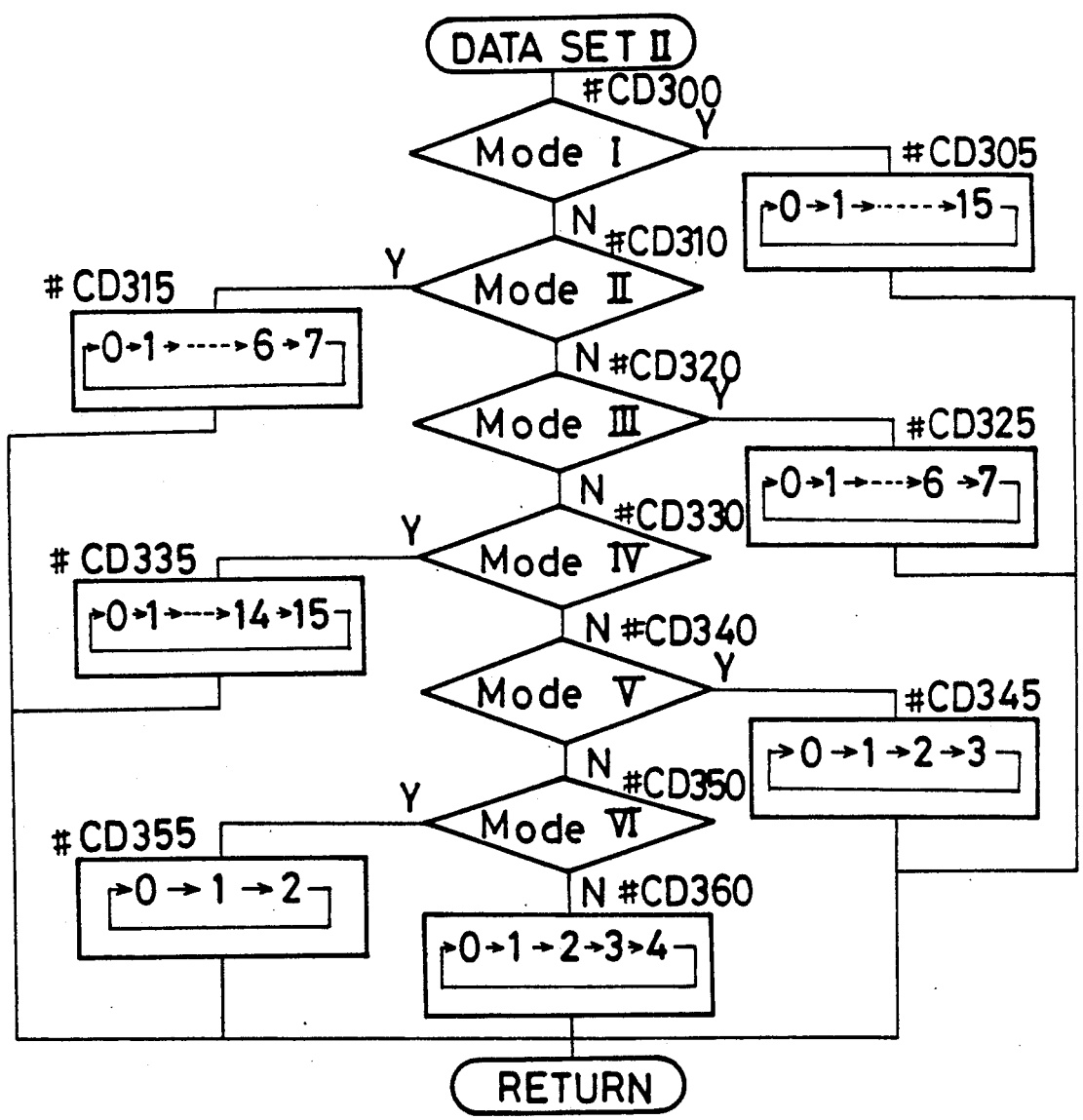

Here, routine responsive to the data set I is explained referring to FIG. 40(d). First, at step #CD135, it is judged whether the card switch $S_{CD}$ is ON or OFF, and if ON, current change mode is determined based on the proper bits ($CCKb_0$–$CCKb_2$), and the mode is changed to the next #CD140. At this time, the above-mentioned bits ($CCKb_{15}$–$CCKb_{17}$) are also changed. If the card switch $S_{CD}$ is OFF, the up switch or down switch is checked at steps #CD145 and #CD155. If either is ON, a corresponding subroutine, data set II (#CD150) or data set III (#CD160), is executed. If neither is operated, it returns.

Data set II subroutine is explained referring to FIG. 40(g). First the micro-computer $\mu C_2$ sees which of (I) through (VII) is selected as the mode-change function by looking up the bits $CCKb_0$–$CCKb_2$. Then it determines current number representing the functions in the change-mode from the bits $CCKb_3$–$CCKb_{22}$, and changes the number to the next. For example, in change-mode I, if current number is "0" (where H/S, exposure adjustment, drive mode S/C, and single-spot AF/multi-spot AF are changeable), it is changed to "1" (where only single-spot AF/multi-spot AF among the four above is unchangeable). The data set III is very similar to the data set II except that the number changing direction is reversed.

Reverting to FIG. 40(b), when it is judged in step #CD80 that the data communication is III, serial communication (in this case, the card outputs) is performed in step #CD85, and thereby the IC card function data $CCKb_0$–$CCKb_{23}$ and a signal DISPCF are given to the camera. Then, whether or not a write flag CWRTF showing the data transporting to the $E^2PROM$ is set is judged in step #CD90, and if it is not set, processing proceeds to step #CD63, and waits any interrupt. If the flag CWRTF is set, the function data $CCKb_0$–$CCKb_{23}$ are written to bits at the corresponding addresses of the $E^2PROM$ (#CD92), and the flag CWRTF is reset (#CD95). Then processing proceeds to step #CD63, and waits any interrupt.

In the above-mentioned step #CD80, when the data communication is not III, it is assumed to be a sleep signal, and processing is put in the halted state.

Program Card

Next, description is made for the case of the program card. In this embodiment, the program card provides a sport program suitable when a scene of a sport is wanted to be photographed.

Figure 41:
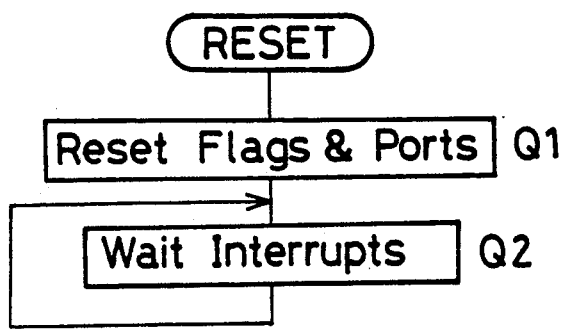
FIG. 41 is a flowchart of a resetting routine.
Figure 42:
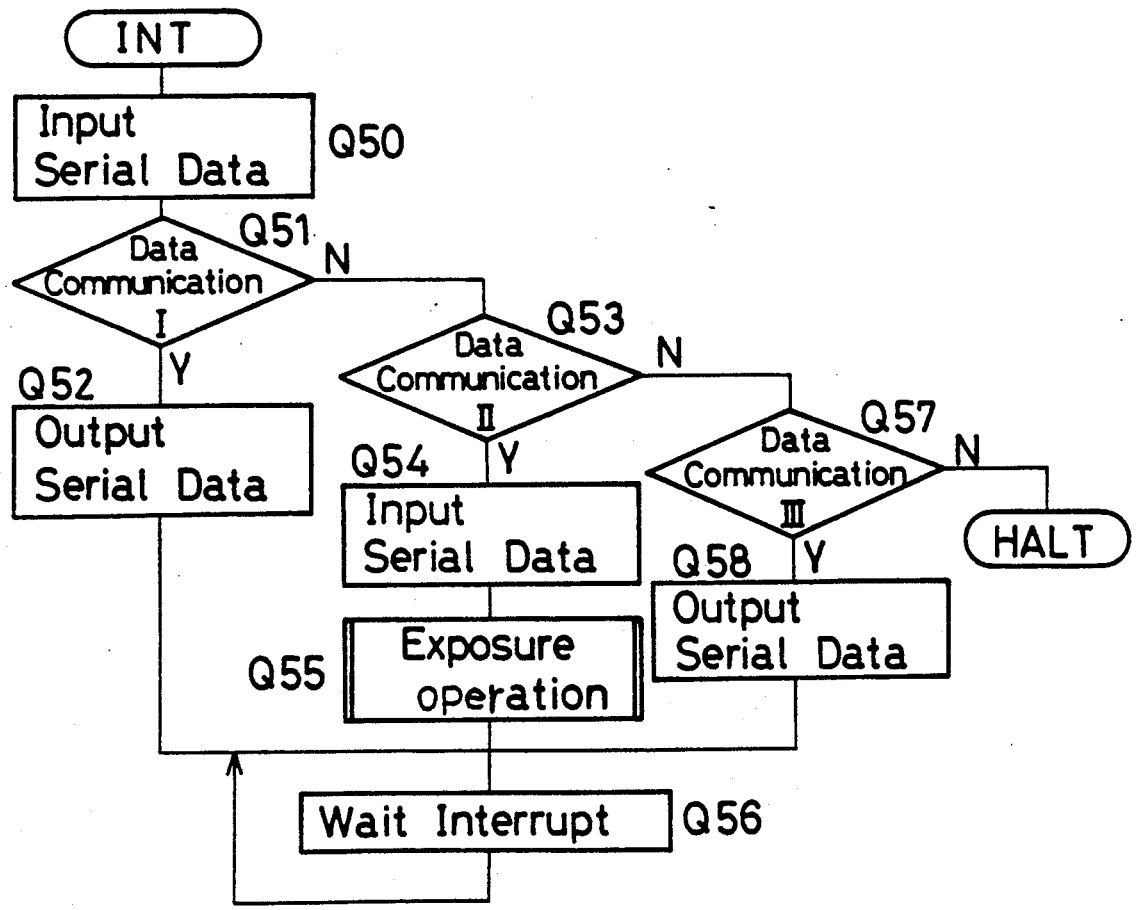
FIG. 42 is a flowchart of an interrupt routine.

When the IC card CD (program card) is attached to the camera, a signal changing from the "L" level to the "H" level is inputted to a terminal RESET of the micro-computer $\mu C_2$ of the card and the micro-computer $\mu C_2$ executes a flow of RESET as shown in FIG. 41, and resets flags and I/O ports of the micro-computer $\mu C_2$ in step Q1 and waits any interrupt (Q2). When a signal CSBCK is inputted from the camera, an interrupt is triggered, and a flow INT as shown in FIG. 42 is executed. The micro-computer $\mu C_2$ of the IC card performs data communication along the clock signal SCK sent from the camera (Q50). The data at this time is for indicating the kind of communication from the camera to the card. The micro-computer $\mu C_2$ of the IC card inputs this data, and discriminates the kind of communication (Q51). In the case of the data communication I, the micro-computer $\mu C_2$ outputs data showing to the camera the kind of the card (here, the program card) and data showing respectively that the Af mode is "continuous" and the photometric zone is "multi-spot" (Q52). Then processing proceeds to step Q56, and waits an interrupt.

Here, the program card is presupposed for the sport scene, and it is therefore desirable to select the continuous AF mode in which moving subject is focused all the time, the multi-spot photometric zone mode having a wide photometric range for the same reason, and the single-/multi-spot AF mode is changeable because sometimes the photographer desires focusing only to the main subject.

In data communication II, necessary data is provided from the camera (steps Q53, Q54), exposure operation is performed (Q55), and an interrupt is waited (Q56).

Prior to description on an embodiment of a specific flowchart of exposure operation, summary of control of this card is explained.

The card is presupposed for outdoor sports and athletic meeting

Feature

A moving subject can be photographed at a comparatively bright place at a high shutter speed without blur.

Control

Figure 44:
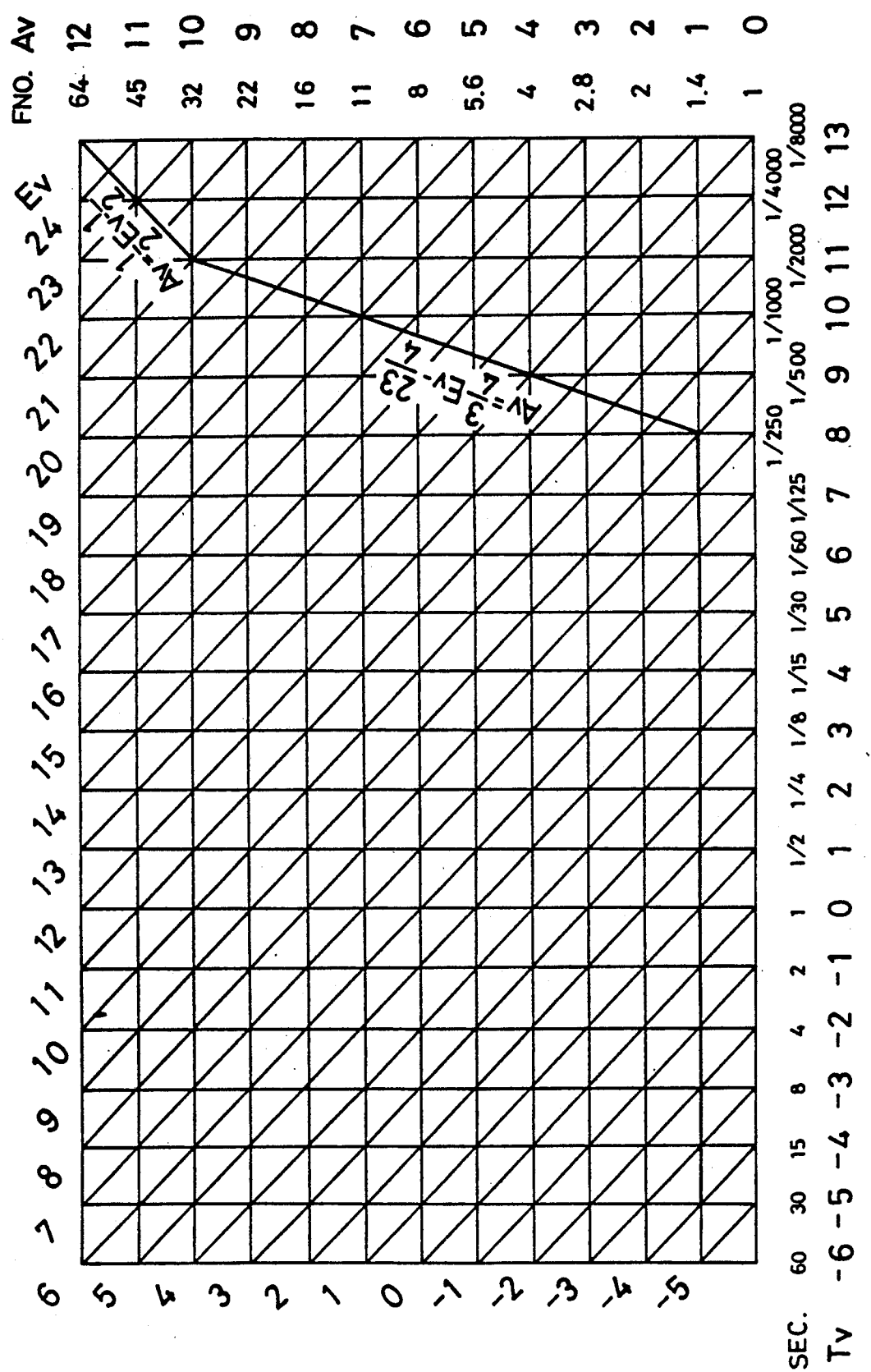
FIG. 44 is a program line diagram relating to the program card.

A program line diagram in FIG. 44 shows the control of the card for outdoor sports and athletic meeting. This control is performed as follows.

(A) The aperture value Av is calculated by the following equations.

$$Av = (\tfrac{3}{4}) \cdot Ev - 2\tfrac{3}{4} \text{ if } Ev < 21$$

$$Av = (\tfrac{1}{2}) \cdot Ev - \tfrac{1}{2} \text{ if } Ev \geq 21$$

This means that if Ev<21, the aperture is opened a little more to increase the shutter speed Tv. Accordingly, calculation of $Av = (\tfrac{3}{4}) \cdot Ev - 2\tfrac{3}{4}$ is performed.

In the case of Ev≧21, the shutter speed Tv is considered to be sufficiently high, and therefore calculation of $Av = (\tfrac{1}{2}) \cdot Ev - \tfrac{1}{2}$ is performed to smoothly change both of Av and Tv.

Next, a comparison is taken between the open aperture value Avo and Av. When the calculated value is smaller than Avo, the aperture value cannot be set to that value, therefore being corrected to Avo.

Next, the shutter speed Tv is calculated by the following equations.

$$Tv = Ev - Av \text{ if } Av \geq Avo$$

$$Tv = Ev - Avo \text{ if } Av < Avo$$

(B) If the film is the negative type, the shutter speed Tv is corrected to increase.

Since the negative film has a wide latitude, the exposure setting is reduced by about 1 Ev from the standard value to get higher shutter speed.

The reversal type (positive type) film has a narrow latitude, and therefore no adjustment is made.

There is a relationship between the calculated value in (A) and the adjusted value as show in table below.

| Value of Tv evaluated by (A) | Adjusted value of Tv |
|---|---|
| Tv ≧ 9 | Tv' = Tv |
| 8 ≦ Tv < 9 | Tv' = 9 |
| Tv < 8 | Tv' = Tv + 1 |

(C) Others

The above-mentioned controls (A) and (B) are performed when a lens having a focal length of 70 mm or more is attached. The first reason is that in sports photographing, the subject distance is considered comparatively large. The second reason is that where the telephotolens is not used, the image magnification of the subject becomes small, and the blur by moving the lens to follow the small subject hardly occurs. Therefore no such control is substantially required.

In this control, flash apparatus is set OFF, and automatic flashlight emission is not performed. The reason is that this program card purposes photographing at a comparatively bright place, and the distance from the subject is considered comparatively long. Therefore a flashlight is not effective in this case.

On the contrary, if the switch of flash apparatus is turned ON by the photographer, no such control is performed for obeying the photographer's will to use the flashlight.

Figure 43:
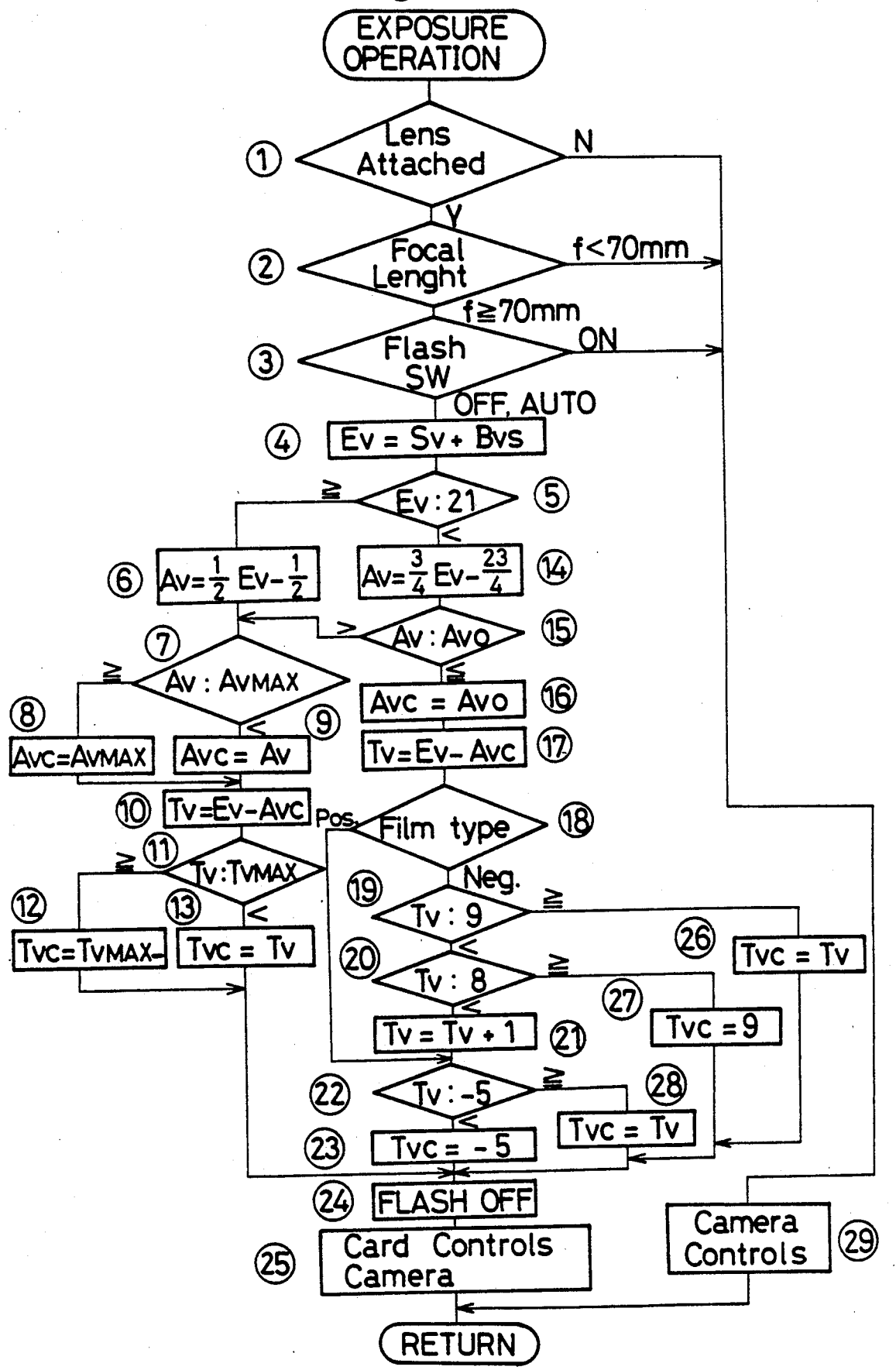
FIG. 43 is a flowchart of an exposure operating routine.

Next, a flowchart of exposure operation of the above-mentioned program card is shown in FIG. 43. In this FIG. 43, first, in step ①, the micro-computer $\mu C_2$ of the program card judges from the inputted data whether or not a lens is attached. When no lens is attached to the camera body, lens data such as the open aperture value Avo do not come to the IC card CD. Accordingly, no exposure calculation can be performed, and therefore processing proceeds to step ㉙, and exposure control is assigned to the camera. When a lens is attached, processing proceeds to step ② to find out the focal length of the lens from the inputted data. In the case of the lens having a focal length of shorter than 70 mm, control of the card is not performed for the above-described reason, and therefore in this case also, processing jumps to step ㉙, and assigns the exposure control to the camera. In the case of the lens having a focal length of 70 mm or more, in step ③, the state of full flashlight emission switch is found out from the inputted data. When the full flashlight emission switch is ON, the card does not perform control for the above-described reason, and therefore processing jumps to step ㉙.

On the other hand, when the above-mentioned switch is OFF, in the next step ④, the exposure value Ev is calculated by adding the luminance value Bvs and the film speed Sv of the inputted data. Then, the control is changed depending on the exposure value Ev. For the above-described reason, if Ev<21, Av is evaluated by the equation $Av = (\tfrac{3}{4}) \cdot Ev - 2\tfrac{3}{4}$ in step ⑭. If Ev≧21, Av is evaluated by the equation $Av = (\tfrac{1}{2}) \cdot Ev - \tfrac{1}{2}$ in step ⑥.

A comparison is taken between Av calculated in step ⑥ and the maximum aperture value Avmax in the next step ⑦. If Av≧Avmax, the lens cannot be stopped down any more, and therefore the aperture value Avc for the camera body control is set as Avmax in step ⑧.

On the other hand, if Av<Avmax, Avc=Av is set in step ⑨. After the aperture value Avc has been calculated in such a manner, in step ⑩, the shutter speed Tv is calculated based on an equation Tv=Ev−Avc.

In the next step ⑪, a comparison is taken between this shutter speed Tv and the highest shutter speed Tvmax of the camera. If Tv≧Tvmax, processing proceeds to step ⑫, and the shutter speed Tvc for the camera body control is set as Tvmax. If Tv<Tvmax, processing proceeds to step ⑬, and Tvc=Tv is set.

If Ev<21 in the above-mentioned step 5, Av is calculated by the equation shown in step ⑭, and thereafter processing proceeds to step ⑮. In step ⑮, a comparison is taken between Av calculated in step ⑭ and the open aperture value Avo. Here, if Av>Avo, processing goes to the above-mentioned step ⑦ to take a comparison between Av and Avmax. If Av≦Avo, the aperture of the lens cannot be opened any more, and therefore, processing proceeds to step ⑯, and the aperture value Avc is set as Avo. Then, in step ⑰, the shutter speed Tv is calculated by the equation Tv=Ev−Avc.

For the above-described reason, if the film is the negative type, correction of the shutter speed Tv has to be performed, and therefore the type of the film is determined in step ⑱. As a result, when the film is a reversal (positive) type, processing proceeds to step 22 to prevent very slow shutter speed Tv.

On the other hand, in the case of the negative film, processing proceeds to step ⑲, and judges whether or not the shutter speed Tv is smaller than 9. If Tv≧9, the control shutter speed Tvc is set as Tv in step ㉖. If Tv<9, processing proceeds to step ⑳, and judges whether or not the shutter speed Tv is 8 or more.

Here, if Tv≧8, Tvc=9 is set (step ㉖, and if Tv<8, a correction of Tv=Tv+1 is made, and processing proceeds to the next step ㉒. In step ㉒, a comparison for limiting the lowest value to Tv=−5 (30 seconds) is taken to prevent shutter speed Tv from becoming extremely slow.

Here, if Tv<−5, Tvc=−5 is set (step ㉓), and if Tv ≧−5, Tvc=Tv is set (step ㉘).

For the above-described reason, control of flashlight is not performed, and therefore, in step ㉔, the bit is set to turn OFF the flash. Then processing proceeds to step ㉕, and the values calculated by the program card are used for controlling the camera, and processing returns.

After completing the flow of these exposure operations, processing returns to the flow of FIG. 42, and waits any interrupt.

When any interrupt is triggered from the camera, and at that time, if it is the data communication III, data are prepared to show: whether or not the camera is controlled by the data of the operated aperture value CAvc and shutter speed CTvc; whether or not the camera is controlled by the card; non-forced light emission (Fb9=0); inhibit of forced light emission (Fb10=0); and reset of the adjustment of flash light CF ΔEv. These data are sent to the camera by serial communication. Except for this communication, the micro-computer μC₂ of the card stops communicating.

Among the above-mentioned overall description of the camera system, some features relating to the present invention are tabulated below.

(1) In FIG. 6(b), when the lens switch $S_Q$ is OFF, normal selection of function and normal change of mode, i.e. the function for enabling the mode-change between single-spot AF/multi-spot AF and the mode-change between them, can be performed. When the lens switch $S_Q$ is ON, the process proceeds to step #4005 et seq., where the single-spot AF flag (Fb₂) is set (here the single-spot AF mode is supposed to have been selected by the IC card), but the selection of the mode-change function and the multi-spot AF mode are void. Then, when the AF start switch S₁ is turned ON, the single-spot AF is actually performed in step #735 of FIG. 10(a).

(2) When the AF switch S₁ is ON (where an auto-focusing is working), and when further the lens switch $S_Q$ is operated, the auto-focusing action stops (the display remains AF) and, (i) in case the right focus is not yet attained, the focusing mode turns to M (manual) mode and a photometric measurement is performed (without AF-lock), (ii) in case the right focus has been attained, the AE is locked including the consideration of the image magnification. During the continuous-shot, the photometric value measured before the continuous shot is preserved and not updated.

(3) The AF mode turns to the single-spot mode when the switch S₁ is turned ON, and the single-spot AF display and the single-spot AF action are maintained while the switch S₁ is kept ON.

(4) When the lens switch $S_Q$ is turned ON, the subject-following mode display (the Continuous Mode display) continues. When the lens switch $S_Q$ is OFF and the subject is being focus-followed, the Continuous Mode display is maintained.

(5) When the lens switch $S_Q$ is turned ON to operate the continuous mode action, the AF-lock and AE-lock are released.

(6) During the continuous mode action, the auxiliary light for the AF does not operate.

(7) When the lens switch $S_Q$ is turned ON in the auxiliary light mode, the continuous mode starts after the auxiliary light is operated.

The scope of the present invention is not limited to the above-described specific examples. It is easily understood by those skilled artisans of this field that many modifications are possible without departing from the spirit of the present invention. For example, the function of the lens switch can be replaced by the IC card. Further, though in the above embodiment, the IC card adds or changes various functions of the camera body, it is possible, of course, to provide a switch on the camera body to add or change such functions in place of the IC card.

The following Table 1 through Table 10 show the switches and their functions, and various data which are cited in the above description.

TABLE 1

| Symbols of switches | Switches | Functions |
|---|---|---|
| $S_{RE}$ | Battery attachment switch | When battery is attached, turns OFF and resets the micro-computer μC. |
| $S_{EM}$ | Exposure mode changing switch | Changes exposure mode (P,A,M,S) in cooperation with up switch Sup or down switch Sdn. |
| $S_{FUN}$ | Function changing switch | Changes function in cooperation with up switch Sup or down switch Sdn. |
| $S_{CD}$ | Card function enable/disable switch | Enables/disables card function when card is attached. |
| $S_{CDS}$ | Card data setting switch | Sets/resets data setting mode performing mode change or data setting when card is attached. |
| $S_O$ | Photometric switch | Starts photometry, display and the like (except AF). |
| $S_1$ | AF switch | Starts AF. |
| $S_2$ | Release switch | Starts photographing operation. |
| $S_{WD}$ | One-frame switch | Turns ON when one frame of film is wound up. |
| $S_{AEL}$ | AE locking switch | Performs AE lock. |
| $S_{AF/M}$ | Focusing mode changing switch | Changes between AF and manual focusing. |
| $S_{SE}$ | Change data selecting switch | Selects data to be changed. |
| $S_{FLM}$ | Film detecting switch | Detects presence or absence of film. |
| $S_{RC}$ | Rear lid close detecting switch | Detects close of rear lid. |
| $S_{RW}$ | Rewinding switch | Starts rewinding. |
| $S_{CR}$ | IC card attachment switch | Turns OFF when IC card is attached and resets the micro-computer of IC card. |
| X | X contact | Turns ON after run of the first-curtain of shutter and triggars flash. |
| Sup | Up switch | In M mode: Up of shutter speed Otherwise: Change of changing-mode, Up function |
| Sdn | Down switch | In M mode: Down of shutter speed Otherwise: Change of changing-mode, Down function |
| $S_{AV}$ | Aperture changing switch | In M mode, aperture value is changeable used with Sup or Sdn. (Shutter speed can be changed by IC card setting) |
| $S_{SELF}$ | Self-mode switch | Used to select self-timer time. |

TABLE 2(a)

| Selected Number | H/S<br>H: O<br>S: X | Exposure adjustment<br>In: O<br>Out: X | Drive mode<br>Single frame advancing: O<br>Continuous: X | Single-spot/multi-spot AF<br>Single: O<br>Multi: X |
|---|---|---|---|---|
| 0 | O | O | O | O |
| 1 | O | O | O | X |
| 2 | O | O | X | O |
| 3 | O | O | X | X |
| 4 | O | X | O | O |
| 5 | O | X | O | X |
| 6 | O | X | X | O |
| 7 | O | X | X | X |
| 8 | X | O | O | O |
| 9 | X | O | O | X |
| 10 | X | O | X | O |
| 11 | X | O | X | X |
| 12 | X | X | O | O |
| 13 | X | X | O | X |
| 14 | X | X | X | O |
| 15 | X | X | X | X |

TABLE 2(b)

| Selected Number | Film counter<br>Count-up: O<br>Count-down: X | Rewinding of film<br>Auto-return: O<br>Non-auto-return: X | Film leading end is, rewinded completely: O left out of cartridge: X | Blur-warning buzzer<br>Operation: O<br>Non-operation: X |
|---|---|---|---|---|
| 0 | O | O | O | O |
| 1 | O | O | O | X |
| 2 | O | O | X | O |
| 3 | O | O | X | X |
| 4 | O | X | O | O |
| 5 | O | X | O | X |
| 6 | O | X | X | O |
| 7 | O | X | X | X |
| 8 | X | O | O | O |
| 9 | X | O | O | X |
| 10 | X | O | X | O |
| 11 | X | O | X | X |
| 12 | X | X | O | O |
| 13 | X | X | O | X |
| 14 | X | X | X | O |
| 15 | X | X | X | X |

TABLE 2(c)

| No. | Normal | Focus-lock | AF-spot | continuous AF |
|---|---|---|---|---|
| 0 | O | | | |
| 1 | | O | | |
| 2 | | | O | |
| 3 | | | | O |

TABLE 2(d)

| | 10 sec. | 5 sec. | 2 sec. |
|---|---|---|---|
| 0 | O | | |
| 1 | | O | |
| 2 | | | O |

TABLE 2(e)

| | AE-lock/unlock<br>O: AE-locked during AE-lock button On. Power is held also.<br>X: Alternate change by AE-lock button unlocked also at power-hold OFF | Shutter speed changing stops<br>O: ½ Ev stops<br>X: 1 Ev stop | Setting in M mode when up or down switch is ON<br>O: $S_{AV}$ OFF shutter speed is set<br>X: $S_{AV}$ OFF Aperature is set |
|---|---|---|---|
| 0 | O | O | O |
| 1 | O | O | X |
| 2 | O | X | O |
| 3 | O | X | X |
| 4 | X | O | O |
| 5 | X | O | X |
| 6 | X | X | O |
| 7 | X | X | X |

TABLE 3

Function Data (Fb$_n$) RAM

| Bits | | Meaning |
|---|---|---|
| Fb$_0$ | $b_0 b_1 = 00$ | P mode |
| | $b_0 b_1 = 01$ | A mode |
| Fb$_1$ | $b_0 b_1 = 10$ | M mode |
| | $b_0 b_1 = 11$ | S mode |
| Fb$_2$ | $b_2 = 0$ | Multi-spot mode |
| | $b_2 = 1$ | Single-spot mode |
| Fb$_3$ | $b_3 = 0$ | Single-frame advancing |
| | $b_3 = 1$ | Continuous advancing mode |
| Fb$_4$ | $b_4 b_5 = 0,0$ | No adjustment |
| | $b_4 b_5 = 0,1$ | + adjustment |
| Fb$_5$ | $b_4 b_5 = 1,0$ | − adjustment |
| Fb$_6$ | $b_6 b_7 = 0,0$ | No H/S |
| | $b_6 b_7 = 0,1$ | Highlight (H) |
| Fb$_7$ | $b_6 b_7 = 1,0$ | Shadow (S) |
| Fb$_8$ | $b_8 = 0$ | One-shot AF |
| | $b_8 = 1$ | Continuous AF |
| Fb$_9$ | $b_9 = 0$ | Non-forced Full light emission |
| | $b_9 = 1$ | Forced Full light emission |
| Fb$_{10}$ | $b_{10} = 0$ | Non-forced light emission |
| | $b_{11} = 1$ | Forced light emission |
| Fb$_{12}$ | $b_{12} = 0$ | Multi-spot photometry (Auto) |
| | $b_{12} = 1$ | Single-spot photometry |
| Fb$_{13}$ | $b_{13} = 0$ | Auxiliary light not used |
| | $b_{13} = 1$ | Auxiliary light mode |
| Fb$_{14}$ | $b_{14} = 0$ | No focus-lock by $S_Q$ |
| | $b_{14} = 1$ | Focus-locked by $S_Q$ |
| Fb$_{15}$ | $b_{15} = 0$ | Single-spot AF before $S_Q$ ON |

TABLE 3-continued

Function Data (Fb$_n$) RAM

| Bits | Meaning |
|---|---|
| $b_{15} = 1$ | Multi-spot AF before $S_Q$ ON |

TABLE 4

Mode Setting Data (MSbn) E$^2$PROM

| Bits | Meaning | |
|---|---|---|
| MSb$_0$ | $b_0 = 0$ | H/S mode NO |
| | $b_0 = 1$ | H/S mode EXIST |
| MSb$_1$ | $b_1 = 0$ | +/− mode NO |
| | $b_1 = 1$ | +/− mode EXIST |
| MSb$_2$ | $b_2 = 0$ | S/C mode NO |
| | $b_2 = 1$ | S/C mode EXIST |
| MSb$_3$ | $b_3 = 0$ | S/A mode NO |
| | $b_3 = 1$ | S/A mode EXIST |
| MSb$_4$ | $b_4 = 0$ | Mode setting unfinished |
| | $b_4 = 1$ | Mode setting finished |
| MSb$_5$ | $b_5 = 0$ | AE-locked during depression of the switch |
| | $b_5 = 1$ | 10-second hold mode |
| MSb$_6$ | 000 = PASM, 001 = PAM, 010 = PAS, | |
| MSb$_7$ | 011 = PSM, 100 = PA, 101 = PM, | |
| MSb$_8$ | 110 = PS, 111 = P | |
| MSb$_9$ ~ MSb$_{12}$ | Decimal number by these for bits corresponds to Selected No. in Table 2(b). Example 0000 = No. 0 | |
| MSb$_{13}$ ~ MSb$_{18}$ | Number of film frames From 0 to 63 | |
| MSb$_{19}$ ~ Msb$_{24}$ | Film speed Iso 50 ~ 6400 (00H-40H used) $\frac{1}{3}$ Eo step | |
| MSb$_{26}$ | 00 | Not specified |
| | 01 | AF spot |
| MSb$_{27}$ | 10 | AF continuous (mode V) |
| | 11 | Focus-lock |
| MSb$_{28}$ | 1 | Only up/down switch ON → aperture change |
| | | Up/down switch ON + S$_{AV}$ ON → shutter speed change |
| | 0 | Only up/down switch ON → shutter speed change |
| | | Up/down switch ON + S$_{AV}$ ON → aperture change |
| MSb$_{29}$ | 1 | Shutter speed changed by $\frac{1}{2}$ Ev stops |
| | 0 | Shutter speed changed by 1 Ev stops |
| MSb$_{30}$ | 00 | Self-timer time 2 seconds |
| MSb$_{31}$ | 01 | Self-timer time 5 seconds |
| | 10 | Self-timer time 10 seconds |
| MSb$_{32}$ ~ MSb$_{34}$ | 000 +0.5, 001 +0.25 010 0, 011 −0.25 100 −0.5 (Ev) | |

TABLE 5

Change Data (CDb$_n$) (RAM)

| Bits | Meaning | |
|---|---|---|
| CDb$_0$ | 000 H/S change, | 001 +/− change |
| CDb$_1$ | 010 S/C change, | 011 S/A change |
| CDb$_2$ | 100 No change | |

TABLE 6

Card Communication Output Data (CSb$_n$)

| Bits | Meaning |
|---|---|
| CSb$_0$ | $b_0, b_1 = 0,0$ Serial communication (I) |
| CSb$_1$ | $b_0, b_1 = 0,1$ Serial communication (II) |
| | $b_0, b_1 = 1,0$ Serial communication (III) |
| | $b_0, b_1 = 1,1$ Sleep sign |

TABLE 7

Data from a card

| Memory | Content | Address | Data | |
|---|---|---|---|---|
| ROM | kind of card | 20$_H$ | $b_1$<br>1 Card attached<br>0 No card | $b_2$ $b_3$~$b_7$<br>mode setting card NU<br>Program card |
| ROM | Function data (I) | 21$_H$ | $b_0, b_1$<br>1 00 NS<br>01 Continuous AF<br>0 10 One-shot AF<br>$b_4, b_5$<br>1 00 NS<br>01 Single-spot photometry<br>0 10 Multi-spot | $b_2, b_3$<br>00 NS<br>01 Single-spot AF<br>10 Multi-spot AF<br>$b_6, b_7$<br>00 NS<br>01 Continuous advancing<br>10 Single frame advancing |
| E$^2$PROM | Function data (II) | 22$_H$ | $b_0$<br>1 Card display<br>0 No<br>$b_2$<br>1 +/− mode<br>0 No<br>$b_4$<br>1 S/A mode<br>0 No | $b_1$<br>H/S mode<br>No<br>$b_3$<br>S/C mode<br>No<br>$b_5$ $b_6$<br>Card display<br>Camera display |
| E$^2$PROM | Function data (III) | 23$_H$ | $b_0$~$b_2$ $b_3$<br>1 AE mode NU<br>0 selection | $b_4$~$b_7$<br>Change mode (IV)<br>selection No. |
| E$^2$PROM | Function data (IV) | 24$_H$ | $b_0, b_1$<br>1 Change mode (V)<br>0 selection No.<br>$b_4, b_6$<br>1 Change mode (VII)<br>0 selection No. | $b_2, b_3$<br>Change mode (VI)<br>selection No.<br>$b_7$<br>NU |
| RAM | Data changing Site | 25$_H$ | $b_0$~$b_2$<br>1 At △<br>0 and NO | |
| E$^2$PROM | Function data | 26$_H$ | $b_0$~$b_2$<br>1 Change mode (III) | |

TABLE 7-continued

| Memory | Content | Address | Data from a card Data |
|---|---|---|---|
| ROM | (V) Function data | 27$_H$ | 0 selection No.<br>$b_0$ — $b_1$ — $b_2$<br>1 Flash — Full flash — Card controlled<br>0 No — Not full — Camera controlled |
| ROM | (V) Function data | 28$_H$ | $b_0$ ~ $b_7$<br>Change illumination level |
| ROM | (V) Aperture value | 29$_H$ | $b_0$ ~ $b_7$<br>Aperture value |
| ROM | Shutter speed | 2A$_H$ | $b_0$ ~ $b_7$<br>Shutter speed |

NS: Not Specified
NU: Not Used

TABLE 8(a)

| Bits | Meaning |
|---|---|
| CCKb$_0$ ~ CCKb$_2$ | No. of change mode (0-6 = change mode I ~ VIII) |
| CCKb$_3$ ~ CCKb$_6$ | Selection No. in change mode I (0-15) |
| CCKb$_7$ ~ CCKb$_9$ | Selection No. in change mode II (0-7) |
| CCKb$_{10}$ ~ CCKb$_{12}$ | Selection No. in change mode III (0-7) |
| CCKb$_{13}$ ~ CCKb$_{15}$ | Selection No. in change mode IV (0-15) |
| CCKb$_{17}$ CCKb$_{18}$ | Selection No. in change mode V (0-3) |
| CCKb$_{19}$ CCKb$_{20}$ | Selection No. in change mode VI (0-2) |
| CCKb$_{21}$ ~ CCKb$_{23}$ | Selection No. in change mode VII (0-5) |

TABLE 8(b)

| Flags | | Meaning |
|---|---|---|
| BATF | F = 1 | Flow of initialization of battery attachment has been passed through once |
| | F = 0 | After initialization of battery attachment, switch has been operated once or predetermined processing has been finished without performing anything. |
| OPF | F = 1 | Any of switches S$_{EM}$, S$_{FUN}$, S$_{CD}$, S$_{CDS}$, S$_0$ is ON |
| | F = 0 | All of the above five switches are OFF |
| AELF | F = 1 | AE lock function is ON |
| | F = 0 | AE lock function is OFF. |
| SETF | F = 1 | IC card is attached, and data setting mode is set |
| | F = 0 | IC card is attached, and data setting mode is not set |
| AFNF | F = 1 | AF can not be performed |
| | F = 0 | AF can be performed |
| AF1F | F = 1 | DF of first island is set as DF for lens driving. |
| | F = 0 | DF of first island is not set as DF for lens driving. |
| AF2F | F = 1 | DF of second island is set as DF for lens driving. |
| | F = 0 | DF of second island is not set as DF for lens driving. |
| AF3F | F = 1 | DF of third island is set as DF for lens driving. |
| | F = 0 | DF of third island is not set as DF for |

TABLE 8(b)-continued

| Flags | | Meaning |
|---|---|---|
| | | lens driving. |
| AFEF | F = 1 | Right-focused state |
| | F = 0 | Non-focused state |
| CDF | F = 1 | When card function enable/disbable switch S$_{CD}$ is ON, flow of S$_{CD}$ ON has been executed once. |
| | F = 0 | When CDF = 1, flow of S$_{CD}$ OFF has been executed. |
| CDFNF | F = 1 | Card function is enabled. |
| | F = 0 | Card function is disabled. |
| CDSF | F = 1 | Card data setting switch S$_{CDS}$ has been operated and flow of S$_{CD}$ ON has been executed once, but flow of S$_{CD}$ OFF has not been executed. |
| | F = 0 | In data setting mode, flow of S$_{CD}$ OFF has been executed. |
| AEONF | F = 1 | AE locking switch S$_{AEL}$ has been operated, and flow of steps #1705 et seq. has been executed once. |
| | F = 0 | When AE locking switch is turned OFF |
| CDIF | F = 1 | Steps #2710-#2720 have been passed through once. |
| | F = 0 | Steps #2710-#2720 have never been passed through. |
| DISPIF | F = 1 | When card function is added (by S$_{CD}$ ON), display is performed for a certain time. |
| | F = 0 | The above-mentioned display for a certain time is not performed. |
| WRTF | F = 1 | Data is written to E$^2$PROM. |
| | F = 0 | Data is not written to E$^2$PROM. |
| CHGF | F = 1 | Changeable function mode NO |
| | F = 0 | Changeable function mode EXIST |
| LOCNF | F = 1 | Focusing impossible |
| | F = 0 | Focusing possible |
| AFEIF | F = 1 | First subject-following mode after right focus |
| | F = 0 | Not first |
| S$_1$ONF | F = 1 | S$_1$ is ON |
| | F = 0 | S$_1$ is OFF |
| Subject-follow F | F = 1 | Subject-following mode |
| | F = 0 | Otherwise |
| S$_Q$ONF | F = 1 | S$_Q$ is ON |
| | F = 0 | S$_Q$ is OFF |
| Multi-/Single-spot display F | F = 1 | Display the set Multi-/Single-spot mode in camera body LCD even when the mode change is prohibited |
| | F = 0 | Not display at that time |

TABLE 9

| Address | Content | Data | | | |
|---|---|---|---|---|---|
| | | Display RAM (register) | | | |
| 00$_H$ | Shutter speed | b$_0$-b$_7$ | represent shutter speed | | |
| 01$_H$ | Aperture value | b$_0$-b$_7$ | represent Aperture value | | |
| 02$_H$ | Mode display | b$_0$ | b$_1$ | | b$_2$ |
| | | 1 Manual Focus | ONE SHOT-AF | | SELF |
| | | 0 AF | CONT-AF | | NON |
| 03$_H$ | AE mode | b$_0$, b$_1$ | b$_1$ | | b$_2$ |

TABLE 9-continued

Display RAM (register)

| Address | Content | Data | | | | | | |
|---|---|---|---|---|---|---|---|---|
| | display | 1 P, A, M or S | | Mode set by | | | | |
| | | 0 | | IC card | | | | |
| $04_H$ | Card display | $b_0$ | $b_1$ | $b_2$ | $b_3$ | $b_4$ | $b_5$ | $b_6$ |
| | | 1 Card | H | NU | + | NU | S | Single |
| | | 0 NON | S | | − | . | C | Multi |
| | | | $b_7$ | | | | | |
| | | 1 | Single/multi display | | | | | |
| | | 0 | Non display | | | | | |
| $05_H$ | Data changing site display (▲) | $b_0 \sim b_2$ | | | | | | |
| | | 1 At Δ and | | | | | | |
| | | 0 Non | | | | | | |
| $06_H$ | Frame number | $b_0$-$b_6$: Number $b_7$: NU | | | | | | |
| $07_H$ | Film | $b_0$-$b_7$: | | | | | | |
| $08_H$ | IC card mode display (I) | $b_0$ | | $b_1 \sim b_3$ | | $b_4 \sim b_7$ | | |
| | | 1 Program card | | Change mode III | | Change mode V | | |
| | | 0 Mode setting card | | Selecting No. | | Selection No. | | |
| $09_H$ | IC card mode display (II) | $b_0 \cdot b_1$ | | $b_2 \cdot b_3$ | | $b_4 \cdot b_5$ | | |
| | | 1 Change mode V | | Change mode VI | | Change mode VII | | |
| | | 0 Selection No. | | Selection No. | | Selection No. | | |
| $0A_H$ | Controls | $b_0$ | $b_1$ | $b_2$ | $b_3$ | | | |
| | | 1 | Initial load | Not glow | When card attached | | | |
| | | 0 | Non | | | | | |
| | | | $b_4$ | | $b_5, b_6$ | | | |
| | | 1 | When battery load | | Prepare data 0, 0-1, 1 = I-IV | | | |
| | | 0 | | | | | | |
| $0B_H$ | IC card mode display (III) | $b_0 \sim b_3$ | | | | | | |
| | | 1 Change mode I | | | | | | |
| | | 0 Selection No. | | | | | | |
| $0C_H$ | Viewfinder LED | $b_0$ | | $b_1$ | | $b_2$ | | |
| | | 1 Focused | | F. Impossible | | Follow | | |
| | | 0 Non | | Non | | Non | | |
| | | $b_3$ | | $b_4$ | | $b_5$ | | |
| | | 1 Multi AF | | AF | | $S_1$ON | | |
| | | 0 Spot AF | | M | | $S_1$OFF | | |

TABLE 10

Lens (I)

| | Address (8 bits) | Meaning |
|---|---|---|
| (A) | 00H | Lens attached |
| | xxx00001 | Open aperture value Avo |
| | xxx00010 | Maximum aperture value Avmax |
| | xxx00011 | Distance |
| | xxx00100 | Focal length |
| | xxx00101 | Lens move conversion factor |
| | 06H | $S_Q$ $b_0 = 1$: (OFF), $b_1 - b_7 = 0$ |
| | 07H | LOK $b_0 = 0$: OK, $b_1 - b_7 = 0$ |
| (B) | 10H | Lens attached |
| | xxx10001 | Open aperture value Avo |
| | xxx10010 | Maximum aperture value Avmax |
| | xxx10011 | Distance |
| | xxx00100 | Focal length |
| | xxx00101 | Lens move conversion factor |
| | 16H | $S_Q$ $b_0 = 1$: (OFF), $b_1 - b_7 = 0$ |
| | 17H | LOK $b_0 = 0$: OK, $b_1 - b_7 = 0$ |
| | 18H | " |

TABLE 11

Lens (II)

| | Address (8 bits) | Meaning |
|---|---|---|
| (A) | 00H | Lens attached |
| | xxx00001 | Open aperture value Avo |
| | xxx00010 | Maximum aperture value Avmax |
| | xxx00011 | Distance |
| | xxx00100 | Focal length |
| | xxx00101 | Lens move conversion factor |
| | 06H | $S_Q$ $b_0 = 1$: (OFF), $b_1 - b_7 = 0$ |
| | 07H | LOK $b_0 = 0$: OK, $b_1 - b_7 = 0$ |
| | 08H | $S_Q$ $b_0 = 1$: (OFF), $b_1 - b_7 = 0$ |
| | 09H | LOK $b_0 = 0$: OK, $b_1 - b_7 = 0$ |

TABLE 12

Lens information in camera

| Address in camera | Meaning (1 byte) |
|---|---|
| Bd1 | Lens attached/Non |
| Bd2 | Open aperture value Avo |
| Bd3 | Maximum aperture value Avmax |
| Bd4 | Distance |
| Bd5 | Focal length |
| Bd6 | Lens move conversion factor |
| Bd7 | $S_Q$ $b_0 = 0$: $S_Q$ is OFF |
| | $b_0 = 0$: $S_Q$ is ON |
| | $b_1 - b_7$: NU |
| Bd8 | LOK $b_0 = 0$: NO |
| | $b_0 = 1$: OK |
| | $b_1$-$b_7$: NU |

What is claimed is:

1. Camera system including a camera body and an interchangeable lens attachable to the camera body, comprising:
   an operable member provided in the interchangeable lens having either of a first state and a second state;
   a memory, provided in the interchangeable lens, for storing a first digital signal inherent in the interchangeable lens;
   means, provided in the interchangeable lens, for converting the state of the operable member as a second digital signal;
   means, provided in the interchangeable lens and having a connector, for sending the first and second digital signals as a set of serial data through the connector;
   means, provided in the camera body, for receiving the set of serial data from the sending means of the attached interchangeable lens through the connector;

means, provided in the camera body, for selecting one scene-portion from a first scene-portion and a second scene-portion which has an area larger than the area of the first scene-portion in response to the second digital signal included in the set of serial data;

means, provided in the camera body, for detecting focus condition of the attached interchangeable lens with respect to the scene-portion selected by the selecting means; and means for focusing the attached interchangeable lens on the basis of a detected result of the detecting means.

2. The camera system of claim 1, where the focus-detecting means includes means for detecting focus condition of the attached interchangeable lens with respect to both of the first and the second scene-portion, and where the selecting means includes means for choosing a result of the detected condition in accordance with the selected scene-portion.

3. The camera system of claim 1, where the selecting mean selects the first scene-portion in response to the second digital signal indicating the operation of the operable member and selects the second scene-portion in response to the second digital signal indicating the non-operation of the operable member.

4. Camera system including a camera body and an interchangeable lens attachable to the camera body, comprising:

an operable member, provided in the interchangeable lens, having either of an operation state and a non-operation state;

means, provided in the interchangeable lens, for storing a first digital signal inherent in the interchangeable lens;

means, provided in the interchangeable lens, for generating a second digital signal in accordance with the state of the operable member;

means, provided in the interchangeable lens, for sending the first and second digital signals to the camera body as a set of serial data;

means for driving the interchangeable lens on the basis of the detected focus condition of the detecting means; and means, provided in the camera body, for controlling the driving means in either of a first and a second modes in response to the second digital signal included in the set of serial data, in the first mode the operation of the driving means is inhibited after said detecting means once detects infocus condition of the interchangeable lens, and in the second mode the operation of the driving means is continued even if the detecting means detects infocus condition of the interchangeable lens.

5. The camera system of claim 4, wherein said controlling means makes the driving means drive the interchangeable lens in the first mode in response to the received second digital signal that indicates the non-operation state of the operable member, and in the second mode in response to the received second digital signal that indicates the operation state of the operable member.

6. Camera system for an automatic focusing having a photographic lens, comprising:

a manual operable member;

function-selecting means for selecting one of a plurality of functions each having selectable focusing modes which relate to the automatic focusing;

mode-selecting means for selecting one of the focusing modes of the function selected by the function-selecting means in response to an operation of the manual operable member; and focusing means for performing automatic focusing on the basis of the focusing mode selected by the mode-selecting means.

7. The system of claim 6, where the manual operable member is placed on the photographic lens.

8. Camera system including a camera body, a first and a second accessories each attachable to the camera body, comprising:

a first operable member provided in the first accessory;

function-selecting means for selecting one of a plurality of functions each having a plurality of control modes when the second accessory is attached;

mode-selecting means for selecting one of the control modes of the function selected by the function selecting means in response to an operation of the operable member; and control means for controlling the function of the camera selected by the function-selecting means on the basis of the control mode selected by the mode-selecting means.

9. The camera system of claim 8, where the functions are related to an automatic focusing and where the control means controls to focus the interchangeable lens automatically.

10. The camera system of claim 8, where the function-selecting means includes:

a second operable member provided in the camera body;

first sending means, provided in the camera body, for sending a first signal in response to an operation of the second operable member;

first receiving means, provided in the second accessory, for receiving the first signal;

means, provided in the second accessory, for choosing one of the functions that the second accessory can select, in accordance with the first signal received by the first receiving means;

second sending means, provided in the second accessory, for sending to the camera body a second signal indicating the function chosen by the choosing means in the second accessory;

second receiving means, provided in the camera body, for receiving the second signal; and adopting means, provided in the camera body, for adopting the function that corresponds to the second signal received by the second receiving means.

11. Camera system for automatic focusing including a lens, comprising:

first selecting means for selecting one scene-portion from a first scene-portion and a second scene-portion which has an area larger than the area of the first scene-portion;

focus detecting means for detecting a focus condition with respect to the selected scene-portion;

lens driving means for driving the lens on the basis of the detected focus condition in one of a first mode and a second mode alternatively, where in the first mode the operation of the driving means is inhibited after the detecting means detects an infocus condition of the lens, and in the second mode the operation of the driving means is continued even after the detecting means detects an infocus condition of the lens;

means, provided in the camera body, for selecting one of the first mode and the second mode alternatively, to control the driving means in the selected mode;

an operable member; and means for stopping the driving of the lens in response to an operation of the operable member in any selected mode.

12. In a camera system having a camera body, an interchangeable lens adapted to cooperate with the camera body, means provided in the interchangeable lens for storing a first digital signal inherent in the interchangeable lens, terminal provided in the interchangeable lens for sending the first digital signal to the camera body, manual operable switch provided in the interchangeable lens, means provided in the camera body for selecting either of a first scene portion and a second scene portion which has larger area than the area of the first area portion alternatively according to state of the manual operable switch, means for detecting focus condition of the attached interchangeable lens with respect to the selected scene portion, means provided in the interchangeable lens for generating a second digital signal in accordance with the state of the manual operable switch;

means provided in the interchangeable lens for combining the second digital signal with the first digital signal; and means provided in the interchangeable lens for sending the first and second digital signals to the camera body through the terminal as a single digital data, and wherein the selecting means includes means for selecting either one of the first scene portion and the second scene portion according to the second digital signal included in the digital data.

* * * * *